(12) United States Patent
Powalowska et al.

(10) Patent No.: US 12,545,951 B2
(45) Date of Patent: *Feb. 10, 2026

(54) SIMPLIFIED POLYNUCLEOTIDE SEQUENCE DETECTION METHOD

(71) Applicant: Biofidelity Ltd, Cambridge (GB)

(72) Inventors: Paulina Klaudyna Powalowska, Cambridge (GB); Ana Luisa Bras Dos Santos Ribeiro Da Silva Weatherley, Cambridge (GB); Magdalena Stolarek-Januszkiewicz, Cambridge (GB); Barnaby William Balmforth, Cambridge (GB)

(73) Assignee: BIOFIDELITY LTD, Cambridge (GB)

( * ) Notice: Subject to any disclaimer, the term of this patent is extended or adjusted under 35 U.S.C. 154(b) by 647 days.

This patent is subject to a terminal disclaimer.

(21) Appl. No.: 17/757,861

(22) PCT Filed: Dec. 23, 2020

(86) PCT No.: PCT/GB2020/053361
§ 371 (c)(1),
(2) Date: Jun. 22, 2022

(87) PCT Pub. No.: WO2021/130494
PCT Pub. Date: Jul. 1, 2021

(65) Prior Publication Data
US 2024/0425912 A1    Dec. 26, 2024

Related U.S. Application Data

(63) Continuation-in-part of application No. 16/911,762, filed on Jun. 25, 2020, now Pat. No. 11,332,780.

(30) Foreign Application Priority Data

Dec. 23, 2019 (GB) .................................. 1919186
Jun. 22, 2020 (EP) .................................. 20181513

(51) Int. Cl.
C12Q 1/6853 (2018.01)
C12Q 1/6818 (2018.01)

(52) U.S. Cl.
CPC ......... *C12Q 1/6853* (2013.01); *C12Q 1/6818* (2013.01); *C12Q 2565/40* (2013.01); *C12Q 2600/16* (2013.01)

(58) Field of Classification Search
None
See application file for complete search history.

(56) References Cited

U.S. PATENT DOCUMENTS 5,849,497 A    12/1998  Steinman
10,961,569 B2   3/2021  Balmforth et al.
(Continued)

FOREIGN PATENT DOCUMENTS

CN    105143468 A    12/2015
CN    105339505 A     2/2016
(Continued)

OTHER PUBLICATIONS

Pandey et al., "Kinetic Pathway of Pyrophosphorolysis by a Retrotransposon Reverse Transcriptase", PLoS ONE, vol. 3, No. 1, 11 pages, Jan. 2008.

(Continued)

*Primary Examiner* — Samuel C Woolwine
(74) *Attorney, Agent, or Firm* — James S. Keddie; Bozicevic, Field & Francis LLP

(57) ABSTRACT

Provided herein are methods for improved polynucleotide detection.

18 Claims, 17 Drawing Sheets

Specification includes a Sequence Listing.

(56) References Cited

U.S. PATENT DOCUMENTS

| | | | |
|---|---|---|---|
| 11,332,780 | B2 | 5/2022 | Balmforth et al. |
| 2001/0014451 | A1 | 8/2001 | Shultz et al. |
| 2003/0232348 | A1 | 12/2003 | Jones et al. |
| 2004/0009515 | A1 | 1/2004 | Liu et al. |
| 2004/0023207 | A1* | 2/2004 | Polansky ............ A61K 48/005 435/456 |
| 2005/0037398 | A1 | 2/2005 | Gelfand et al. |
| 2005/0042638 | A1 | 2/2005 | Arnold, Jr. et al. |
| 2006/0110765 | A1 | 5/2006 | Wang |
| 2006/0234252 | A1 | 10/2006 | Andersen |
| 2007/0154914 | A1 | 7/2007 | Gelfand et al. |
| 2008/0176233 | A1 | 7/2008 | Nilsen et al. |
| 2009/0239283 | A1 | 9/2009 | Liu et al. |
| 2010/0041053 | A1 | 2/2010 | Fiss et al. |
| 2010/0112556 | A1 | 5/2010 | Sampson et al. |
| 2010/0112565 | A1 | 5/2010 | Tobler |
| 2012/0202704 | A1 | 8/2012 | Fan et al. |
| 2014/0349300 | A1 | 11/2014 | Meuleman |
| 2017/0081702 | A1 | 3/2017 | Dahl et al. |
| 2017/0335371 | A1 | 11/2017 | Osborne et al. |
| 2018/0080074 | A1 | 3/2018 | Balmforth et al. |
| 2018/0223274 | A1 | 8/2018 | Townshend et al. |
| 2019/0271035 | A1 | 9/2019 | Ding et al. |
| 2021/0180122 | A1 | 6/2021 | Balmforth et al. |

FOREIGN PATENT DOCUMENTS

| | | |
|---|---|---|
| CN | 105463108 A | 4/2016 |
| CN | 105483117 A | 4/2016 |
| CN | 108103159 A | 6/2018 |
| CN | 108265109 A | 7/2018 |
| EP | 1627924 A1 | 2/2006 |
| EP | 2292787 A1 | 3/2011 |
| EP | 2733221 A1 | 5/2014 |
| EP | 3207982 A1 | 8/2017 |
| EP | 3211092 A1 | 8/2017 |
| EP | 3074529 B1 | 5/2018 |
| EP | 3447152 A1 | 2/2019 |
| EP | 3682030 B1 | 5/2021 |
| JP | 2008520245 A | 6/2008 |
| JP | 2010506573 A | 3/2010 |
| JP | 2011512140 A | 4/2011 |
| JP | 2016515832 A | 6/2016 |
| JP | 2017522031 A | 8/2017 |
| JP | 2021524287 A | 9/2021 |
| WO | 0049180 A1 | 8/2000 |
| WO | 0106295 A1 | 1/2001 |
| WO | 03095664 A2 | 11/2003 |
| WO | 2008104794 A2 | 9/2008 |
| WO | 2009019008 A1 | 2/2009 |
| WO | 2010062781 A2 | 6/2010 |
| WO | 2010120803 A2 | 10/2010 |
| WO | 2011077004 A1 | 6/2011 |
| WO | 2012032510 A1 | 3/2012 |
| WO | 2012039529 A1 | 3/2012 |
| WO | 2012150749 A1 | 11/2012 |
| WO | 2014160199 A1 | 10/2014 |
| WO | 2014165210 A2 | 10/2014 |
| WO | 2014167323 A1 | 10/2014 |
| WO | 2015058176 A1 | 4/2015 |
| WO | 2015069787 A1 | 5/2015 |
| WO | 2015121675 A1 | 8/2015 |
| WO | WO 2017/140839 A1 | 8/2017 |
| WO | 2018210823 A1 | 11/2018 |
| WO | 2020016590 A1 | 1/2020 |
| WO | 2021130495 A1 | 7/2021 |
| WO | 2021130496 A1 | 7/2021 |

OTHER PUBLICATIONS

International Search Report in International Application No. PCT/GB2020/053361, mailed Mar. 31, 2021 (5 pages).

Ingram, R. et al., "PAP-LMPCR for improved, allele-specific footprinting and automated chromatin fine structure analysis," Nucleic Acids Research, vol. 36, pp. 1-8 (2008).

Deutscher, M. P. et al., "Enzymatic Synthesis of Deoxyribonucleic Acid: XXVIII. The pyrophosphate exchange and pyrophosphorolysis reactions of deoxyribonucleic acid polymerase," The Journal of Biological Chemistry, vol. 244, pp. 3019-3028 (1969).

Reed, G. H. et al., "High-resolution DNA melting analysis for simple and efficient molecular diagnostics," Pharmacogenomics, vol. 8, pp. 597-608 (2007).

Barken, K. B. et al., "Effect of unlabeled helper probes on detection of an RNA target by bead-based sandwich hybridization," BioTechniques, vol. 36, pp. 124-132 (2004).

Berti, F. et al., "Microfluidic-based electrochemical genosensor coupled to magnetic beads for hybridization detection," Talanta, vol. 77, pp. 971-978 (2009).

Cansiz, S. et al., "A sandwich-type DNA array platform for detection of GM targets in multiplex assay," European Food Research and Technology, vol. 235, pp. 429-437 (2012).

Harrison, A. et al., "DNA Methylation: a Timeline of Methods and Applications," Frontiers in Genetics, vol. 2, p. 3 (2011).

Lagunavicius, A. et al., "Duality of polynucleotide substrates for Phi29 DNA polymerase," RNA, vol. 14, pp. 503-513 (2008).

Liu, Q. et al., "Pyrophosphorolysis-Activated Polymerization (PAP): Application to Allele-Specific Amplification," BioTechniques, vol. 29, pp. 1072-1083 (2000).

Liu, Q. et al., "PAP: Detection of Ultra Rare Mutations Depends on P* Oligonucleotides: "Sleeping Beauties" Awakened by the Kiss of Pyrophosphorolysis," Human mutations, vol. 23, pp. 426-436 (2004).

Silva, A. et al., "Single-copy detection of somatic variants from solid and liquid biopsy," Scientific reports, vol. 11, No. 6068 (2021).

Van Den Oever, J. M. E. et al., "Mrassf1a-Pap, a Novel Methylation-Based Assay for the Detection of Cell-Free Fetal DNA in Maternal Plasma," PLS ONE, vol. 8, No. 12 (2013).

Ou, L. et al., "Rolling Circle Amplification-Based Biosensors," Analytical Letters, vol. 48, pp. 1199-1216 (2015).

The comparison results between GXXQXXGGTTTGTGGT and a gene sequence from human chromosome 19 using NCBI Blast for Nucleotide Sequence, printed on Feb. 22, 2025.

Liu et al., "Pyrophosphorolysis-activatable oligonucleotides may facilitate detection of rare alleles, mutation scanning and analysis of chromatin structures", Nucleic Acids Research, 2002, 30(2): 598-604.

Stratagene Catalog (1988), p. 39, published by Stratagene, 11011 North Torney Pines Road, La Jolla, CA 92037, USA.

"Phusion Hot Start II High-Fidelity DNA Polymerase" from Thermo Scientific, published on Jun. 27, 2018.

Zhang et al., "Clinical Evaluation of an Improved Method for Mutation Detection of Epidermal Growth Factor Receptor", Progress in Modern Biomedicine, Aug. 2016, 16(23): 4438-4442, 4471.

The alignment results between CCACAAACCAAAAAC from single-stranded first oligonucleotide B taught by Fayling et al., and the mRNA sequence *Homo sapiens* CD2 associated protein (CD2AP), printed on Aug. 15, 2025.

MRNA sequence of *Homo sapiens* CD2 associated protein (CD2AP), transcript variant X3, printed on Aug. 15, 2025.

Panni, "Gene Section Review, CD2AP (CD2 associated protein)", Atlas Genetcs and Cytogenetics in Oncology and Haematology, Nov. 2017, 22: 285-291.

* cited by examiner

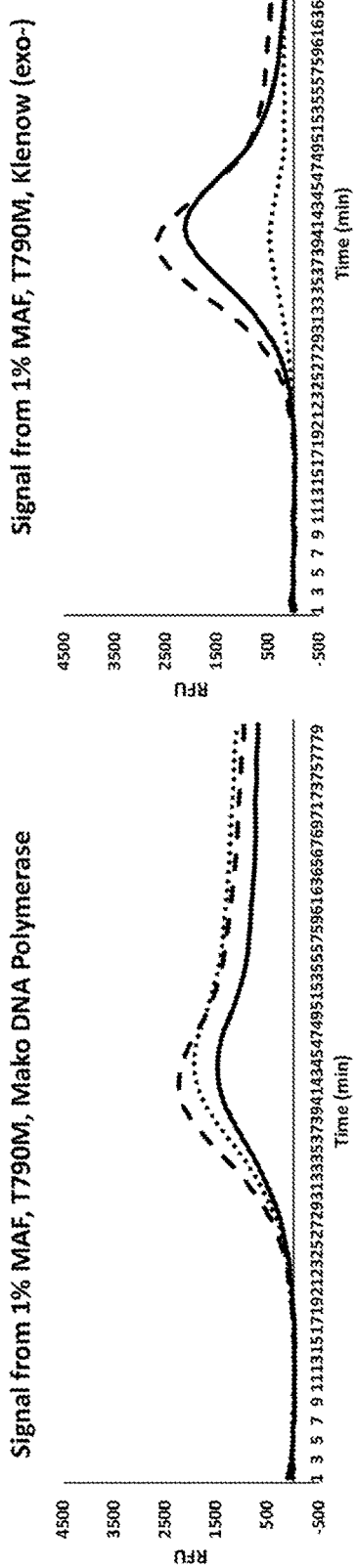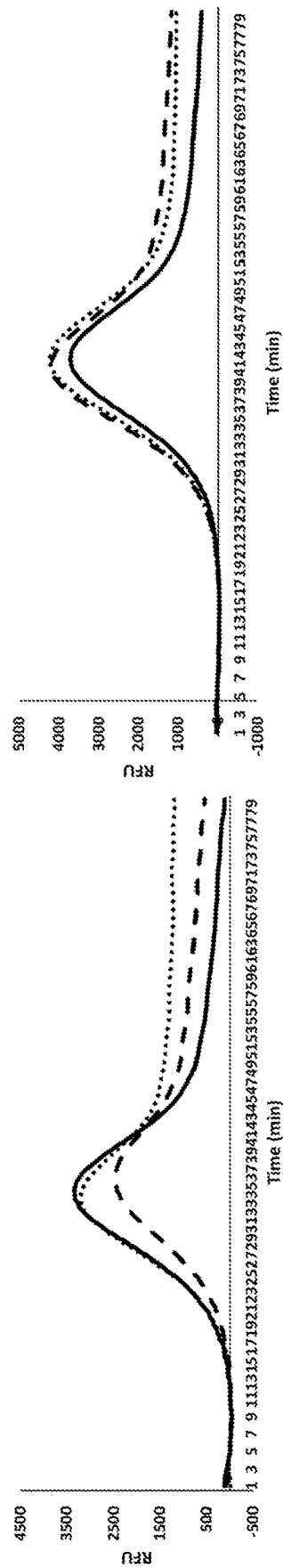

```
                        SEQUENCE LISTING

<160> NUMBER OF SEQ ID NOS: 35

<210> SEQ ID NO 1
<211> LENGTH: 69
<212> TYPE: DNA
<213> ORGANISM: Artificial Sequence
<220> FEATURE:
<223> OTHER INFORMATION: A at position 1 has a 5' phosphate.
      A, T, G and T (positions 1-4) are all linked by phosphorothioate
      bonds.

<400> SEQUENCE: 1
atgttcgatg agctttgaca atacttgaag ctcgcagata taggatgttg cgatagtcca      60
ggaggctgc                                                             69

<210> SEQ ID NO 2
<211> LENGTH: 36
<212> TYPE: DNA
<213> ORGANISM: Artificial Sequence
<220> FEATURE:
<223> OTHER INFORMATION: DNA sequence

<400> SEQUENCE: 2
tgtcaaagct catcgaacat cctggactat gtctcc                               36

<210> SEQ ID NO 3
<211> LENGTH: 75
<212> TYPE: DNA
<213> ORGANISM: Artificial Sequence
<220> FEATURE:
<223> OTHER INFORMATION: Part of human EGFR gene

<400> SEQUENCE: 3
tgctgggcat ctgcctcacc tccaccgtgc agctcatcac gcagctcatg cccttcggca      60
gcctcctgga ctatg                                                      75

<210> SEQ ID NO 4
<211> LENGTH: 75
<212> TYPE: DNA
<213> ORGANISM: Artificial Sequence
<220> FEATURE:
<223> OTHER INFORMATION: Part of human EGFR gene with C797S mutation

<400> SEQUENCE: 4
tgctgggcat ctgcctcacc tccaccgtgc agctcatcac gcagctcatg cccttcggct      60
gcctcctgga ctatg                                                      75

<210> SEQ ID NO 5
<211> LENGTH: 20
<212> TYPE: DNA
<213> ORGANISM: Artificial Sequence
<220> FEATURE:
<223> OTHER INFORMATION: DNA sequence
```

```
<400> SEQUENCE: 5
tcgcaacatc ctatatctgc                                                 20

<210> SEQ ID NO 6
<211> LENGTH: 20
<212> TYPE: DNA
<213> ORGANISM: Artificial Sequence
<220> FEATURE:
<223> OTHER INFORMATION: DNA Sequence

<400> SEQUENCE: 6
tgagctttga caatacttga                                                 20

<210> SEQ ID NO 7
<211> LENGTH: 90
<212> TYPE: DNA
<213> ORGANISM: Artificial Sequence
<220> FEATURE:
<223> OTHER INFORMATION: WT oligonucleotide

<400> SEQUENCE: 7
catctgcctc acctccaccg tgcagctcat cacgcagctc atgcccttcg gctgcctcct     60
ggactatgtc cgggaacaca aagacaatat                                      90

<210> SEQ ID NO 8
<211> LENGTH: 90
<212> TYPE: DNA
<213> ORGANISM: Artificial Sequence
<220> FEATURE:
<223> OTHER INFORMATION: T790M oligonucleotide

<400> SEQUENCE: 8
catctgcctc acctccaccg tgcagctcat catgcagctc atgcccttcg gctgcctcct     60
ggactatgtc cgggaacaca aagacaatat                                      90

<210> SEQ ID NO 9
<211> LENGTH: 90
<212> TYPE: DNA
<213> ORGANISM: Artificial Sequence
<220> FEATURE:
<223> OTHER INFORMATION: C797S_2389 oligonucleotide

<400> SEQUENCE: 9
catctgcctc acctccaccg tgcagctcat cacgcagctc atgcccttcg gcagcctcct     60
ggactatgtc cgggaacaca aagacaatat                                      90

<210> SEQ ID NO 10
<211> LENGTH: 78
<212> TYPE: DNA
<213> ORGANISM: Artificial Sequence
<220> FEATURE:
<223> OTHER INFORMATION: T790M probe. 5' phosphate. Phosphorothioate
      bonds between A, T, G and T at positions 1-4.

<400> SEQUENCE: 10
atgttcgatg agctttgaca atacttgagc acggcagata taggatgttg cgaagggcat     60
gagctgcatg atgagctg                                                   78

<210> SEQ ID NO 11
<211> LENGTH: 69
<212> TYPE: DNA
<213> ORGANISM: Artificial Sequence
<220> FEATURE:
```

<223> OTHER INFORMATION: C797S_2389 probe. 5' phosphate.
       Phosphorothioate bonds between A, T, G and T at positions 1-4.

<400> SEQUENCE: 11
atgttcgatg agctttgaca atacttgaag ctcgcagata taggatgttg cgatagtcca    60
ggaggctgc                                                           69

<210> SEQ ID NO 12
<211> LENGTH: 36
<212> TYPE: DNA
<213> ORGANISM: Artificial Sequence
<220> FEATURE:
<223> OTHER INFORMATION: T790M splint oligonucleotide.

<400> SEQUENCE: 12
tgtcaaagct catcgaacat gcccttcgca acatct                             36

<210> SEQ ID NO 13
<211> LENGTH: 36
<212> TYPE: DNA
<213> ORGANISM: Artificial Sequence
<220> FEATURE:
<223> OTHER INFORMATION: C797S_2389 splint oligonucleotide.

<400> SEQUENCE: 13
tgtcaaagct catcgaacat tcctggacta tcgcat                             36

<210> SEQ ID NO 14
<211> LENGTH: 70
<212> TYPE: DNA
<213> ORGANISM: Artificial Sequence
<220> FEATURE:
<223> OTHER INFORMATION: Cy5 primer. 3' Qusar670 dye, Quencher between G
      at position 50 and A at position 51.

<400> SEQUENCE: 14
acgcctggtt accgagccag gttcgcacat gtaggctcgg taaccaggcg acatcctata    60
tctgccgtgc                                                          70

<210> SEQ ID NO 15
<211> LENGTH: 58
<212> TYPE: DNA
<213> ORGANISM: Artificial Sequence
<220> FEATURE:
<223> OTHER INFORMATION: TexasRed primer. 5' TexasRed dye. Quencher
      between G at position 38 and C at position 39.

<400> SEQUENCE: 15
acgcctggtt acaggttcgc acatgtagta accaggcgca acatcctata tctgcgag     58

<210> SEQ ID NO 16
<211> LENGTH: 20
<212> TYPE: DNA
<213> ORGANISM: Artificial Sequence
<220> FEATURE:
<223> OTHER INFORMATION: Reverse primer.

<400> SEQUENCE: 16
atgttcgatg agctttgaca                                               20

<210> SEQ ID NO 17
<211> LENGTH: 100
<212> TYPE: DNA
<213> ORGANISM: Artificial Sequence
<220> FEATURE:

<223> OTHER INFORMATION: WT oligonucleotide.

<400> SEQUENCE: 17
cccaaccaag ctctcttgag gatcttgaag gaaactgaat tcaaaaagat caaagtgctg    60
ggctccggtg cgttcggcac ggtgtataag gtaaggtccc    100

<210> SEQ ID NO 18
<211> LENGTH: 100
<212> TYPE: DNA
<213> ORGANISM: Artificial Sequence
<220> FEATURE:
<223> OTHER INFORMATION: G719X_6239 oligonucleotide.

<400> SEQUENCE: 18
cccaaccaag ctctcttgag gatcttgaag gaaactgaat tcaaaaagat caaagtgctg    60
gcctccggtg cgttcggcac ggtgtataag gtaaggtccc    100

<210> SEQ ID NO 19
<211> LENGTH: 100
<212> TYPE: DNA
<213> ORGANISM: Artificial Sequence
<220> FEATURE:
<223> OTHER INFORMATION: G719X_6252 oligonucleotide.

<400> SEQUENCE: 19
cccaaccaag ctctcttgag gatcttgaag gaaactgaat tcaaaaagat caaagtgctg    60
agctccggtg cgttcggcac ggtgtataag gtaaggtccc    100

<210> SEQ ID NO 20
<211> LENGTH: 100
<212> TYPE: DNA
<213> ORGANISM: Artificial Sequence
<220> FEATURE:
<223> OTHER INFORMATION: G719X_6253 oligonucleotide.

<400> SEQUENCE: 20
cccaaccaag ctctcttgag gatcttgaag gaaactgaat tcaaaaagat caaagtgctg    60
tgctccggtg cgttcggcac ggtgtataag gtaaggtccc    100

<210> SEQ ID NO 21
<211> LENGTH: 77
<212> TYPE: DNA
<213> ORGANISM: Artificial Sequence
<220> FEATURE:
<223> OTHER INFORMATION: G719X_6239 probe oligonucleotide. 5' phosphate.
      Phosphorothioate bonds between A, T, G and T at positions 1-4.

<400> SEQUENCE: 21
atgttcgatg agctttgaca atacttgaca tgcgcagata taggatgttg cgaaacgcac    60
cggaggccag cactttg    77

<210> SEQ ID NO 22
<211> LENGTH: 77
<212> TYPE: DNA
<213> ORGANISM: Artificial Sequence
<220> FEATURE:
<223> OTHER INFORMATION: G719X_6252 probe oligonucleotide. 5' phosphate.
      Phosphorothioate bonds between A, T, G and T at positions 1-4.

<400> SEQUENCE: 22
atgttcgatg agctttgaca atacttgaca tgccgagtaa tgagagtttc gcaaacgcac    60
cggagctcag cactttg    77

<210> SEQ ID NO 23
<211> LENGTH: 77
<212> TYPE: DNA
<213> ORGANISM: Artificial Sequence
<220> FEATURE:
<223> OTHER INFORMATION: G719X_6253 probe oligonucleotide. 5' phosphate.
      Phosphorothioate bonds between A, T, G and T at positions 1-4.

<400> SEQUENCE: 23
atgttcgatg agctttgaca atacttgaca tgcgagcaat taggtagtgt cgtaacgcac     60
cggagcacag cactttg                                                   77

<210> SEQ ID NO 24
<211> LENGTH: 36
<212> TYPE: DNA
<213> ORGANISM: Artificial Sequence
<220> FEATURE:
<223> OTHER INFORMATION: Splint oligonucleotide.

<400> SEQUENCE: 24
tgtcaaagct catcgaacat ccggtgcgtt cggcaa                              36

<210> SEQ ID NO 25
<211> LENGTH: 59
<212> TYPE: DNA
<213> ORGANISM: Artificial Sequence
<220> FEATURE:
<223> OTHER INFORMATION: Dye primer 1. 5' Cy5 dye, phosphorothioate bond
      between A at position 1 and C at position 2.

<400> SEQUENCE: 25
actgaccagc tccatgacaa tcgctgtcgc catgatcgat cgcaacatcc tatatctgc     59

<210> SEQ ID NO 26
<211> LENGTH: 59
<212> TYPE: DNA
<213> ORGANISM: Artificial Sequence
<220> FEATURE:
<223> OTHER INFORMATION: Dye primer 2. 5' TEX dye, phosphorothioate bond
      between A at position 1 and C at position 2.

<400> SEQUENCE: 26
actgaccagc tccatgacaa tcgctgtcgc catgatcgat gcgaaactct cattactcg     59

<210> SEQ ID NO 27
<211> LENGTH: 59
<212> TYPE: DNA
<213> ORGANISM: Artificial Sequence
<220> FEATURE:
<223> OTHER INFORMATION: Dye primer 3. 5' TEX dye, phosphorothioate bond
      between T at position 1 and A at position 2.

<400> SEQUENCE: 27
tacgaccgac tcactcctta cagcagtccg cagtatgcta cgacactacc taattgctc     59

<210> SEQ ID NO 28
<211> LENGTH: 39
<212> TYPE: DNA
<213> ORGANISM: Artificial Sequence
<220> FEATURE:
<223> OTHER INFORMATION: Quencher primer 1. 3' Iowa Black RQ quencher.

<400> SEQUENCE: 28
tcgatcatgg cgacagcgat tgtcatggag ctggtcagt                           39

```
<210> SEQ ID NO 29
<211> LENGTH: 39
<212> TYPE: DNA
<213> ORGANISM: Artificial Sequence
<220> FEATURE:
<223> OTHER INFORMATION: Quencher primer 2. 3' Iowa Black FQ quencher.

<400> SEQUENCE: 29
agcatactgc ggactgctgt aaggagtgag tcggtcgta                              39

<210> SEQ ID NO 30
<211> LENGTH: 20
<212> TYPE: DNA
<213> ORGANISM: Artificial Sequence
<220> FEATURE:
<223> OTHER INFORMATION: Reverse primer. Phosphorothioate bonds between
      T, G and A at positions 1-3.

<400> SEQUENCE: 30
tgagctttga caatacttga                                                   20

<210> SEQ ID NO 31
<211> LENGTH: 81
<212> TYPE: DNA
<213> ORGANISM: Artificial Sequence
<220> FEATURE:
<223> OTHER INFORMATION: Wildtype oligo

<400> SEQUENCE: 31
ctgctgggca tctgcctcac ctccaccgtg cagctcatca cgcagctcat gcccttcggc       60
tgcctcctgg actatgtccg g                                                 81

<210> SEQ ID NO 32
<211> LENGTH: 81
<212> TYPE: DNA
<213> ORGANISM: Artificial Sequence
<220> FEATURE:
<223> OTHER INFORMATION: Wildtype oligo

<400> SEQUENCE: 32
ctgctgggca tctgcctcac ctccaccgtg cagctcatca tgcagctcat gcccttcggc       60
tgcctcctgg actatgtccg g                                                 81

<210> SEQ ID NO 33
<211> LENGTH: 74
<212> TYPE: DNA
<213> ORGANISM: Artificial Sequence
<220> FEATURE:
<223> OTHER INFORMATION: 5'phosphate.Phosphorothioate bonds betweeen
      a,g,c,t at positions 1-4.

<400> SEQUENCE: 33
agctgcatct gagctttgac aatacttgag cacggcagat ataggatgtt gcgaagggca       60
tgagctgcat gatg                                                         74

<210> SEQ ID NO 34
<211> LENGTH: 20
<212> TYPE: DNA
<213> ORGANISM: Artificial Sequence
<220> FEATURE:
<223> OTHER INFORMATION: Phosphorothioate bonds betweeen t,c and g at
      positions 1-3.

<400> SEQUENCE: 34
```

```
tcgcaacatc ctatatctgc                                          20

<210> SEQ ID NO 35
<211> LENGTH: 20
<212> TYPE: DNA
<213> ORGANISM: Artificial Sequence
<220> FEATURE:
<223> OTHER INFORMATION: Reverse primer

<400> SEQUENCE: 35
atgttgcgaa gggcatatgt                                          20
```

SIMPLIFIED POLYNUCLEOTIDE SEQUENCE DETECTION METHOD

CROSS-REFERENCE TO RELATED APPLICATIONS

This application is the U.S. national stage filing under 35 U.S.C. § 371 of International Application No. PCT/GB2020/053361, filed on Dec. 23, 2020, which is a continuation-in-part of U.S. application Ser. No. 16/911,762, filed on Jun. 25, 2020, now U.S. Pat. No. 11,332,780, and which claims the benefit of priority to GB Application No. 1919186.5, filed on Dec. 23, 2019, and EP application Ser. No. 201815131, filed on Jun. 22, 2020.

SEQUENCE LISTING

This application contains a sequence listing, submitted electronically in ASCII format under the filename Sequence_Listing.txt, which is incorporated by reference herein in its entirety. The ASCII copy of the sequence listing was created on Oct. 16, 2023, and is 9,759 bytes in size.

This invention relates to a simplified polynucleotide sequence detection method suitable for testing for the presence of a large number of diagnostic markers, including those used in the identification of cancer, infectious disease and transplant organ rejection. It is also useful for companion diagnostic testing in which a panel of markers must be identified reliably and at low cost.

The polymerase chain reaction (PCR) is a well-known and powerful technique for amplifying DNA or RNA present in laboratory and diagnostic samples to a point where they can be reliably detected and/or quantified. However, when applied for the purposes of investigating analyte samples containing low-levels of such molecules, it suffers from a number of limitations. First, whilst the technique can detect as little as a single target molecule, it is prone to generating false positive results due to unwanted amplification of other nucleic acid sequences present in the sample. This makes the choice of oligonucleotide primers used to initiate the reaction key; which in turn makes designing primers with the required level of specificity relatively complex. As a consequence, many PCR-based tests available on the market today have limited specificity.

A second drawback is that multiplexing of PCR-based methods is in practice limited to at most tens of target sequences (frequently no more than 10) with the avoidance of primer-primer interactions resulting in the need for relatively narrow operational windows.

Another issue is that, because the PCR reaction cycles in an exponential fashion, quantification of the target is difficult; small variations in the efficiency of the reaction having a huge impact on the amount of detectable material generated. Even with appropriate controls and calibrations in place, quantification is thus typically limited to an accuracy within a factor of around 3.

Finally, mutations in the region targeted for investigation by PCR amplification methods can have unwanted side effects. For example, there have been instances where FDA-approved tests have had to be withdrawn because the target organism underwent mutation in the genetic region targeted by the test primers resulting in large numbers of false negatives. Conversely, if a specific single nucleotide polymorphism (SNP) is targeted for amplification the PCR method will often give a false positive when the wild-type variant is present. Avoiding this requires very careful primer design and further limits the efficacy of multiplexing. This is particularly relevant when searching for panels of SNPs as is a common requirement in cancer testing/screening or companion diagnostics.

US2006/110765 A1 (Wang et al) teaches enzymatic cleavage at a mismatch, which is typically an inefficient and not a highly specific reaction. Moreover, off target hybridisation of the probes as disclosed in Wang et al to similar sequences in a sample would result in false positive results because of the use of cleavage at mismatches. It would also not be possible to distinguish between two different genetic variants in the same or near-neighbouring positions as they would all result in cleavage and amplification of the same probe. The teachings of Wang et al would therefore result in low sensitivity and specificity of the reaction scheme. In contrast, the technical effect of the method as disclosed by the present invention provides a fast, efficient method with high specificity to dsDNA, which can be effectively blocked by a mismatch. In addition, the method of the present invention is extremely specific to the targeted genetic variant, enabling discrimination between different variants in the same or near-neighbouring positions.

US2009/239283 A1 (Liu et al) teaches the use of non-extendable 3' ends which are removed by pyrophosphorolysis, necessitating the genetic engineering of custom polymerases capable of removing the 3' blocking modification. In contrast the present invention utilises the natural pyrophosphorolysis activity inherent in existing polymerases and does not use 3' blocking modifications. The method as disclosed in Liu et al also relies on the removal of only the terminal base from a fraction of the probe to enable subsequent amplification, and is limited to this embodiment by the use of 3' blocking modification. In contrast, the methods disclosed in the present invention enables embodiments, in which progressive removal of multiple bases from the probe is required to set off the reaction, making it substantially more robust to transient off-target annealing either to the background DNA or to other probes, which can result in the unwanted removal of the terminal base.

SUMMARY OF INVENTION

We have now developed a new simplified method which builds on our experience using the pyrophosphorolysis method employed in our earlier patent (PCT/GB2019/052017) to overcome many of these limitations. In doing so, it harnesses the double-strand specificity of pyrophosphorolysis; a reaction which will not proceed efficiently with single-stranded oligonucleotide substrates or double-stranded substrates which include blocking groups or nucleotide mismatches. The new method is faster, less complex and less expensive to run than that disclosed in PCT/GB2019/052017. Thus, according to the present invention, there is provided a method of detecting a target polynucleotide sequence in a given nucleic acid analyte, the method comprising the steps of:
 (a) introducing one or more nucleic acid analytes to a first reaction mixture comprising:
   i. a single-stranded probe oligonucleotide $A_0$;
   ii. a pyrophosphorolysing enzyme; and
   iii. a ligase
 wherein $A_0$ is pyrophosphorolysed in the 3'-5' direction from the 3' end to create at least a partially digested strand $A_1$ and $A_1$ undergoes ligation to form $A_2$;
 (b) detecting a signal derived from the products of the previous step, wherein the products are $A_2$ or a portion thereof, or multiple copies of $A_2$ or multiple copies of a portion thereof, and inferring therefrom the presence or absence of the polynucleotide target sequence in the analyte.

The analytes to which the method of the invention can be applied are those nucleic acids, such as naturally-occurring or synthetic DNA or RNA molecules, which include the target polynucleotide sequence(s) being sought. In one embodiment, the analyte will typically be present in an aqueous solution containing it and other biological material and in one embodiment the analyte will be present along with other background nucleic acid molecules which are not of interest for the purposes of the test. In some embodiments, the analyte will be present in low amounts relative to these other nucleic acid components. Preferably, for example where the analyte is derived from a biological specimen containing cellular material, prior to performing step (a) of the method some or all of these other nucleic acids and extraneous biological material will have been removed using sample-preparation techniques such as filtration, centrifuging, chromatography or electrophoresis. Suitably, the analyte is derived from a biological sample taken from a mammalian subject (especially a human patient) such as blood, plasma, sputum, urine, skin or a biopsy. In one embodiment, the biological sample will be subjected to lysis in order that the analyte is released by disrupting any cells present. In other embodiments, the analyte may already be present in free form within the sample itself; for example cell-free DNA circulating in blood or plasma.

BRIEF DESCRIPTION OF DRAWINGS

FIG. 3: The inventors have tested the method of Protocol 3 of the current invention using a range of different PPL enzymes.

FIG. 4: Results for the detection of 1% MAF, T790M, using the methods of Protocol 4 of the current invention using four different pyrophosphorolysing (PPL) enzymes: Mako, Klenow, Bsu and Bst LF.

The partially double-stranded first intermediate product undergoes pyrophosphorolysis in the presence of a pyrophosphorolysing enzyme in the 3'-5' direction from the 3' end of $A_0$ to create a partially digested strand $A_1$, the analyte and the undigested $A_0$ molecule which did not anneal to a target.

Figure 18:
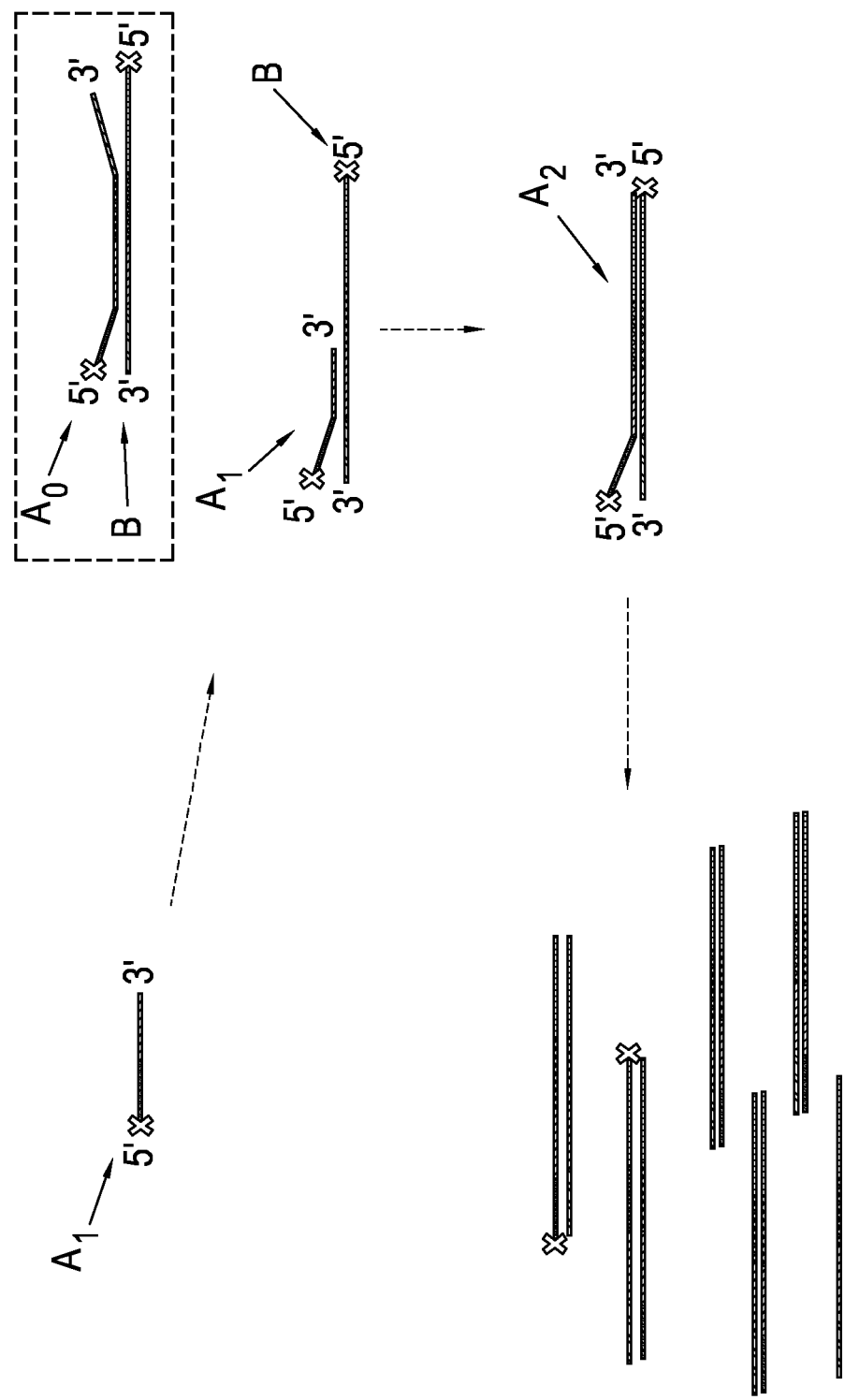

FIG. 18: $A_1$ is annealed to a single-stranded trigger oligonucleotide B and the $A_1$ strand is extended in the 5'-3' direction against B to create an oligonucleotide $A_2$. In this illustrative example, trigger oligonucleotide B has a 5' chemical block. Any undigested $A_0$ anneals to the trigger oligonucleotide B, however it is unable to be extended in the 5'-3' direction against B to generate sequences that are the targets for later parts of the method. In this example, $A_2$ is primed with at least one single-stranded primer oligonucleotide and multiple copies of $A_2$, or a region of $A_2$ are created.

Figure 19:
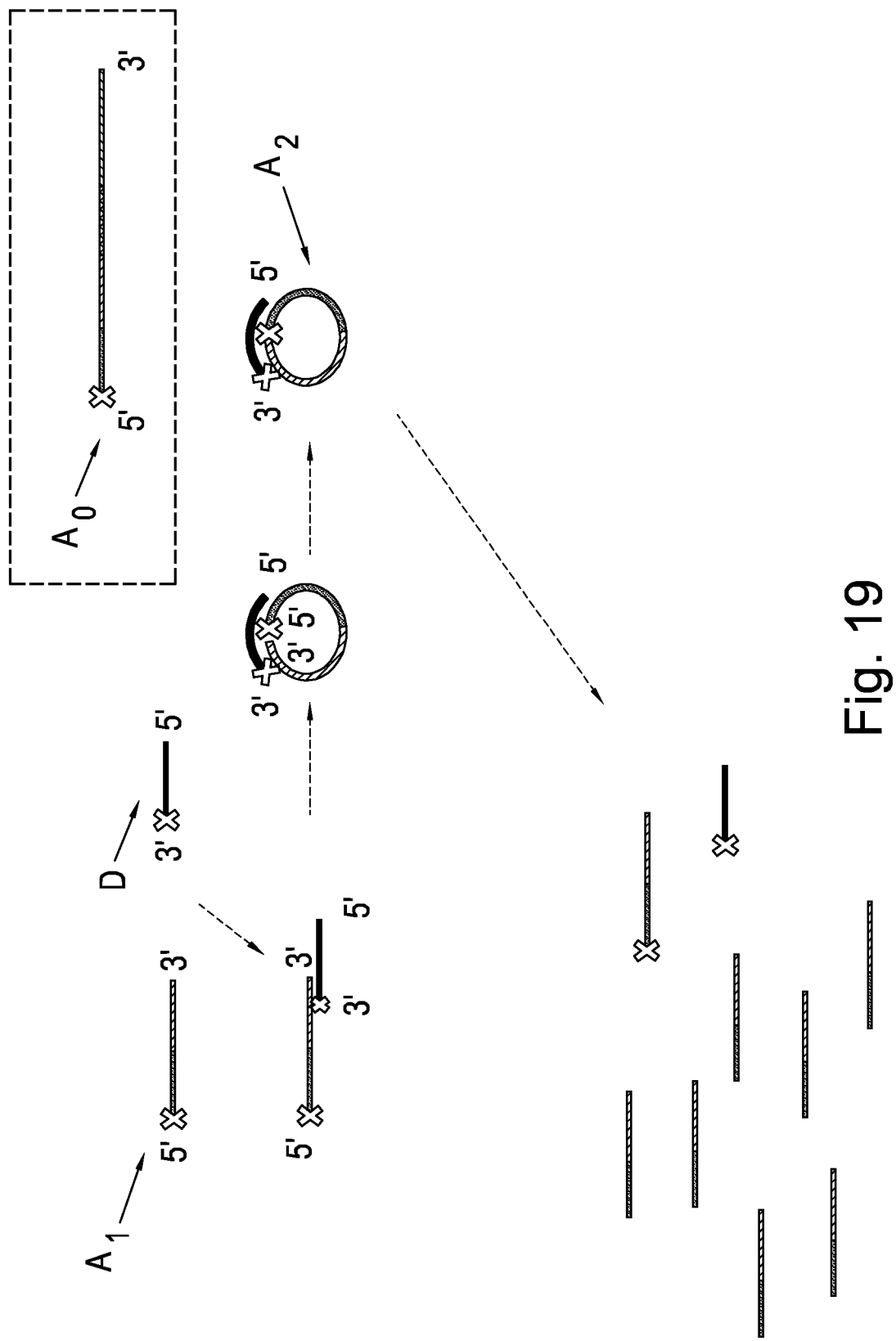

FIG. 19: $A_1$ is annealed to a splint oligonucleotide D, and then circularised by ligation of its 3' and 5' ends. The now circularised $A_2$ is primed with at least one single-stranded primer oligonucleotide and multiple copies of $A_2$, or a region of $A_2$ are created. In this illustrative example, the splint oligonucleotide D is unable to extend against $A_1$ by virtue of either a 3'-modification (chemical in this illustration) or through a nucleotide mismatch between the 3' end of D and the corresponding region of $A_2$.

Figure 20:
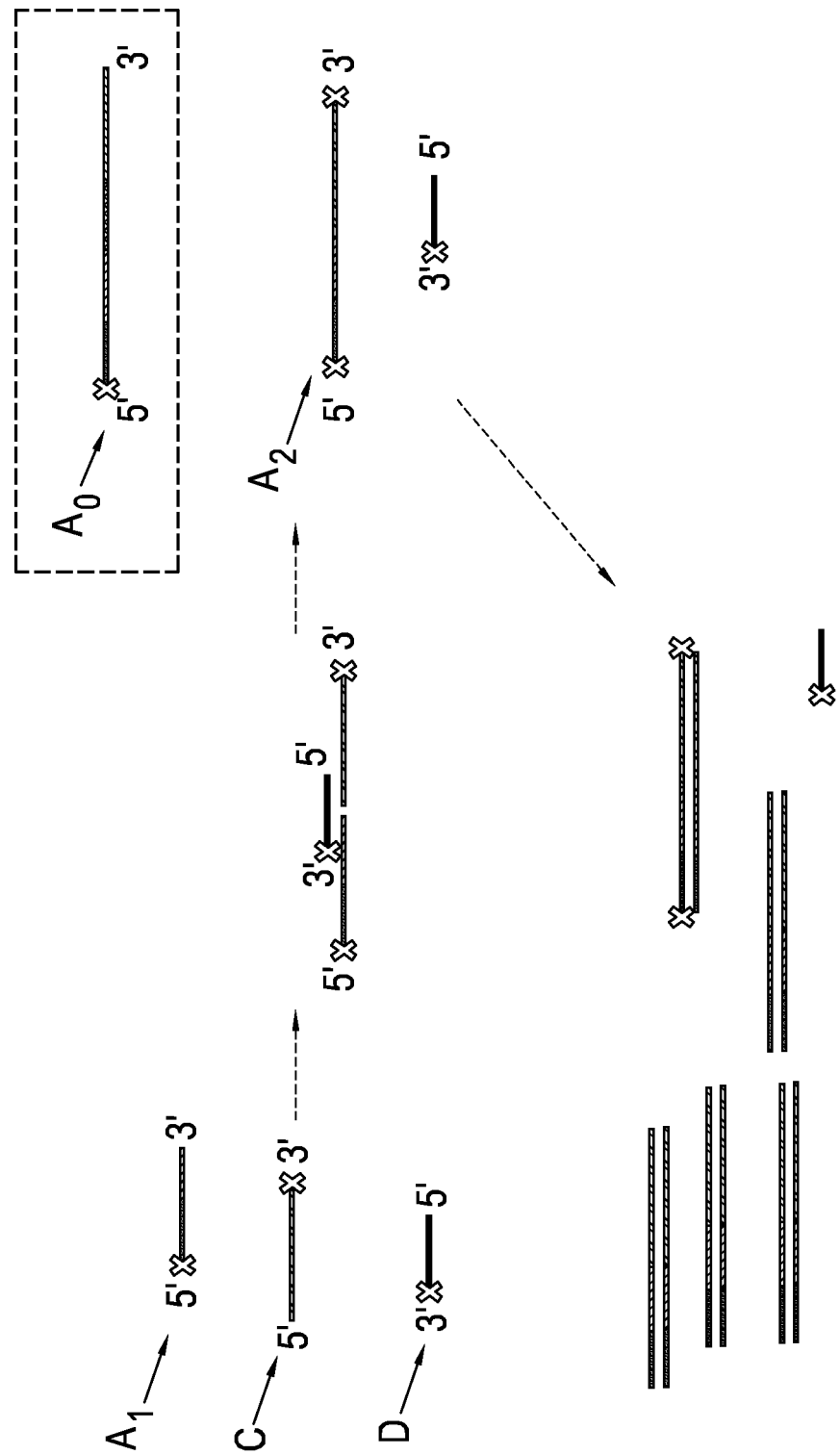

FIG. 20: The 3' region of a splint oligonucleotide D anneals to the 3' region of $A_1$ whilst the 5' region of the splint oligonucleotide D anneals to the 5' region of a ligation probe C. Thus, a second intermediate product $A_2$ is formed comprised of $A_1$, C and optionally an intermediate region formed by extension of $A_1$ in the 5'-3' direction to meet the 5' end of C. In this illustrative example, the ligation probe C has a 3' chemical blocking group so that a 3'-5' exonuclease can be used to digest any non-ligated $A_1$.

$A_2$ is primed with at least one single-stranded primer oligonucleotide and multiple copies of $A_2$, or a region of $A_2$ are created.

DESCRIPTION OF EMBODIMENTS

In an aspect of the present invention, there is provided a method of detecting a target polynucleotide sequence in a given nucleic acid analyte present in a sample, the method comprising the steps of:
(a) introducing one or more nucleic acid analytes to a first reaction mixture comprising:
 i. a single-stranded probe oligonucleotide $A_0$;
 ii. a pyrophosphorolysing enzyme; and
 iii. a ligase
wherein $A_0$ is pyrophosphorylsed in the 3'-5' direction from the 3' end to create at least a partially digested strand $A_1$ and $A_1$ undergoes ligation to form $A_2$;
(b) detecting a signal derived from the products of the previous step, wherein the products are $A_2$ or a portion thereof, or multiple copies of $A_2$ or multiple copies of a portion thereof, and inferring therefrom the presence or absence of the polynucleotide target sequence in the analyte.

In some embodiments, the first reaction mixture further comprises a source of pyrophosphate ions.

In some embodiments, the 3' end of $A_0$ is perfectly complementary to the target polynucleotide sequence.

In some embodiments, the ligase is substantially lacking in single-strand ligation activity.

In some embodiments, the first reaction mixture further comprises at least one single-stranded primer oligonucleotide that is substantially complementary to a portion of $A_0$ and deoxyribonucleotide triphosphates (dNTPs).

In some embodiments, the first reaction mixture further comprises an amplification enzyme.

In some embodiments, the products of step (a) are introduced to a second reaction mixture prior to step (b), said second reaction mixture comprising at least one single-stranded primer oligonucleotide and dTNPs.

In some embodiments, the second reaction mixture further comprises an amplification enzyme.

In some embodiments, one or more nucleic acid analytes may be introduced to a first and second reaction mixture concurrently.

In some embodiments, one or more nucleic acid analytes may be introduced to a first and second reaction mixture consecutively.

In some embodiments, the dNTPs are hot start dNTPs.

Hot start dNTPs are dNTPs which are modified with a thermolabile protecting group at the 3' terminus. The presence of this modification blocks DNA polymerase nucleotide incorporation until the nucleotide protecting group is removed using a heat activation step.

In some embodiments, during step (a) the analyte anneals to the single-stranded probe oligonucleotide $A_0$ to create a first intermediate product which is at least partially double-stranded and in which the 3' end of $A_0$ forms a double-stranded complex with the analyte target sequence.

In some embodiments, during step (a) the first intermediate product is pyrophosphorolysed in the 3'-5' direction from the 3' end of $A_0$ to create partially digested strand $A_1$ and the analyte.

In some embodiments, the first reaction mixture further comprises a ligation probe oligonucleotide C and the partially digested strand $A_1$ is ligated at the 3' end to the 5' end of C to create an oligonucleotide $A_2$.

In some embodiments, the partially digested strand $A_1$ is circularised through ligation of its 3' and 5' ends to create oligonucleotide $A_2$.

In some embodiments, the ligation of $A_1$ occurs:
 during step (a); or
 during step (b); or
 inbetween steps (a) and (b).

In some embodiments, the first reaction mixture further comprises a 5'-3' exonuclease and the 5' end of $A_0$ is rendered resistant to 5'-3' exonuclease digestion.

In some embodiments, after amplification of the given nucleic acid analyte and prior to addition of the first reaction mixture (step (a)), the sample is further treated with a proteinase.

In some embodiments, the first reaction mixture further comprises a phosphatase or phosphohydrolase.

In some embodiments, prior to or during step (b) the products of the previous step are treated with a pyrophosphatase.

In some embodiments, prior to or during step (b) the products of the previous step are treated with an exonuclease.

In some embodiments, the oligonucleotide C further comprises a 3' or internal modification protecting it from 3'-5' exonuclease digestion.

In some embodiments, the oligonucleotide C further comprises a 5' modification protecting it from 5'-3' exonuclease digestion.

In some embodiments, the first or second reaction mixture further comprises a splint oligonucleotide D.

In some embodiments, D comprises an oligonucleotide region complementary to the 3' end of $A_1$ and a region complementary to either the 5' end of oligonucleotide C or to the 5' end of $A_1$.

In some embodiments, D is unable to undergo extension against $A_1$ by virtue of either a 3' modification or through a mismatch between the 3' end of D and the corresponding region of $A_1$.

In some embodiments, the enzyme which performs pyrophosphorolysis of $A_0$ to form partially digested strand $A_1$ also amplifies $A_2$.

In some embodiments, detection is achieved using one or more oligonucleotide fluorescent binding dyes or molecular probes.

In some embodiments, an increase in signal over time resulting from the generation of amplicons of $A_2$ is used to infer the concentration of the target sequence in the analyte.

In some embodiments, multiple probes $A_0$ are employed, each selective for a different target sequence and each including an identification region, and further characterised in that the amplicons derived from $A_2$ include this identification region and therefore the target sequences present in the analyte are inferred through the detection of the identification region(s).

In some embodiments, detection of the identification regions(s) is carried out using molecular probes or through sequencing.

In some embodiments, the final step of the method further comprises the steps of:
  i. labelling the products of step (b) using one or more oligonucleotide fluorescent binding dyes or molecular probes;
  ii. measuring the fluorescent signal of the products;
  iii. exposing the products to a set of denaturing conditions; and
identifying the polynucleotide target sequence in the analyte by monitoring changes in the fluorescent signal of the products during exposure to the denaturing conditions.

In some embodiments, the one or more nucleic acid analytes are split into multiple reaction volumes, each volume having a one or more probe oligonucleotide $A_0$, introduced to detect different target sequences.

In some embodiments, the different probes $A_0$ comprise common priming sites, allowing a single primer or single set of primers to be used for amplification of a region of $A_2$.

In some embodiments, there is provided a method of detecting a target polynucleotide sequence in a given nucleic acid analyte present in a sample, the method comprising the steps of:
  (a) amplifying a given nucleic acid analyte present in the sample;
  (b) introducing the products of step (a) to a first reaction mixture comprising:
    i. a single-stranded probe oligonucleotide $A_0$;
    ii. a pyrophosphorolysing enzyme; and
    iii. a ligase
  wherein $A_0$ is pyrophosphorylsed in the 3'-5' direction from the 3' end to create at least a partially digested strand $A_1$ and $A_1$ undergoes ligation to form $A_2$;
  (c) detecting a signal derived from the products of the previous step, wherein the products are $A_2$ or a portion thereof, or multiple copies of $A_2$ or multiple copies of a portion thereof, and inferring therefrom the presence or absence of the polynucleotide target sequence in the analyte.

According to the present invention, there are provided methods of detecting a target polynucleotide sequence in a given nucleic acid analyte. The analytes to which the various methods of the invention can be applied may be prepared from the biological sample mentioned above by a series of preliminary steps designed to amplify the analyte and separate if from the background genomic DNA which is typically present in significant excess. This method is generally applicable to the production of single-stranded target analytes and is therefore useful in situations other than when it is integrated with or further comprises part of the method of the first aspect of the invention. Accordingly, there is provided a method for preparing at least one single-stranded analyte of a nucleic acid comprised of a target polynucleotide region characterised by the steps of (1) producing amplicons of the analyte(s) by subjecting a biological sample comprised of the analyte(s) and optionally background genomic DNA to cycles of amplification. In one preferred embodiment amplification is carried out using the polymerase chain reaction (PCR) in the presence of a polymerase, nucleoside triphosphates and at least one corresponding primer pair wherein one of the primers includes a 5'-3' exonuclease blocking group and (2) optionally digesting the product of step (1) with an exonuclease having 5'-3' exonucleolytic activity. In one embodiment, the method may further comprise (3) reacting the product of step (2) with a proteinase to destroy the polymerase and thereafter (4) deactivating the proteinase by heating the product of step (3) to a temperature in excess of 50° C.

In one preferred embodiment steps (1) to (4) are carried out prior to step (a) of the method of the first aspect of the invention to produce an integrated method of detecting target sequences derived from a biological sample. In another embodiment, the biological sample has undergone cell lysis before step (1) is carried out.

In some embodiments of step (1) the nucleoside triphosphates are a mixture of the four deoxynucleoside triphosphates characteristic of naturally occurring DNA. In a preferred embodiment the mixture of deoxynucleoside triphosphates comprise deoxyuridine triphosphate (dUTP) instead of deoxythymidine triphosphate (dTTP) and step (1) is further carried out in the presence of the enzyme dUTP-DNA glycolase (UDG) to remove any contaminating amplicons from previous assays. In yet another embodiment, a high fidelity polymerase is used in step (1) for example one of those sold under the trade name Phusion® or Q5. In yet another embodiment, the polymerase may be KAPA HiFi Uracil+ DNA Polymerase.

High-fidelity DNA polymerases have several safeguards to protect against both making and propagating mistakes while copying DNA. Such enzymes have a significant binding preference for the correct versus the incorrect nucleoside triphosphate during polymerization. If an incorrect nucleotide does bind in the polymerase active site, incorporation is slowed due to the sub-optimal architecture of the active site complex. This lag time increases the opportunity for the incorrect nucleotide to dissociate before polymerase progression, thereby allowing the process to start again, with a correct nucleoside triphosphate. If an incorrect nucleotide is inserted, proofreading DNA polymerases have an extra line of defense. The perturbation caused by the mispaired bases is detected, and the polymerase moves the 3' end of the growing DNA chain into a proofreading 3'→5' exonuclease domain. There, the incorrect nucleotide is removed by the 3'→5' exonuclease activity, whereupon the chain is moved back into the polymerase domain, where polymerization can continue.

In some embodiments, the nucleoside triphosphates are a mixture of synthetic or modified deoxynucleoside triphosphates. 25

In some embodiments, the nucleoside triphosphates are a mixture of the four deoxynucleoside triphosphates and synthetic or modified deoxynucleotide triphosphates.

In some embodiments, step (1) is carried out using a limited amount of primer and an excess of amplification cycles. By this means a fixed amount of amplicons is produced regardless of the initial amount of analyte. Thus the need for analyte quantification prior to subsequent steps is avoided. In another embodiment of step (1), which has the advantage of obviating the need for step (2), amplification is carried out in the presence of a primer pair where one of the two primers is present in excess of the other, resulting in generation of single-stranded amplicons once one primer is fully utilised.

In one preferred embodiment of step (2), the 5' primer is blocked with an exonuclease blocking group selected from phosphorothioate linkages, inverted bases, DNA spacers and other oligonucleotide modifications commonly known in the art. In another embodiment the other primer in the pair has a phosphate group at its 5'end.

In some embodiments, in step (3) the proteinase employed is proteinase K and step (4) is carried out by heating to a temperature of 80 to 100° C. for up to 30 minutes. In one embodiment, in step (3) the proteinase employed is proteinase K, step (3) is carried out by heating to a temperature of 55° C. for 5 minutes and step (4) is carried out by heating to a temperature of 95° C. for 10 minutes. In another embodiment at some point after step (2) the reaction medium is treated with a phosphatase or phosphohydrolase to remove any residual nucleoside triphosphates which may be present.

In some embodiments, the target polynucleotide sequence in the analyte will be a gene or chromosomal region within the DNA or RNA of a cancerous tumour cell and will be characterised by the presence of one or more mutations; for example in the form of one or more single nucleotide polymorphisms (SNPs). Thus the invention will be useful in the monitoring of and/or treatment for disease recurrence. Patients who have been declared free of disease following treatment may be monitored over time to detect the recurrence of disease. This needs to be done non-invasively and requires sensitive detection of target sequences from blood samples. Similarly, for some cancers there are residual cancer cells that remain in a patient after treatment. Monitoring of the levels of these cells (or cell free DNA) present in the patient's blood, using the current invention, allows detection of recurrence of disease or failure of current therapy and the need to switch to an alternative.

In some embodiments, detection of the target polynucleotide sequence will allow repeated testing of patient samples during treatment of disease to allow early detection of developed resistance to therapy. For example, epidermal growth factor receptor (EGFR) inhibitors, such as gefitinib, erlotinib, are commonly used as first line treatments for non-small cell lung cancer (NSCLC). During treatment the tumour will often develop mutations in the EGFR gene (e.g T790M, C797S) which confer resistance to the treatment. Early detection of these mutations allows transfer of the patient onto alternative therapies.

In some embodiments, the target polynucleotide sequence in the analyte will be a gene or chromosomal region within the DNA or RNA of fetal origin and will be characterised by the presence of one or more mutations; for example in the form of one or more single nucleotide polymorphisms (SNPs). Thus, the invention may be used to detect mutations at very low allele fractions, at an earlier stage of pregnancy than other available testing techniques.

In another embodiment, the target polynucleotide sequence may be a gene or genomic region derived from an otherwise healthy individual but the genetic information obtained may assist in generating valuable companion diagnostic information allowing medical or therapeutic conclusions to be drawn across one or more defined groups within the human population.

In yet another embodiment, the target polynucleotide sequence may be characteristic of an infectious disease, or of resistance of an infectious disease to treatment with certain therapies; for example a polynucleotide sequence characteristic of a gene or chromosomal region of a bacterium or a virus, or a mutation therein conferring resistance to therapy.

In some embodiments, the target polynucleotide sequence may be characteristic of donor DNA. When a transplanted organ is rejected by the patient, the DNA from this organ is shed into the patient's bloodstream. Early detection of this DNA would allow early detection of rejection. This could be achieved using custom panels of donor-specific markers, or by using panels of variants known to be common in the population, some of which will be present in the donor and some in the recipient. Routine monitoring of organ recipients over time is thus enabled by the claimed method.

In yet another embodiment, various versions of the method using different combinations of probes (see below) are employed in parallel so that the analyte can be simultaneously screened for multiple target sequences; for example sources of cancer, cancer indicators or multiple sources of infection. In this approach, the amplified products obtained in by parallel application of the method are contacted with a detection panel comprised of one or more oligonucleotide binding dyes or sequence specific molecular probes such as a molecular beacon, hairpin probe or the like. Thus, in another aspect of the invention there is provided the use of at least one probe and optionally one ligation oligonucleotide in combination with one or more chemical and biological probes selective for the target polynucleotide sequences or with the use of sequencing to identify the amplified probe regions.

In some embodiments, the single-stranded probe oligonucleotide $A_0$ comprises a priming region and a 3' end which is complementary to the target polynucleotide sequence to be detected. By this means, a first intermediate product is created which is at least partially double-stranded. In one embodiment, this step is carried out in the presence of excess $A_0$ and in an aqueous medium containing the analyte and any other nucleic acid molecules.

During step (a), the double-stranded region of the first intermediate product is pyrophosphorolysed in the 3'-5' direction from the 3' end of its $A_0$ strand. As a consequence, the $A_0$ strand is progressively digested to create a partially digested strand; hereinafter referred to as $A_1$. Where the probe oligonucleotide erroneously hybridises with a non-target sequence, the pyrophosphorolysis reaction will stop at any mismatches, preventing subsequent steps of the method from proceeding. In another embodiment, this digestion continues until $A_1$ lacks sufficient complementarity with the analyte or a target region therein to form a stable duplex. At this point, the various strands then separate by melting, thereby producing $A_1$ in single-stranded form. Under typical pyrophosphorolysis conditions, this separation occurs when there are between 6 and 20 complementary nucleotides between the analyte and $A_0$.

In another embodiment, the digestion continues until $A_1$ lacks sufficient complementarity with the analyte or target region therein for the pyrophosphorolysing enzyme to bind or for the pyrophosphorolysing reaction to continue. This typically occurs when there are between 6 and 20 complementary nucleotides remaining between the analyte and probe. In some embodiments, this occurs when there are between 6 and 40 complementary nucleotides remaining.

In another embodiment, in which a splint oligonucleotide D having complementarity to the 5' and 3' ends of $A_1$ is employed (see below), the digestion continues until the length of complementarity between $A_1$ and the target is reduced to the point at which it is energetically favourable for oligo D to displace the analyte molecule from $A_1$. This typically occurs when the region of complementarity between $A_1$ and the analyte molecule is of similar or shorter length than the region of complementarity between oligo D and the 3' end of $A_1$, but may also occur when the complementarity between $A_1$ and the analyte molecule is longer than this due to the favourability of intra-molecular hybridisation of the oligo D, which may already be hybridised to the 5' end of $A_1$.

Figure 16:
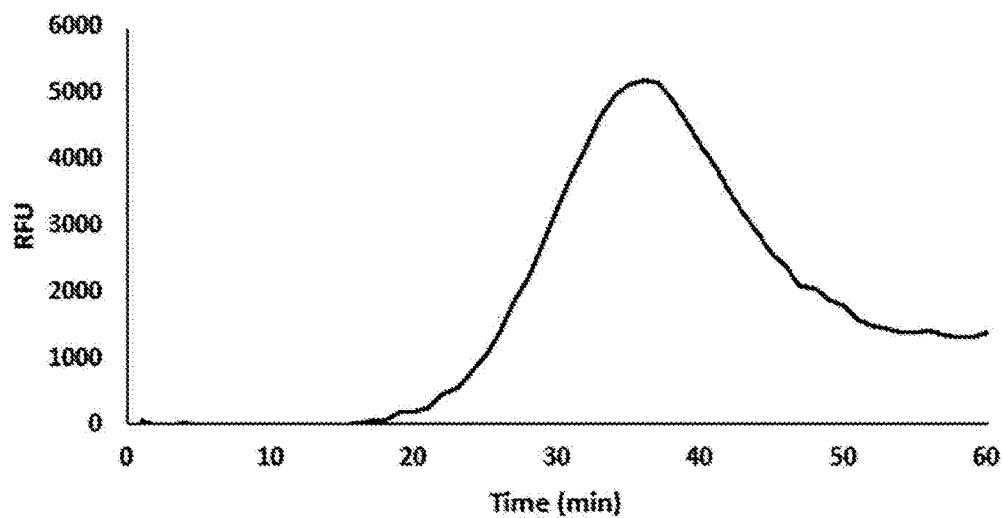
FIG. 16: Fluorescence measurement results for Example 14 showing results from an embodiment wherein pyrophosphorolysis of $A_0$ to form $A_1$ occurs followed by circularisation of $A_1$ to form $A_2$ against a target sequence.

In another embodiment, in which the ligation of $A_1$ is performed using the analyte molecule as a splint (see FIG. 16), the digestion continues until the 5' end of $A_1$ is able to hybridise to the analyte molecule such that the 3' and 5' ends of $A_1$ are neighbouring and are separated only by a nick, at which point they are ligated together by the ligase and digestion is no longer able to proceed.

Suitably, pyrophosphorolysis is carried out in the reaction medium at a temperature in the range 20 to 90° C. in the presence of at least a polymerase exhibiting pyrophosphorolysis activity and a source of pyrophosphate ion. Further information about the pyrophosphorolysis reaction as applied to the digestion of polynucleotides can be found for example in J. Biol. Chem. 244 (1969) pp. 3019-3028 or our earlier patent application.

In some embodiments, the pyrophosphorolysis step is driven by the presence of a source of excess polypyrophosphate, suitable sources including those compounds containing 3 or more phosphorous atoms.

In some embodiments, the first reaction mixture comprises a source of excess polypyrophosphate.

In some embodiments, the pyrophosphorolysis step is driven by the presence of a source of excess modified pyrophosphate. Suitable modified pyrophosphates include those with other atoms or groups substituted in place of the bridging oxygen, or pyrophosphate (or poly-pyrophosphate) with substitutions or modifying groups on the other oxygens. The person skilled in the art will understand that there are many such examples of modified pyrophosphate which would be suitable for use in the current invention, a non-limiting selection of which are:

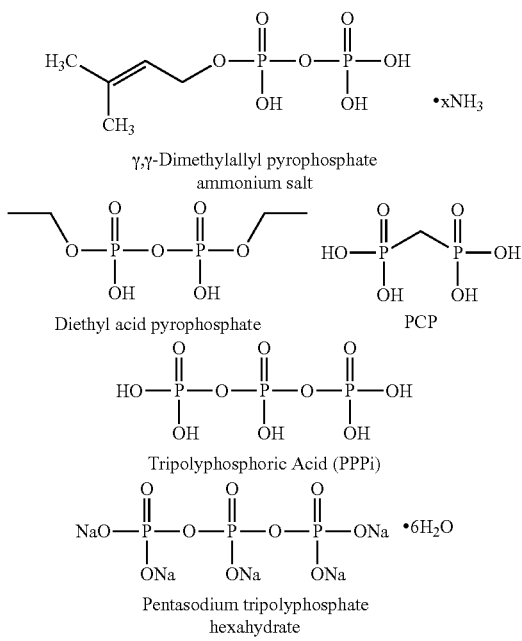

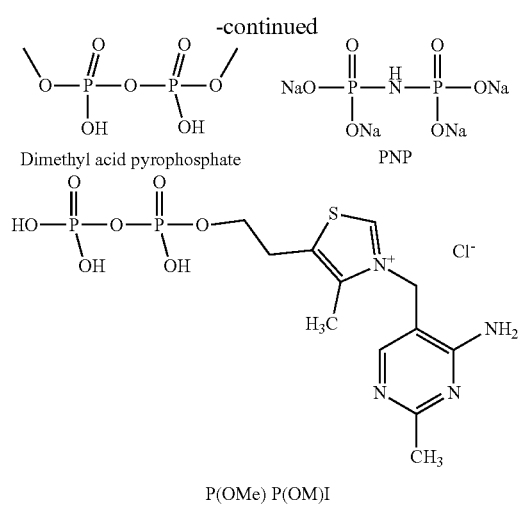

In some embodiments, the first reaction mixture comprises a source of excess modified polypyrophosphate.

In one preferred embodiment, the source of pyrophosphate ion is PNP, PCP or Tripolyphoshoric Acid (PPPi).

Further, but not limiting, examples of sources of pyrophosphate ion for use in the pyrophosphorolysis step (b) may be found in WO2014/165210 and WO00/49180.

In some embodiments, the source of excess modified pyrophosphate can be represented as Y—H wherein Y corresponds to the general formula $(X—O)_2P(=B)—(Z—P(=B)(O—X))_n$— herein n is an integer from 1 to 4; each Z— is selected independently from —O—, —NH— or —$CH_2$—; each B is independently either O or S; the X groups are independently selected from —H, —Na, —K, alkyl, alkenyl, or a heterocyclic group with the proviso that when both Z and B correspond to —O— and when n is 1 at least one X group is not H.

In some embodiments, Y corresponds to the general formula $(X—O)_2P(=B)—(Z—P(=B)(O—X))_n$— wherein n is 1, 2, 3 or 4. In another embodiment, the Y group corresponds to the general formula $(X—O)_2P(=O)—Z—P(=O)(O—H)$— wherein one of the X groups is —H. In yet another preferred embodiment, Y corresponds to the general formula $(X—O)_2P(=O)—Z—P(=O)(O—X)$— wherein at least one of the X groups is selected from methyl, ethyl, allyl or dimethylallyl.

In an alternative embodiment, Y corresponds to either of the general formulae $(H—O)_2P(=O)—Z—P(=O)(O—H)$— wherein Z is either —NH— or —$CH_2$— or $(X—O)_2P(=O)—Z—P(=O)(O—X)$— wherein the X groups are all either —Na or —K and Z is either —NH— or —$CH_2$—.

In another embodiment, Y corresponds to the general formula $(H—O)_2P(=B)—O—P(=B)(O—H)$— wherein each B group is independently either O or S, with at least one being S.

Specific examples of preferred embodiments of Y include those of the formula $(X1-O)(HO)P(=O)—Z—P(=O)(O—X2)$ wherein Z is O, NH or $CH_2$ and (a) X1 is γ,γ-dimethylallyl, and X2 is —H; or (b) X1 and X2 are both methyl; or (c) X1 and X2 are both ethyl; or (d) X1 is methyl and X2 is ethyl or vice versa.

In some embodiments, where molecular probes are to be used for detection, the probe oligonucleotide $A_0$ is configured to include an oligonucleotide identification region on the 5' side of the region complementary to the target sequence, and the molecular probes employed are designed to anneal to this identification region. In one embodiment, only the 3' region of $A_0$ is able to anneal to the target; i.e. any other regions lack sufficient complementarity with the analyte for a stable duplex to exist at the temperature at which the pyrophosphorolysis step is carried out. Here and throughout, by the term 'sufficient complementarity' is meant that, to the extent that a given region has complementarity with a given region on the analyte, the region of complementarity is more than 10 nucleotides long.

In a further aspect of the methods of the invention there is provided alternate embodiments in which the phosphorolysis step of any previous embodiment is replaced with an exonuclease digestion step using a double-strand specific exonuclease. The person skilled in the art will understand that double-strand specific exonucleases include those that read in the 3'-5' direction, such as ExoIII, and those that read in the 5'-3' direction, such as Lambda Exo, amongst many others.

In some embodiments of the invention wherein the exonuclease digestion step utilises a double strand-specific 5'-3' exonuclease, it is the 5' end of $A_0$ that is complementary to the target analyte and the common priming sequence and blocking group are located on the 3' side of the region complementary to the target. In a further embodiment, where molecular probes are to be used for detection the probe oligonucleotide $A_0$ is configured to include an oligonucleotide identification region on the 3' side of the region complementary to the target sequence, and the molecular probes employed are designed to anneal to this identification region.

In embodiments of the invention wherein the exonuclease digestion step utilises a double strand-specific 5'-3' exonuclease, an exonuclease having 3' to 5' exonucleolytic activity can optionally be added to the first reaction mixture for the purpose of digesting any other nucleic acid molecules present whilst leaving $A_0$ and any material comprising partially digested strand $A_1$ intact. Suitably, this resistance to exonucleolysis is achieved as described elsewhere in this application.

In one preferable embodiment of the invention, the 5' end of $A_0$ or an internal site on the 5' side of the priming region is rendered resistant to exonucleolysis. By this means and after, or simultaneously with, the pyrophosphorolysis step, an exonuclease having 5'-3' exonucleolytic activity can optionally be added to the reaction medium for the purpose of digesting any other nucleic acid molecules present whilst leaving $A_0$ and any material comprising the partially digested strand $A_1$ intact. Suitably, this resistance to exonucleolysis is achieved by introducing one or more blocking groups into the oligonucleotide $A_0$ at the required point. In one embodiment, these blocking groups may be selected from phosphorothioate linkages and other backbone modifications commonly used in the art, C3 spacers, phosphate groups, modified bases and the like.

In some embodiments, the identification region will comprise or have embedded within a barcoding region which has a unique sequence and is adapted to be indirectly identified using a sequence-specific molecular probe applied to the amplified components $A_2$ or directly by the sequencing of these components. Examples of molecular probes which may be used include, but are not limited to, molecular beacons, TaqMan® probes, Scorpion® probes and the like.

In some embodiments the $A_2$ strand or a desired region thereof is caused to undergo amplification so that multiple, typically many millions, of copies are made. This is achieved by priming a region of $A_2$ and subsequently any amplicons derived therefrom with single-stranded primer oligonucleotides, provided for example in the form of a forward/reverse or sense/antisense pair, which can anneal to a complementary region thereon. The primed strand then becomes the point of origin for amplification. Amplification methods include, but are not limited to, thermal cycling and isothermal methods such as the polymerase chain reaction, recombinase polymerase amplification and rolling circle amplification; the last of these being applicable when $A_2$ is circularised. By any of these means, many amplicon copies of a region of $A_2$ and in some instances its sequence complement can be rapidly created. The exact methodologies for performing any of these amplification methods will be well-known to one of ordinary skill and the exact conditions and temperature regimes employed are readily available in the general literature to which the reader is directed. Specifically, in the case of the polymerase chain reaction (PCR), the methodology generally comprises extending the primer oligonucleotide against the $A_2$ strand in the 5'-3' direction using a polymerase and a source of the various single nucleoside triphosphates until a complementary strand is produced; dehybridising the double-stranded product produced to regenerate the $A_2$ strand and the complementary strand; re-priming the $A_2$ strand and any of its amplicons and thereafter repeating these extension/dehybridisation/repriming steps multiple times to build-up a concentration of $A_2$ amplicons to a level where they can be reliably detected.

In an alternative embodiment, the first or second reaction mixtures further comprises components for the hybridisation chain reaction (HCR).

In some embodiments, the first reaction mixture further comprises a ligation probe oligonucleotide C which has a 5' phosphate, a splint oligonucleotide D which is complementary to the 3' end of $A_1$ and the 5' end of C, and the partially digested strand $A_1$ is ligated at the 3' end to the 5' end of C to form oligonucleotide $A_2$. In some embodiments, the second reaction mixture further comprises hairpin oligonucleotide 1 (HO1) and hairpin oligonucleotide 2 (HO2), each of which comprises a fluorophore and quencher such that when each oligonucleotide remains in a hairpin configuration the fluorophore and quencher are in contact with each other. HO1 is designed such that $A_2$ anneals to it, opening the 'hairpin' structure and separating the fluorophore from the quencher. The now 'open' HO1 is now able to anneal to HO2, opening the 'hairpin' structure and separating the fluorophore from the quencher.

In some embodiments, there are a plurality of hairpin oligonucleotides present such that the presence of one $A_2$ is able to cause a chain reaction of hairpin oligonucleotide opening resulting in the generation of a detectable fluorescent signal. This methodology is known in the literature as the Hybridisation Chain Reaction (HCR).

In some embodiments, the fluorophore of the fluorophore-quencher pair is selected from, but not limited to, dyes of the fluorescein family, the carboxyrhodamine family, the cyanine family, and the rhodamine family. Other families of dyes that can be used include, e.g., polyhalofluorescein-family dyes, hexachlorofluorescein-family dyes, coumarin-family dyes, oxazine-family dyes, thiazine-family dyes, squaraine-family dyes, chelated lanthanide-family dyes, the family of dyes available under the trade designation Alexa Fluor J, from Molecular Probes, the family of dyes available under the trade designation Atto from ATTO-TEC (Siegen, Germany) and the family of dyes available under the trade designation Bodipy J, from Invitrogen (Carlsbad, Calif.). Dyes of the fluorescein family include, e.g., 6-carboxyfluorescein (FAM), 2',4', 1,4,-tetrachlorofluorescein (TET), 2',4', 5',7',1,4-hexachlorofluorescein (HEX), 2',7'-dimethoxy-4',5'-dichloro-6-carboxyrhodamine (JOE), 2'-chloro-5'-fluoro-7',8'-fused phenyl-1,4-dichloro-6-carboxyfluorescein (NED), 2'-chloro-7'-phenyl-1,4-dichloro-6-carboxyfluorescein (VIC), 6-carboxy-X-rhodamine (ROX), and 2',4',5',7'-tetrachloro-5-carboxy-fluorescein (ZOE). Dyes of the carboxyrhodamine family include tetramethyl-6-carboxyrhodamine (TAMRA), tetrapropano-6-carboxyrhodamine (ROX), Texas Red, R110, and R6G. Dyes of the cyanine family include Cy2, Cy3, Cy3.5, Cy5, Cy5.5, and Cy7. Fluorophores are readily available commercially from, for instance, Perkin-Elmer (Foster City, Calif.), Molecular Probes, Inc. (Eugene, Oreg.), and Amersham GE Healthcare (Piscataway, N.J.).

In some embodiments, the quencher of the fluorophore-quencher pair may be a fluorescent quencher or a non-fluorescent quencher. Fluorescent quenchers include, but are not limited to, TAMRA, ROX, DABCYL, DABSYL, cyanine dyes including nitrothiazole blue (NTB), anthraquinone, malachite green, nitrothiazole, and nitroimidazole compounds. Exemplary non-fluorescent quenchers that dissipate energy absorbed from a fluorophore include those available under the trade designation Black Hole™ from Biosearch Technologies, Inc. (Novato, Calif.), those available under the trade designation Eclipse™. Dark, from Epoch Biosciences (Bothell, Wash.), those available under the trade designation Qx1J, from Anaspec, Inc. (San Jose, Calif.), those available under the trade designations ZEN and TAO from Integrated DNA Technologies (Coralville, Iowa) and those available under the trade designation Iowa Black™ from Integrated DNA Technologies (Coralville, Iowa).

In some embodiments, the fluorophore of the fluorophore-quencher pair may be fluorescein, Lucifer Yellow, B-phycoerythrin, 9-acridineisothiocyanate, Lucifer Yellow VS, 4-acetamido-4'-isothio-cyanatostilbene-2,2'-disulfonic acid, 7-diethylamino-3-(4'-isothiocyanatophenyl)-4-methylcoumarin, succinimdyl 1-pyrenebutyrate, and 4-acetamido-4'-isothiocyanatostilbene-2-,2'-disulfonic acid derivatives.

In some embodiments, the fluorophore of the fluorophore-quencher pair may be LC-Red 640, LC-Red 705, Cy5, Cy5.5, Lissamine rhodamine B sulfonyl chloride, tetramethyl rhodamine isothiocyanate, rhodaminexisothiocyanate, erythrosine isothiocyanate, fluorescein, diethylenetriamine pentaacetate or other chelates of Lanthanide ions (e.g., Europium, or Terbium).

In some embodiments, the invention utilises fluorescently labelled oligonucleotides that are double quenched. The inclusion of a second, internal quencher shortens the distance between the dye and quencher and, in concert with the first quencher, provides greater overall dye quenching, lowering background and increasing signal detection. The second and first quenchers may be any of the quenchers previously described.

In some embodiments, the first reaction mixture further comprises a ligation probe oligonucleotide C which has a 5' phosphate, a splint oligonucleotide D which is complementary to the 3' end of $A_1$ and the 5' end of C, and the partially digested strand $A_1$ is ligated at the 3' end to the 5'end of C to form oligonucleotide $A_2$.

In some embodiments, the 5' and 3' ends of $A_1$ are ligated together to form a circularised $A_2$.

In some embodiments, $A_1$ is circularised to form $A_2$ against a ligation probe oligonucleotide C.

In some embodiments, $A_1$ is circularised to form $A_2$ against the target sequence.

In some embodiments, $A_1$ is circularised to form $A_2$ as previously or subsequently, described.

In some embodiments, $A_2$ is formed from partially digested strand $A_1$ as previously, or subsequently, described.

In some embodiments, the second reaction mixture further comprises:
an oligonucleotide A comprising a substrate arm, a partial catalytic core and a sensor arm;
an oligonucleotide B comprising a substrate arm, a partial catalytic core and a sensor arm; and
a substrate comprising a fluorophore-quencher pair;
wherein the sensor arms of oligonucleotides A and B are complementary to flanking regions of $A_2$ such that in the presence of $A_2$ oligonucleotides A and B are combined to form a catalytically, multicomponent nucleic acid enzyme (MNAzyme). In this embodiment, the MNAzyme is formed only in the presence of $A_2$ and cleaves the substrate comprising a fluorophore-quencher pair such that a detectable fluorescent signal is generated.

In some embodiments, the fluorophore-quencher pair may be as described previously. In some embodiments, the first and second reaction mixtures are combined.

In some embodiments, the first and second reaction mixtures are combined such that pyrophosphorolysis, ligation and the generation of a detectable fluorescent signal occurs without the addition of further reagents.

In an alternative embodiment, the second reaction mixture further comprises one or more DNAzymes.

In some embodiments, the second reaction mixture further comprises a partially double-stranded nucleic acid construct wherein:
one strand comprises at least one RNA base, at least one fluorophore and wherein a region of this strand is complementary to a region of $A_2$ and wherein this strand may be referred to as the 'substrate' strand;
the other stand comprises at least one quencher and wherein a region of this strand is complementary to a region of $A_2$ adjacent to that which the substrate strand is complementary to, such that in the presence of $A_2$ the partially stranded nucleic acid construct becomes substantially more double-stranded;
wherein in the process of becoming substantially more double-stranded the substrate strand of the double-stranded nucleic acid construct is cut at the RNA base, resulting in fluorescence due to the at least one quencher of the 'other' strand no longer being in close enough proximity to that of the at least one fluorophore of the substrate strand.

In other words, the partially double stranded nucleic acid construct, in the presence of $A_2$, has a double-stranded portion which is greater in size.

In some embodiments, the fluorophore-quencher pair may be as described previously.

In some embodiments, further reagents such as suitable buffers and/or ions are present in the second reaction mixture.

In some embodiments, the second reaction mixture further comprises $Mg^{2+}$ ions.

In some embodiments, the second reaction mixture further comprises $Zn^{2+}$ ions.

In some embodiments, the second reaction mixture further comprises $X^{2+}$ ions, wherein X is a metal.

In some embodiments, the second reaction mixture further comprises one or more $X^{2+}$ ions, wherein X is a metal.

In an alternative embodiment, the first reaction mixture further comprises reagents for the ligase chain reaction (LCR).

In such an embodiment, the first reaction mixture further comprises:
one or more ligases; and
two or more LCR probe oligonucleotides that are complementary to adjacent sequences on $A_2$, wherein when the probes are successfully annealed to $A_2$ the 5' phosphate of one LCR probe is directly adjacent to the 3'OH of the other LCR probe.

In some embodiments, in the presence of $A_2$ the two LCR probes will successfully anneal to $A_2$ and be ligated together to form one oligonucleotide molecule which subsequently acts as a new target for second-round covalent ligation, leading to geometric amplification of the target of interest, in this case $A_2$. The ligated products, or amplicons, are complementary to $A_2$ and function as targets in the next cycle of amplification. Thus, exponential amplification of the specific target DNA sequences is achieved through repeated cycles of denaturation, hybridization, and ligation in the presence of excess LCR probes. From this, the presence of $A_2$ and hence the target polynucleotide sequence is inferred.

In some embodiments, in the presence of $A_2$ the two PCR probes will successfully anneal to $A_2$ and be ligated together to form one oligonucleotide molecule which then acts as a new target for second-round covalent ligation, leading to geometric amplification of the target of interest, in this case $A_2$, which is then detected.

In some embodiments, the ligated oligonucleotide molecule is detected in real time using an intercalating dye or molecular probe.

In some embodiments, the ligated oligonucleotide molecule is detected using gel electrophoresis.

The person skilled in the art will appreciate there are numerous techniques which would allow the detection of the ligated oligonucleotide molecule.

In some embodiments, the dNTPs are hot start dNTPs.

In some embodiments, the one or more ligases are thermostable.

In some embodiments, the one or more ligases are naturally occurring.

In another embodiment, the one or more ligases are engineered.

In some embodiments, the one or more ligases are selected from any ligase disclosed previously or subsequently.

In some embodiments, the one or more polymerases are thermostable.

In some embodiments, the one or more polymerases are selected from any polymerase disclosed previously or subsequently.

In some embodiments, the one or more polymerases are naturally occurring.

In some embodiments, the one or more polymerases are engineered.

In some embodiments, the one or more polymerases are the same as that used for the pyrophosphorolysis.

In some embodiments, one or more enzymes of the current invention are hot start enzymes.

In some embodiments, one or more enzymes of the current invention are thermostable.

In an alternative embodiment, it is a second reaction mixture, to which the products of step (a) are introduced prior to step (b), which further comprises reagents for the ligase chain reaction (LCR).

In this embodiment, the second reaction mixture comprises
one or more ligases;
optionally one or more polymerases;
two or more LCR probe oligonucleotides that are complementary to adjacent sequences on $A_2$, wherein when the probes are successfully annealed to $A_2$ the 5' phosphate of one LCR probe is directly adjacent to the 3'OH of the other LCR probe;
optionally one or more primers for amplification of successfully ligated LCR probes; and
optionally dNTPs.

In some embodiments, in the presence of $A_2$ the two LCR probes will successfully anneal to $A_2$ and be ligated together to form one oligonucleotide molecule which subsequently acts as a new target for second-round covalent ligation, leading to geometric amplification of the target of interest, in this case $A_2$. The ligated products, or amplicons, are complementary to $A_2$ and function as targets in the next cycle of amplification. Thus, exponential amplification of the specific target DNA sequences is achieved through repeated cycles of denaturation, hybridization, and ligation in the presence of excess LCR probes. From this, the presence of $A_2$ and hence the target polynucleotide sequence is inferred.

In some embodiments, in the presence of $A_2$ the two PCR probes will successfully anneal to $A_2$ and be ligated together to form one oligonucleotide molecule which then acts as a new target for second-round covalent ligation, leading to geometric amplification of the target of interest, in this case $A_2$, which is then detected.

In some embodiments, the ligated oligonucleotide molecule is detected in real time using an intercalating dye or molecular probe.

In some embodiments, the ligated oligonucleotide molecule is detected using gel electrophoresis.

The person skilled in the art will appreciate there are numerous techniques which would allow the detection of the ligated oligonucleotide molecule.

In some embodiments, the dNTPs are hot start dNTPs.

In some embodiments, the one or more ligases are thermostable.

In some embodiments, the one or more ligases are naturally occurring.

In another embodiment, the one or more ligases are engineered.

In some embodiments, the one or more ligases are selected from any ligase disclosed previously or subsequently.

In some embodiments, the one or more polymerases are thermostable.

In some embodiments, the one or more polymerases are selected from any polymerase disclosed previously or subsequently.

In some embodiments, the one or more polymerases are naturally occurring.

In another embodiment, the one or more polymerases are engineered.

In some embodiments, the one or more polymerases are the same as that used for the pyrophosphorolysis.

In some embodiments, the second reaction mixture further comprises a pyrophosphorolysing enzyme in addition to one or more polymerases.

In some embodiments, one or more enzymes of the current invention are hot start enzymes.

In some embodiments, one or more enzymes of the current invention are thermostable.

In an alternative embodiment, the first reaction mixture further comprises:
an oligonucleotide complementary to a region of $A_2$ including the site of ligation, comprising one or multiple fluorophores arranged such that their fluorescence is quenched either by their proximity to each other or to one or more fluorescence quenchers;

a double strand specific DNA digestion enzyme;

wherein, in the presence of $A_2$, the labelled oligonucleotide is digested such that the fluorophores are separated from each other or from their corresponding quenchers, and a fluorescent signal, and hence the presence of $A_2$, is detectable.

In some embodiments, the fluorophores and quenchers may be as described previously.

In some embodiments, the double strand specific DNA digestion enzyme is an exonuclease. In another embodiment, it is a polymerase with proofreading activity. In another embodiment, the second reaction mixture comprises a mixture of one or more of: an exonuclease or a polymerase with proofreading activity.

In some embodiments, the double strand specific DNA digestion enzyme is a hot start enzyme.

In some embodiments, the double strand specific DNA digestion enzyme has reduced activity at the temperature at which the pyrophosphorolysis reaction of the method takes place.

In some embodiments, the double strand specific DNA digestion enzyme has no activity at the temperature at which the pyrophosphorolysis reaction of the method takes place.

In an alternate embodiment, the second reaction mixture further comprises:

an oligonucleotide complementary to a region of $A_2$ including the site of ligation, comprising one or multiple fluorophores arranged such that their fluorescence is quenched either by their proximity to each other or to one or more fluorescence quenchers;

a double strand specific DNA digestion enzyme;

wherein, in the presence of $A_2$, the labelled oligonucleotide is digested such that the fluorophores are separated from each other or from their corresponding quenchers, and a fluorescent signal, and hence the presence of $A_2$, is detectable.

In some embodiments, the fluorophores and quenchers may be as described previously.

In some embodiments, the double strand specific DNA digestion enzyme is an exonuclease. In another embodiment, it is a polymerase with proofreading activity. In another embodiment, the second reaction mixture comprises a mixture of one or more of: an exonuclease or a polymerase with proofreading activity.

In some embodiments, the double strand specific DNA digestion enzyme is a hot start enzyme.

In some embodiments, the double strand specific DNA digestion enzyme has reduced activity at the temperature at which the pyrophosphorolysis reaction of the method takes place.

In some embodiments, the double strand specific DNA digestion enzyme has no activity at the temperature at which the pyrophosphorolysis reaction of the method takes place.

In some embodiments, the first or second reaction mixtures further comprise one or more partially double stranded DNA constructs wherein each construct contains one or more fluorophores and one or more quenchers. In some embodiments, when construct is partially double-stranded the one or more fluorophores and one or more quenchers are located in close enough proximity to each other such that sufficient quenching of the one or more fluorophores occurs.

In some embodiments, the construct is one strand of DNA with a self-complementary region that is looped back on itself.

In some embodiments, the construct comprises one primer of a primer pair.

In some embodiments, the first or second reaction mixture further comprises the other primer of a primer pair.

In some embodiments, a portion of the single stranded section of the construct hybridises to $A_2$ and is extended against it by a DNA polymerase. In some embodiments, the other primer of the primer pair then hybridises to the extended construct. This primer is then extended against the construct, displacing the self-complementary region. Thus, the one or more fluorophores and one or more dyes are separated sufficiently for a fluorescent signal to be detected, indicating the presence of $A_2$ in the reaction mixture.

In such an embodiment the construct may be known as a Sunrise Primer.

In some embodiments, the construct comprises two separate DNA strands.

In some embodiments, a portion of the single stranded section of the construct hybridises to $A_2$ and is extended against it by a DNA polymerase. In some embodiments, the other primer of the primer pair then hybridises to the extended construct. This primer is then extended against the construct, in the direction of the double stranded section, displacing the shorter of the DNA strands and thus the one or more fluorophores and one or more dyes are separated sufficiently for a fluorescent signal to be detected, indicating the presence of $A_2$ in the reaction mixture.

In such an embodiment the construct may be known as a Molecular Zipper.

The person skilled in the art will appreciate that for both the Sunrise Primer and Molecular Zipper it is possible for the one or more fluorophores and the one or more quencher pairs to be located at various positions within each respective construct. The key feature is that each pair is located in sufficient proximity to one another that in the absence of $A_2$, i.e. when no extension and strand displacement has occurred, no fluorescent signal is emitted.

In some embodiments, prior to step (a) of the method, any RNA template present in the sample is used to form the corresponding DNA sequence.

In some embodiments, this is achieved via the use of a reverse transcriptase and appropriate nucleotides.

In some embodiments, the formation of DNA from any RNA template present occurs at the same time as any pre-amplification via PCR of nucleic acids present in the sample.

In some embodiments, the formation of DNA from any RNA template present occurs in a separate step as any pre-amplification via PCR of nucleic acids present in the sample.

In some embodiments of any of the previously, or subsequently, described methods, RNA present in the sample is not converted to the corresponding DNA sequence. In such an embodiment, $A_0$ undergoes pyrophosphorolysis against an RNA sequence to form partially digested strand $A_1$ and the method then proceeds as previously, or subsequently, described.

In some embodiments of any of the previously, or subsequently, described methods, one or more reaction mixtures may be combined.

In some embodiments, the first reaction mixture further comprises a ligation probe oligonucleotide C, and the partially digested strand $A_1$ is ligated at the 3' end to the 5' end of C, while in another embodiment, $A_1$ is circularised through ligation of its 3' and 5' ends;

in each case to create an oligonucleotide $A_2$.

In one embodiment, the ligation of $A_1$ occurs:
during step (a); or
during step (b); or
inbetween steps (a) and (b).

In one embodiment, $A_1$ is optionally extended in 5'-3' direction prior to ligation.

In some embodiments, this optional extension and the ligation are performed against the target oligonucleotide, while in another embodiment they are performed through addition of a further splint oligonucleotide D to which $A_1$ anneals prior to extension and/or ligation. In one embodiment, D comprises an oligonucleotide region complementary to the 3' end of $A_1$ and a region complementary to either the 5' end of oligonucleotide C or to the 5' end of $A_1$. In another embodiment, D is unable to extend against $A_1$ by virtue of either a 3'-end modification or through a nucleotide mismatch between the 3' end of D and the corresponding region of $A_1$.

In some embodiments, the ligation probe C has a 5' region complementary to at least part of a 5' end region of a splint oligonucleotide D or to the target oligonucleotide. By such means, a second intermediate product is formed in which the $A_2$ strand is comprised of $A_1$, C and optionally an intermediate region formed by extension of $A_1$ in the 5'-3' direction to meet the 5' end of C. In such an embodiment, the primers employed in step (c) (see below) are chosen to amplify at least a region of $A_2$ including the site at which ligation of the $A_1$ to C has occurred. In this embodiment, we have found that it is advantageous to include a 3' blocking group on C so that a 3'-5' exonuclease can be used to digest any non-ligated $A_1$ prior to amplification. Suitable polymerases which may be used for extension prior to ligation include but are not limited to Hemo KlenTaq, Mako and Stoffel Fragment.

In some embodiments, the first reaction mixture further comprises a phosphatase or phosphohydrolase to remove by hydrolysis the nucleoside triphosphates produced by the pyrophosphorolysis reaction thereby ensuring that the pyrophosphorolysis reaction can continue and does not become out-competed by the forward polymerisation reaction.

In some embodiments, prior to or during step (b) the products of the previous step are treated with a pyrophosphatase to hydrolyse the pyrophosphate ion, preventing further pyrophosphorolysis from occurring and favouring the forward polymerisation reaction.

In some embodiments, prior to or during step (b) the products of the previous step are treated with an exonuclease.

In some embodiments, the enzyme which performs pyrophosphorolysis of $A_0$ to form partially digested strand $A_1$ also amplifies $A_2$. The person skilled in the art will appreciate there exist many such enzymes.

The amplicons are detected and the information obtained are used to infer whether the polynucleotide target sequence is present or absent in the original analyte and/or a property associated therewith. For example, by this means a target sequence characteristic of a cancerous tumour cell may be detected with reference to specific SNPs being looked for. In another embodiment, a target sequence characteristic of the genome of a virus of bacterium (including new mutations thereof) may be detected. Many methods of detecting the amplicons or identification regions can be employed including for example an oligonucleotide binding dye, a sequence-specific molecular probe such as fluorescently-labelled molecular beacon or hairpin probe. Alternatively, direct sequencing of the $A_2$ amplicons can be performed using one of the direct sequencing methods employed or reported in the art. Where oligonucleotide binding dyes, fluorescently labelled beacons or probes are employed it is convenient to detect the amplicons using an arrangement comprising a source of stimulating electromagnetic radiation (laser, LED, lamp etc.) and a photodetector arranged to detect emitted fluorescent light and to generate therefrom a signal comprising a data stream which can be analysed by a microprocessor or a computer using specifically-designed algorithms.

In some embodiments, detection is achieved using one or more oligonucleotide fluorescent binding dyes or molecular probes. In such embodiments, an increase in signal over time resulting from the generation of amplicons of $A_2$ is used to infer the concentration of the target sequence in the analyte. In one embodiment that the final step of the method further comprises the steps of:
  i. labelling the products of step (b) using one or more oligonucleotide fluorescent binding dyes or molecular probes;
  ii. measuring the fluorescent signal of the products;
  iii. exposing the products to a set of denaturing conditions; and
identifying the polynucleotide target sequence in the analyte by monitoring changes in the fluorescent signal of the products during exposure to the denaturing conditions.

In some embodiments, multiple probes $A_0$ are employed, each selective for a different target sequence and each including an identification region, and further characterised in that the amplicons of $A_2$ include this identification region and therefore the target sequences present in the analyte are inferred through the detection of the identification region(s). In such embodiments detection of the identification regions (s) is carried out using molecular probes or through sequencing.

In some embodiments, is the one or more nucleic acid analytes are split into multiple reaction volumes, each volume having a one or more probe oligonucleotide $A_0$, introduced to detect different target sequences.

In some embodiments, wherein different probes $A_0$ are used the different probes $A_0$ comprise one or more common priming sites, allowing a single primer or single set of primers to be used for amplification.

In another aspect of the invention, there is provided a method of identifying a target polynucleotide sequence in a given nucleic acid analyte characterised by the steps of any previous embodiment of the invention wherein the multiple copies of $A_2$, or a region of $A_2$, are labelled using one or more oligonucleotide fluorescent binding dyes or molecular probes. The fluorescent signal of these multiple copies is measured and the multiple copies are exposed to a set of denaturing conditions. The target polynucleotide sequence is the identified by monitoring a change in the fluorescent signal of the multiple copies during exposure to the denaturing conditions.

In some embodiments, the denaturing conditions may be provided by varying the temperature e.g. increasing the temperature to a point where the double strand begins to dissociate. Additionally or alternatively, the denaturing conditions may also be provided by varying the pH such that the conditions are acidic or alkaline, or by adding in additives or agents such as a strong acid or base, a concentrated inorganic salt or organic solvent e.g. alcohol.

In another aspect of the invention, there is provided the use of the methods described above to screen mammalian subjects, especially human patients, for the presence of infectious diseases, cancer or for the purpose of generating companion diagnostic information.

In a further aspect of the invention, there is provided control probes for use in the methods as described above. Embodiments of the current invention include those wherein the presence of a specific target sequence, or sequences, is elucidated by the generation of a fluorescent signal. In such embodiments, there may inevitably be a level of signal generated from non-target DNA present in the sample. For a given sample, this background signal has a later onset than the 'true' signal, but this onset may vary between samples. Accurate detection of the presence of low concentrations of target sequence, or sequences, thus relies on knowledge of what signal is expected in its absence. For contrived samples references are available, but for true 'blind' samples from patients this is not the case. The control probes ($E_0$) are utilised to determine the expected background signal profile for each assay probe. The control probe targets a sequence not expected to be present in the sample and the signal generated from this probe can then be used to infer the expected rate of signal generation from the sample in the absence of target sequence.

Thus there is provided a method of detecting a target polynucleotide sequence in a given nucleic acid analyte according to any of the previously described methods characterised by the steps of:
  a. either subsequently or concurrently repeating the steps of the methods using a second single-stranded probe oligonucleotide $E_0$ having a 3' end region at least partially mismatched to the target sequence, either using a separate aliquot of the sample or in the same aliquot and using a second detection channel;
  b. inferring the background signal expected to be generated from $A_0$ in the absence of any target analyte in the sample; and
  c. through comparison of the expected background signal inferred in (a) with the actual signal observed in the presence of the target analyte inferring the presence or absence of the polynucleotide target sequence in the analyte.

In some embodiments, the control probe ($E_0$) and $A_0$ are added to separate portions of the sample while in another embodiment the $E_0$ and $A_0$ are added to the same portion of the sample and different detection channels (e.g. different colour dyes) used to measure their respective signals. The signal generated by $E_0$ may then be utilised to infer and correct for the background signal expected to be generated by $A_0$ in the absence of the polynucleotide target sequence in the sample. For example, a correction of the background signal may involve the subtraction of the signal observed from $E_0$ from that observed from $A_0$, or through the calibration of the signal observed from $A_0$ using a calibration curve of the relative signals generated by $A_0$ and $E_0$ under varying conditions.

In some embodiments, a single $E_0$ can be used to calibrate all of the assay probes which may be produced.

In some embodiments, a separate $E_0$ may be used to calibrate each amplicon of the sample DNA generated in an initial amplification step. Each amplicon may contain multiple mutations/target sequences of interest, but a single $E_0$ will be sufficient to calibrate all of the assay probes against a single amplicon.

In a further embodiment, a separate $E_0$ may be used for each target sequence. For example, if a C>T mutation is being targeted, an $E_0$ could be designed that targets a C>G mutation in the same site that is not known to occur in patients. The signal profile generated by $E_0$ under various conditions can be assessed in calibration reactions and these data used to infer the signal expected from the assay probe targeting the C>T variant when this variant is not present.

Some embodiments, of the method of the invention can be seen in FIGS. 17 to 20.

Figure 17:
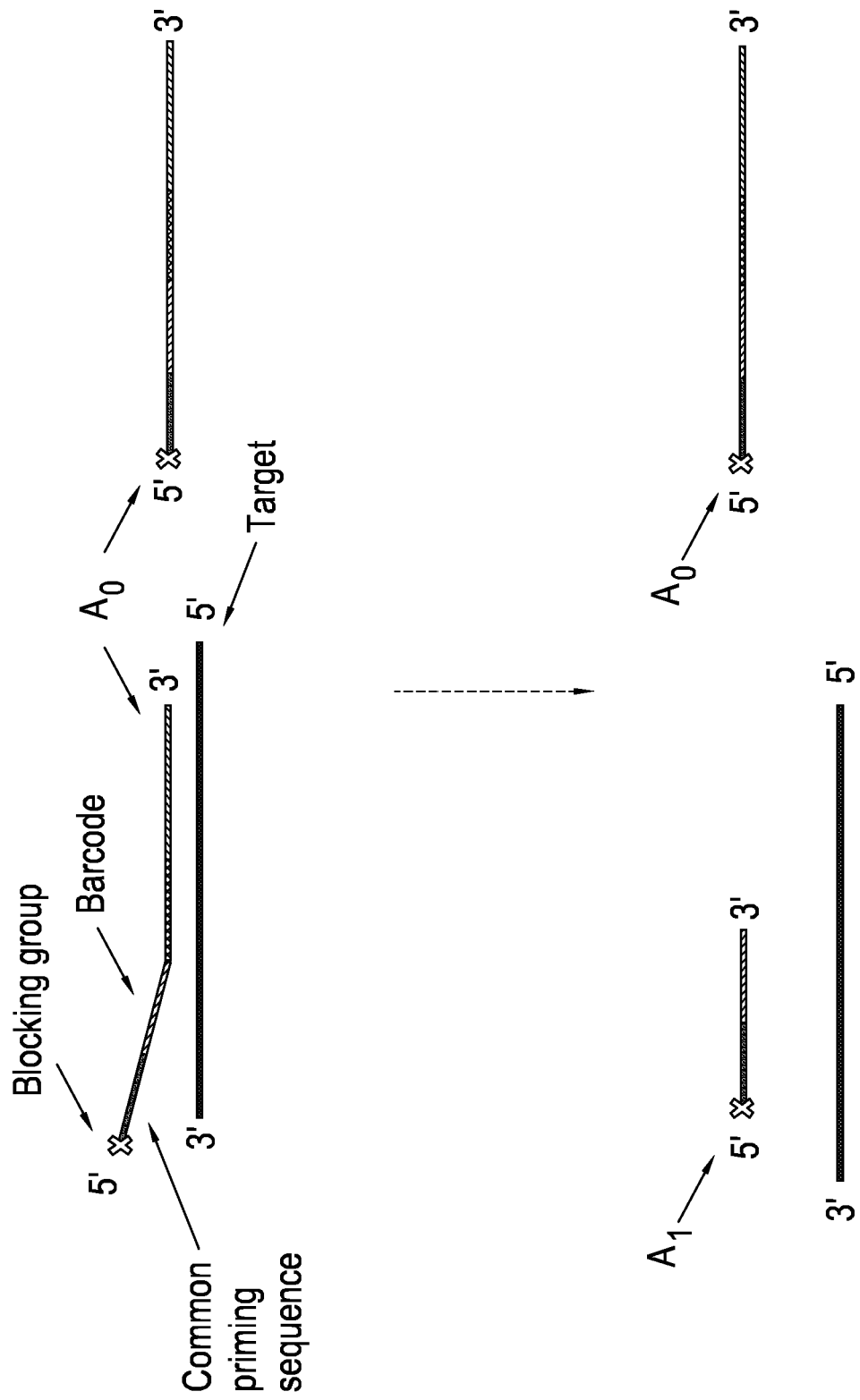
FIG. 17: A single-stranded probe oligonucleotide $A_0$ anneals to a target polynucleotide sequence to create a first intermediate product which is at least partially double-stranded and in which the 3' end of $A_0$ forms a double-stranded complex with the target polynucleotide sequence. In this simplified embodiment of the invention there are two molecules of $A_0$ present and one target polynucleotide sequence, in order to illustrate how $A_0$ that has not annealed to a target does not take part in further steps of the method. In this illustrative example, the 3' end of $A_0$ anneals to the target polynucleotide sequence whilst the 5' end of $A_0$ does not. The 5' end of $A_0$ comprises a 5' chemical blocking group, a common priming sequence and a barcode region.

In FIG. 17, a single-stranded probe oligonucleotide $A_0$ anneals to a target polynucleotide sequence to create a first intermediate product which is at least partially double-stranded and in which the 3' end of $A_0$ forms a double-stranded complex with the target polynucleotide sequence. In this simplified embodiment of the invention there are two molecules of $A_0$ present and one target polynucleotide sequence, in order to illustrate how $A_0$ that has not annealed to a target does not take part in further steps of the method. In this illustrative example, the 3' end of $A_0$ anneals to the target polynucleotide sequence whilst the 5' end of $A_0$ does not. The 5' end of $A_0$ comprises a 5' chemical blocking group, a common priming sequence and a barcode region.

The partially double-stranded first intermediate product undergoes pyrophosphorolysis in the presence of a pyrophosphorolysing enzyme in the 3'-5' direction from the 3' end of $A_0$ to create a partially digested strand $A_1$, the analyte and the undigested $A_0$ molecule which did not anneal to a target.

In FIG. 18, $A_1$ is annealed to a single-stranded trigger oligonucleotide B and the $A_1$ strand is extended in the 5'-3' direction against B to create an oligonucleotide $A_2$. In this illustrative example, trigger oligonucleotide B has a 5' chemical block. Any undigested $A_0$ anneals to the trigger oligonucleotide B, however it is unable to be extended in the 5'-3' direction against B to generate sequences that are the targets for later parts of the method. In this example, $A_2$ is primed with at least one single-stranded primer oligonucleotide and multiple copies of $A_2$, or a region of $A_2$ are created.

In FIG. 19, $A_1$ is annealed to a splint oligonucleotide D, and then circularised by ligation of its 3' and 5' ends. The now circularised $A_2$ is primed with at least one single-stranded primer oligonucleotide and multiple copies of $A_2$, or a region of $A_2$ are created. In this illustrative example, the splint oligonucleotide D is unable to extend against $A_1$ by virtue of either a 3'-modification (chemical in this illustration) or through a nucleotide mismatch between the 3' end of D and the corresponding region of $A_2$.

In FIG. 20, the 3' region of a splint oligonucleotide D anneals to the 3' region of $A_1$ whilst the 5' region of the splint oligonucleotide D anneals to the 5' region of a ligation probe C. Thus, a second intermediate product $A_2$ is formed comprised of $A_1$, C and optionally an intermediate region formed by extension of $A_1$ in the 5'-3' direction to meet the 5' end of C. In this illustrative example, the ligation probe C has a 3' chemical blocking group so that a 3'-5' exonuclease can be used to digest any non-ligated $A_1$.

$A_2$ is primed with at least one single-stranded primer oligonucleotide and multiple copies of $A_2$, or a region of $A_2$ are created.

The specificity of the methods of the current invention may be improved by the introduction of blocking oligonucleotides. For example a blocking oligo nucleotide can be introduced so as to hybridise to at least a portion of wild-type DNA, promoting annealing of $A_0$ only to the target polynucleotide sequences and not the wildtype. Alternatively or additionally, blocking oligonucleotides can be used to improve the specificity of the polymerase chain reaction (PCR) to prevent amplification of any wild type sequence present. The general technique used is to design an oligonucleotide that anneals between the PCR primers and is not able to be displaced or digested by the PCR polymerase. The oligonucleotide is designed to anneal to the non-target (usually healthy) sequence, while being mismatched (often by a single base) to the target (mutant) sequence. This mismatch results in a different melting temperature against the two sequences, the oligonucleotide being designed to remain annealed to the non-target sequence at the PCR extension temperature while dissociating from the target sequence.

The blocking oligonucleotides may often have modifications to prevent its digestion by the exonuclease activity of the PCR polymerase, or to enhance the melting temperature differential between the target and non-target sequence.

The incorporation of a locked nucleic acid (LNA) or other melting temperature altering modification into a blocking oligonucleotide can significantly increase the differential in melting temperature of the oligonucleotide against target and non-target sequences.

Thus there is provided an embodiment of the invention wherein blocking oligonucleotides are used. The blocking oligonucleotides must be resistant to the pyrophosphorolysing (PPL) reaction to ensure they are not digested or displaced. This can be achieved in a number of different ways, for example via mismatches at their 3' ends or through modifications such as phosphorothioate bonds or spacers.

In such embodiments or an aspect of the present invention where blocking oligonucleotides are used, the method of detecting a target polynucleotide sequence in a given nucleic acid analyte is characterised by annealing single-stranded blocking oligonucleotides to at least a subset of non-target polynucleotide sequences before, or during, the same step wherein the analyte target sequence is annealed to a single-stranded probe oligonucleotide $A_0$ to create a first intermediate product which is at least partially double-stranded and in which the 3' end of $A_0$ forms a double-stranded complex with the analyte target sequence.

In some embodiments, the blocking oligonucleotides are made to be resistant to the pyrophosphorolysing reaction via mismatches at their 3' ends. In another embodiment, the blocking oligonucleotides are made to be resistant via the presence of a 3'-blocking group. In another embodiment the blocking oligonucleotides are made to be resistant via the presence of spacers or other internal modifications. In a further embodiment the blocking oligonucleotides include both a melting temperature increasing modification or modified nucleotide base and are rendered resistant to pyrophosphorolysis.

References herein to 'phosphatase enzymes' refer to any enzymes, or functional fragments thereof, with the ability to remove by hydrolysis the nucleoside triphosphates produced by the methods of the current invention. This includes any enzymes, or functional fragments thereof, with the ability to cleave a phosphoric acid monoester into a phosphate ion and an alcohol.

References herein to 'pyrophosphatase enzymes' refer to any enzymes, or functional fragments thereof, with the ability to catalyse the conversion of one ion of pyrophosphate to two phosphate ions.

This also includes inorganic pyrophosphatases and inorganic diphosphatases. A non-limiting example is thermostable inorganic pyrophosphate (TIPP).

In some embodiments there is provided a modified version of any previously described or subsequently described embodiment wherein the use of a pyrophosphatase is optional.

Figure 15:
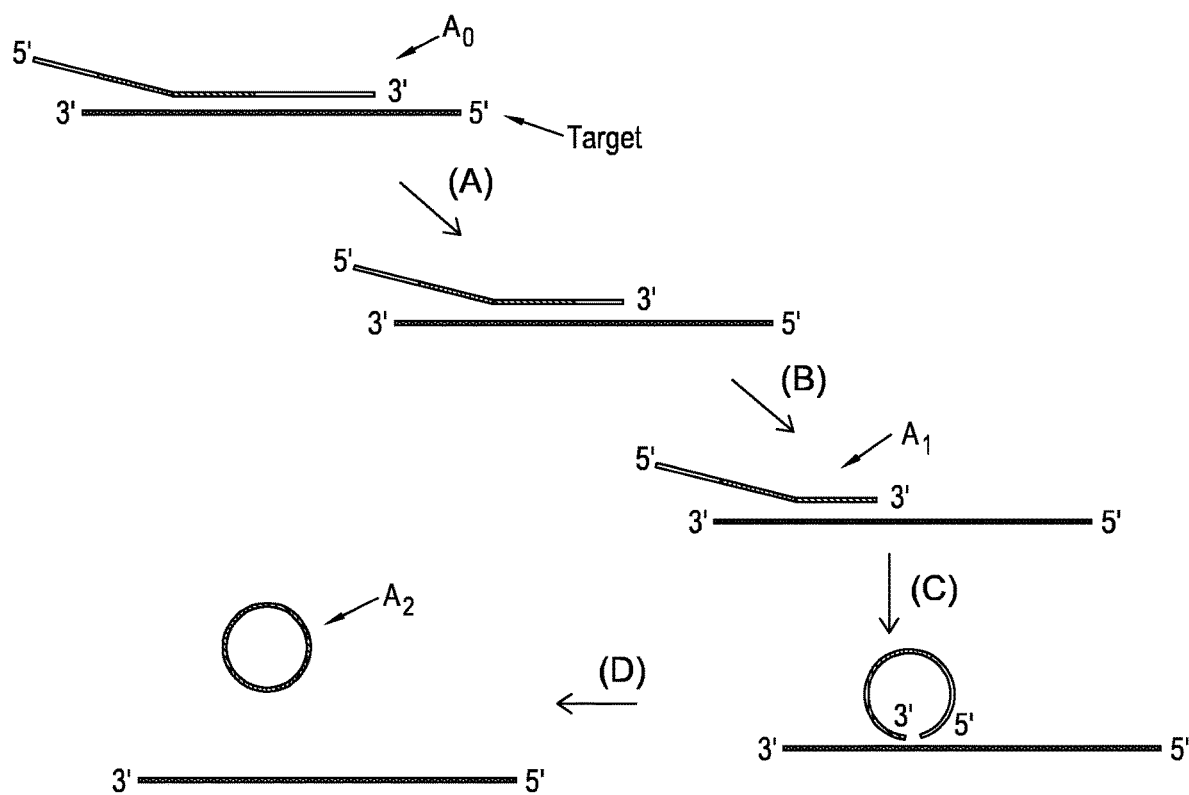
FIG. 15: A schematic representation of the circularisation of $A_1$ to form $A_2$ against the analyte target sequence. $A_0$ is progressively digested against the target in the 3'-5' direction from the 3' end of $A_0$ to form partially digested strand $A_1$, this is shown as steps (A) and (B). This progressive digestion reveals the region of the target that is complementary to the 5' end of $A_0/A_1$ and the 5' end of $A_1$ then hybridises to this region, this is shown in step (C). $A_1$ is then ligated together to form circularised $A_2$, step (D).

In one embodiment, $A_1$ is circularised against the analyte target sequence. In this embodiment, the region of the target that is revealed by progressive digestion of $A_0$, in the 3'-5' direction from the 3' end of $A_0$ to form $A_1$, is complementary to the 5' end of $A_0/A_1$. In this embodiment, a ligase may be used to ligate the 3' and 5' ends of $A_1$ to form a circularised oligonucleotide $A_2$. This is shown, for example in FIG. 15.

In one embodiment, the 5' end of $A_0/A_1$ is complementary to the target across a region that is 5-50 nucleotides in length. In one embodiment, it is 5-25 nucleotides in length. In one embodiment, it is 5-20 nucleotides in length. In one embodiment, it is 5-15 nucleotides in length. In one embodiment, it is 5-12 nucleotides in length. In one embodiment, it is 5-10 nucleotides in length.

In an embodiment, there is provided a method for diagnosing or monitoring cancer in a patient, comprising:
  extracting DNA or RNA from the plasma or serum of the blood of a patient;
  Introducing one or more DNA or RNA analytes to a first reaction mixture comprising:
    i. a single-stranded probe oligonucleotide $A_0$;
    ii. a pyrophosphorolysing enzyme; and
    ii. a ligase;
  wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;
    detecting a signal derived from the products of the previous step, wherein the products are $A_2$ or a portion thereof, or multiple copies of $A_2$ or multiple copies of a portion thereof, and inferring therefrom the presence or absence of cancer in a patient.

In an embodiment, there is provided a method for monitoring cancer in a patient, comprising:
  extracting DNA or RNA from the plasma or serum of the blood of a patient;
  Introducing one or more DNA or RNA analytes to a first reaction mixture comprising:
    i. a single-stranded probe oligonucleotide $A_0$;
    ii. a pyrophosphorolysing enzyme; and
    ii. a ligase;
  wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;
    detecting a signal derived from the products of the previous step, wherein the products are $A_2$ or a portion thereof, or multiple copies of $A_2$ or multiple copies of a portion thereof, and inferring therefrom the progression or remission of cancer in a patient.

In an embodiment, there is provided a method for monitoring response to one or more cancer treatments in a patient, comprising:
  extracting DNA or RNA from the plasma or serum of the blood of a patient receiving one or more cancer treatments;
  Introducing one or more DNA or RNA analytes to a first reaction mixture comprising:
    i. a single-stranded probe oligonucleotide $A_0$;
    ii. a pyrophosphorolysing enzyme; and
    iii. a ligase;
  wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;

detecting a signal derived from the products of the previous step, wherein the products are $A_2$ or a portion thereof, or multiple copies of $A_2$ or multiple copies of a portion thereof, and inferring therefrom the patients response to one or more cancer treatments.

In an embodiment, there is provided a method for screening a patient, comprising:

extracting DNA or RNA from the plasma or serum of the blood of a patient;

Introducing one or more DNA or RNA analytes to a first reaction mixture comprising:

i. a single-stranded probe oligonucleotide $A_0$;
        ii. a pyrophosphorolysing enzyme; and
        ii. a ligase;

wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;

detecting a signal derived from the products of the previous step, wherein the products are $A_2$ or a portion thereof, or multiple copies of $A_2$ or multiple copies of a portion thereof, and inferring therefrom the presence or absence of one or more cancers in a patient.

In an embodiment, there is provided a method for non-invasive prenatal testing (NIPT), comprising:

extracting DNA or RNA from the plasma or serum of the maternal blood of a pregnant patient;

Introducing one or more DNA or RNA analytes to a first reaction mixture comprising:

i. a single-stranded probe oligonucleotide $A_0$;
        ii. a pyrophosphorolysing enzyme; and
        iii. a ligase;

wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;

detecting a signal derived from the products of the previous step, wherein the products are $A_2$ or a portion thereof, or multiple copies of $A_2$ or multiple copies of a portion thereof, and inferring therefrom the presence or absence of one or more fetal abnormalities.

In an embodiment, there is provided a method for screening a patient, comprising:

extracting DNA or RNA from the plasma or serum of the blood of a patient;

Introducing one or more DNA or RNA analytes to a first reaction mixture comprising:

i. a single-stranded probe oligonucleotide $A_0$;
ii. a pyrophosphorolysing enzyme; and
iii. a ligase;

wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;

detecting a signal derived from the products of the previous step, wherein the products are $A_2$ or a portion thereof, or multiple copies of $A_2$ or multiple copies of a portion thereof, and inferring therefrom the presence or absence of one or more cancers in a patient.

In an embodiment, there is provided a method for monitoring a transplant recipient patient, comprising:

extracting DNA or RNA from the plasma or serum of the blood of a transplant recipient patient;

Introducing one or more DNA or RNA analytes to a first reaction mixture comprising:

i. a single-stranded probe oligonucleotide $A_0$;
        ii. a pyrophosphorolysing enzyme; and
        iii. a ligase;

wherein the analyte anneals to the single-stranded probe oligonucleotide $A_0$ to create a first intermediate product which is at least partially double-stranded and in which the 3' end of $A_0$ forms a double-stranded complex and $A_0$ is pyrophosphorylsed in the 3'-5' direction from the 3' end to create at least a partially digested strand $A_1$ and $A_1$ undergoes ligation to form $A_2$;

detecting a signal derived from the products of the previous step, wherein the products are $A_2$ or a portion thereof, or multiple copies of $A_2$ or multiple copies of a portion thereof, and inferring therefrom the presence or absence of DNA or RNA from the transplanted organ.

In some embodiments of the invention there is provided a kit for use in a method of detecting a target polynucleotide sequence in a given nucleic acid analyte present in a sample, comprising:

(a) a single-stranded probe oligonucleotide $A_0$, capable of forming a first intermediate product with a target polynucleotide sequence, said intermediate product being at least partially double-stranded;

(b) a ligase;

(c) a pyrophosphorolysing enzyme capable of digesting the first intermediate product in the 3'-5' direction from the end of $A_0$ to create a partially digested strand $A_1$;

(d) at least one single-stranded primer oligonucleotide that is substantially complementary to a portion of $A_0$;

(e) an amplification enzyme; and (f) suitable buffers.

In one embodiment the kit further comprises a source of pyrophosphate ion.

Suitable source(s) of pyrophosphate ion are as described previously.

In some embodiments, the kit further comprises suitable positive and negative controls.

In some embodiments, the kit may further comprise one or more control probes ($E_0$) which are as previously described.

In some embodiments, the kit may further comprise one or more blocking oligonucleotides which are as previously described.

In some embodiments, the kit may further comprises one or more control probes ($E_0$) and one or more blocking oligonucleotides.

In some embodiments, the 5' end of $A_0$ may be rendered resistant to 5'-3' exonuclease digestion and the kit may further comprises a 5'-3' exonuclease.

In some embodiments a kit may further comprise a ligation probe oligonucleotide C.

In some embodiments a kit may further comprise a splint oligonucleotide D.

In some embodiments, a kit may comprise both C and D.

The ligation probe C may comprise a 3' or internal modification protecting it from 3'-5' exonuclease digestion.

D may comprise an oligonucleotide region complementary to the 3' end of $A_1$ and a region complementary to either the 5' end of oligonucleotide C or the 5' end of $A_1$.

In some embodiments, D may be unable to undergo extension against $A_1$ by virtue of either a 3' modification or through a mismatch between the 3' end of D and the corresponding region of $A_1$ or C.

In some embodiments, the kit may further comprise dNTPs, a polymerase and suitable buffers for the initial amplification of a target polynucleotide sequence present in a sample.

In some embodiments, the kit may further comprise a dUTP incorporating high fidelity polymerase, dUTPs and uracil-DNA N-glycosylase (UDG).

In some embodiments, the kit may further comprise a phosphatase or a phosphohydrolase.

In some embodiments, the kit may further comprise a pyrophosphatase. The pyrophosphatase may be hot start.

In some embodiments, the kit may further comprise a proteinase.

In some embodiments, the kit may further comprise one or more oligonucleotide binding dyes or molecular probes.

In some embodiments, the kit may further comprise multiple $A_0$, each selective for a different target sequence and each including an identification region.

In some embodiments, the amplification enzyme, of (e), and the pyrophosphorolysing enzyme are the same.

The kit may further comprise purification devices and reagents for isolating and/or purifying a portion of polynucleotides, following treatment as described herein. Suitable reagents are well known in the art and include gel filtration columns and washing buffers. Further suitable reagents include magnetic beads and silica columns.

In one embodiment of the invention there is provided a device comprising:
  at least a fluid pathway between a first region, a second region and a third region, wherein the first region comprises one or more wells, wherein each well comprises:
    dNTPs;
    at least one single-stranded primer oligonucleotide;
    an amplification enzyme for the initial amplification of DNA present in a sample; and
  wherein the second region comprises one or more wells, wherein each well comprises:
    a single-stranded probe oligonucleotide $A_0$, capable of forming a first intermediate product with a target polynucleotide sequence, said intermediate product being at least partially double-stranded;
    a pyrophosphorolysing enzyme capable of digesting the first intermediate product in the 3'-5' direction from the end of $A_0$ to create a partially digested strand $A_1$; and
  wherein the third region comprises one or more wells, wherein each well comprises:
    dNTPs;
    buffers;
    an amplification enzyme;
    a means for detecting a signal derived from $A_2$ or a portion thereof, or multiple copies of $A_2$ or multiple copies of a portion thereof; and
  wherein the wells of the second region or the wells of the third region further comprise at least one single-stranded primer oligonucleotide that is substantially complementary to a portion of $A_0$.

In some embodiments, a means for detecting a signal is located within one or more wells of the third region.

In some embodiments, a means for detecting a signal is located within the third region of the device.

In some embodiments, a means for detecting a signal is located within an adjacent region of the device.

In some embodiments, the dNTPs of each well of the first region may be dUTP, dGTP, dATP and dCTP and each well may further comprise a dUTP incorporating high fidelity polymerase and uracil-DNA N-glycosylase (UDG).

In some embodiments, the dNTPs of each well of the third region may be dUTP, dGTP, dATP and dCTP and each well may further comprise a dUTP incorporating high fidelity polymerase and uracil-DNA N-glycosylase (UDG).

In some embodiments, each well of the second region may further comprise a source of pyrophosphate ion.

In some embodiments, the 5' end of $A_0$ may be rendered resistant to 5'-3' exonuclease digestion and the wells of the second region may further comprises a 5'-3' exonuclease.

In some embodiments, each well of the second or third regions may further comprise a ligase and a ligation probe oligonucleotide C or a splint oligonucleotide D.

The ligation probe C may comprise a 3' or internal modification protecting it from 3'-5' exonuclease digestion.

The splint oligonucleotide D may comprise an oligonucleotide region complementary to the 3' end of $A_1$ and a region complementary to either the 5' end of oligonucleotide C or to the 5' end of $A_1$.

D may be unable to undergo extension against $A_1$ by virtue of either a 3' modification or through a mismatch between the 3' end of D and the corresponding region of $A_1$ or C.

In some embodiments, the dNTPs may be hot start and each well of the second region may further comprise a phosphatase or a phosphohydrolase.

In some embodiments, each well of the second region may further comprise a pyrophosphatase.

In some embodiments, each well of the third region may further comprise a pyrophosphatase.

In some embodiments, the pyrophosphatase may be a hot start.

In some embodiments, each well of the third region may further comprise one or more oligonucleotide binding dyes or molecular probes.

In some embodiments, each well of the second region may comprise at least one or more different $A_0$ that is selective for a target sequence including an identification region.

In some embodiments, the amplification enzyme and the pyrophosphorolysing enzyme in the second region may be the same.

In some embodiments, there may be a fourth region comprising one or more wells, wherein each well may comprise a proteinase and wherein said fourth region may be located between the first and second regions.

In some embodiments, the second and third regions of the device may be combined such that the wells of the second region further comprise:
  dNTPs;
  buffers;
  an amplification enzyme; and
  a means for detecting a signal derived from $A_1$ or a portion thereof, or multiple copies of $A_1$ or multiple copies of a portion thereof.

In some embodiments, a means for detecting a signal is located within one or more wells of the second region.

In some embodiments, a means for detecting a signal is located within the second region of the device.

In some embodiments, a means for detecting a signal is located within an adjacent region of the device.

In some embodiments, the first region may be fluidically connected to a sample container via a fluidic interface.

In some embodiments, heating and/or cooling elements may be present at one or more regions of the device.

In some embodiments, heating and/or cooling may be applied to one or more regions of the device.

In some embodiments, each region of the device may independently comprise at least 100 or 200 wells.

In some embodiments, each region of the device may independently comprise between about 100 and 300, 400, 500, 600, 700, 800, 900, 1000, 1100, 1200, 1300, 1400, 1500 or more wells. The wells may be of any shape and their locations may be arranged in any format or pattern on a substrate.

In some embodiments, the well-substrate can be constructed from a metal (e.g. gold, platinum, or nickel alloy as non-limiting examples), ceramic, glass, or other PCR compatible polymer material, or a composite material. The well-substrate includes a plurality of wells.

In some embodiments, the wells may be formed in a well-substrate as blind-holes or through-holes. The wells may be created within a well-substrate, for example, by laser drilling (e.g. excimer or solid-state laser), ultrasonic embossing, hot embossing lithography, electroforming a nickel mold, injection molding, and injection compression molding.

In some embodiments, individual well volume may range from 0.1 to 1500 nl. In one embodiment, 0.5 to 50 nL. Each well may have a volume of about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, 425, 450, 475, or 500 nL.

In some embodiments, well dimensions may have any shape, for example, circular, elliptical, square, rectangular, ovoid, hexagonal, octagonal, conical, and other shapes well known to persons of skill in the art.

In some embodiments, well shapes may have cross-sectional areas that vary along an axis. For example, a square hole may taper from a first size to a second size that is a fraction of the first size.

In some embodiments, well dimensions may be square with diameters and depths being approximately equal.

In some embodiments, walls that define the wells may be non-parallel.

In some embodiments, walls that define the wells may converge to a point. Well dimensions can be derived from the total volume capacity of the well-substrate.

In some embodiments, well depths may range from 25 μm to 1000 μm.

In one embodiment, wells may have a depth of 25, 50, 75, 100, 150, 200, 250, 300, 350, 400, 450, 500, 550, 600, 650, 700, 750, 800, 850, 900, 950 or 1000 μm.

In some embodiments, well diameter may range from about 25 μm to about 500 μm.

In some embodiments, wells may have a width of 25, 50, 75, 100, 125, 150, 175, 200, 225, 250, 275, 300, 325, 350, 375, 400, 425, 450, 475 or 500 μm.

In some embodiments, portions of one or more regions of the device may be modified to encourage or discourage fluid adhered. Surfaces defining the wells may be coated with a hydrophilic material (or modified to be hydrophilic), and thus encourage retention of fluid.

In some embodiments, portions of one or more regions of the device, may be coated with a hydrophobic material (or modified to be hydrophobic) and thus discourage retention of fluid thereon. The person skilled in the art will understand that other surface treatments may be performed such that fluid is preferably held within the wells, but not on upper surfaces so as to encourage draining of excess fluid.

In some embodiments, the wells of the well-substrate may be patterned to have a simple geometric pattern of aligned rows and columns, or patterns arranged diagonally or hexagonally.

In one embodiment, the wells of the well-substrate may be patterned to have complex geometric patterns, such as chaotic patterns or isogeometric design patterns.

In some embodiments, the wells may be geometrically separated from one another and/or feature large depth to width ratios to help prevent cross-contamination of reagents.

In some embodiments, the device may comprise one or more auxillary regions which are usable to provide process fluids, such as oil or other chemical solutions to one or more of the regions of the device. Such auxiliary regions may be fluidically connected to one or more of the regions of the device via one or more membranes, valves and/or pressure severable substrates (i.e. materials that break when subjected to a pre-determined amount of pressure from fluid within an auxiliary region or adjacent portion of the fluid pathway) such as metal foil or thin film.

In some embodiments, the fluid pathway of the device may include extensive torturous portions. A torturous path between the inlet passage of the fluid pathway and one or more of the regions of the device can be helpful for control and handling of fluid processes. A torturous path can help reduce formation of gas bubbles that can interfere with flowing oil through the fluid pathway.

In some embodiments, the device may further comprise a gas permeable membrane which enables gas to be evacuated from the wells of one or more regions of the device, while not allowing fluid to pass through. The gas permeable membrane may be adhered to the well-substrate of the device by a gas permeable adhesive. In one embodiment, the membrane may be constructed from polydimethylsiloxane (PDMS), and has a thickness ranging from 20-1000 μm. In some embodiments the membrane may have a thickness ranging from 100-200 μm.

In some embodiments, all or portions of the well-substrate may contain conductive metal portions (e.g., gold) to enable heat transfer from the metal to the wells. In one embodiment, the interior surfaces of wells may be coated with a metal to enable heat transfer.

In some embodiments, after appropriate reagents have filled the wells of one or more regions of the device, an isolation oil or thermally conductive liquid may be applied to the device to prevent cross-talk.

In some embodiments, the wells of one or more regions of the device may be shaped to taper from a large diameter to a smaller diameter, similar to a cone. Cone-shaped wells with sloped walls enables the use of a non-contact deposition method for reagents (e.g., ink jet). The conical shape also aids in drying and has been found to prevent bubbles and leaks when a gas permeable membrane is present.

In some embodiments, the wells of one or more regions of the device may be filled by advancing a sample fluid (e.g. via pressure) along the fluid pathway of the device. As the fluid passes over the wells of one or more regions of the device, each well becomes filled with fluid, which is primarily retained within the wells via surface tension. As previously described, portions of the well-substrate of the device may be coated with a hydrophilic/hydrophobic substance as desired to encourage complete and uniform filing of the wells as the sample fluid passes over.

In some embodiments, the wells of one or more regions of the device may be 'capped' with oil following filling. This can then aid in reducing evaporation when the well-substrate is subjected to heat cycling. In one embodiment, following oil capping, an aqueous solution can fill one or more regions of the device to improve thermal conductivity.

In some embodiments, the stationary aqueous solution may be pressurised within one or more regions of the device to halt the movement of fluid and any bubbles.

In some embodiments, oil such as mineral oil may be used for the isolation of the wells of one or more regions of the device and to provide thermal conductivity. However, any thermal conductive liquid, such as fluorinated liquids (e.g., 3M FC-40) can be used. References to oil in this disclosure should be understood to include such alternatives as the skilled person in the art will appreciate are applicable.

In some embodiments, the device may further comprise one or more sensor assemblies.

In some embodiments, the one or more sensor assemblies may comprise a charge coupled device (CCD)/complementary metal-oxide-semiconductor (CMOS) detector coupled to a fiber optic face plate (FOFP). A filter may be layered on top of the FOPF, and placed against or adjacent to the well-substrate. In one embodiment, the filter can be layered (bonded) directly on top of the CCD with the FOPF placed on top.

In some embodiments, a hydration fluid, such as distilled water, may be heated within the first region or one of the auxiliary regions such that one or more regions of the device has up to 100% humidity, or at least sufficient humidity to prevent over evaporation during thermal cycling.

In some embodiments, after filing of the device is complete, the well-substrate may be heated by an external device that is in thermal contact with the device to perform thermal cycling for PCR.

In some embodiments, non-contact methods of heating may be employed, such as RFID, Curie point, inductive or microwave heating. These and other non-contact methods of heating will be well known to the person skilled in the art. During thermal cycling, the device may be monitored for chemical reactions via the sensor arrangements previously described.

In some embodiments, reagents that are deposited in one or more of the wells of one or more of the regions of the device are deposited in a pre-determined arrangement.

In some embodiments there is provided a method comprising:
  providing a sample fluid to a fluid pathway of a device wherein the device comprises at least a fluid pathway between a first region, a second region and a third region, wherein the first, second and third regions independently comprise one or more wells;
    filling the second region with the amplified fluid from the first region such that one or more wells of the second region is coated with the amplified fluid;
    evacuating the amplified fluid from the second region such that one or more wells remain wetted with at least some of the amplified fluid;
    filling the third region with the fluid evacuated from the second region such that one or more wells of the third region is coated with this fluid; and
    evacuating the fluid from the third chamber such that the one or more wells remains wetted with at least some of this fluid.

In some embodiments of the method, the fluid pathway may be valve less.

In some embodiments of the method, the evacuated second region may be filled with a hydrophobic substance.

In some embodiments of the method, the evacuated third region may be filled with a hydrophobic substance.

In some embodiments of the method, the hydrophobic substance may be supplied from an oil chamber that is in fluid communication with the second and third regions.

In some embodiments of the method, the sample fluid may be routed along the fluid pathway in a serpentine manner.

In some embodiments, the method may further comprise applying heating and cooling cycles to the one or more of the first, second or third regions.

There person skilled in the art will appreciate that when the term 'infer' is used, for example, 'infer the presence of absence of a particular sequence' it refers to determining the presence or absence of a particular feature based on presence of absence of $A_2$, or copies of $A_2$ or a region of $A_2$ or copies of a region $A_2$.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

Example 1—Simplified Protocols

For the purpose of this, and following sections, embodiments of the invention are exemplified and referred to as Protocol 1-5 respectively.

Figure 1:
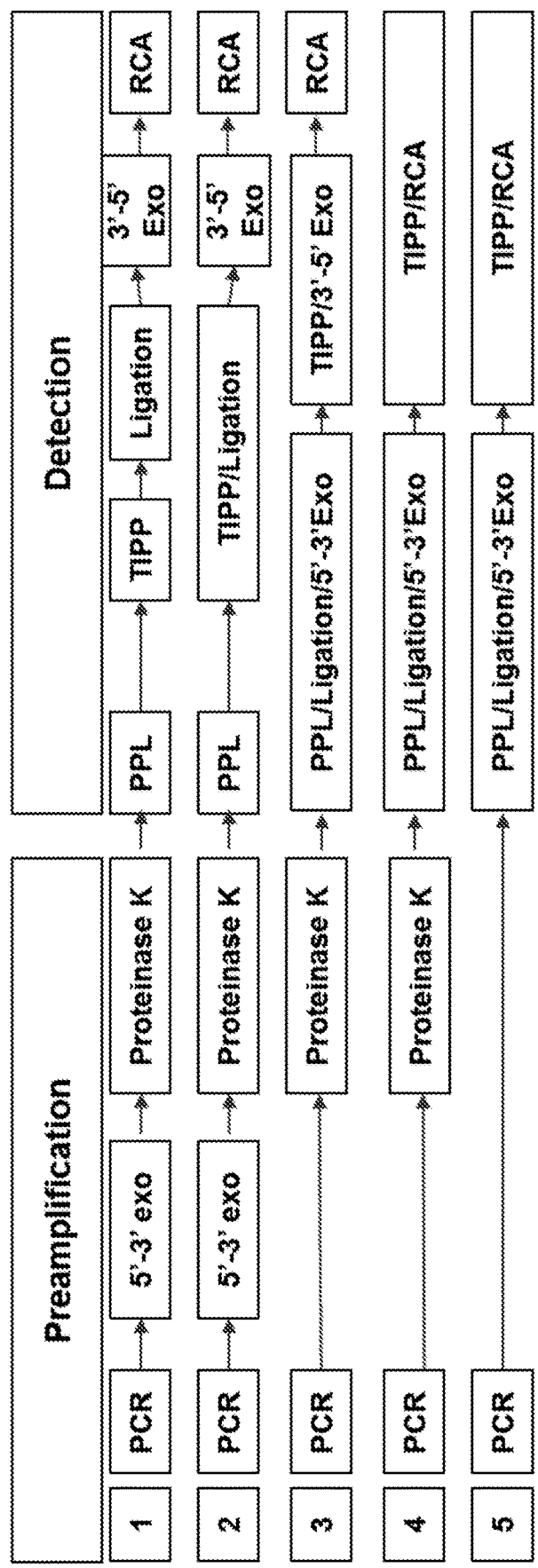
FIG. 1: Protocols for simplified polynucleotide sequence detection methods.

FIG. 1 provides an overview of the different Protocols.

The table below shows an overview of the time taken to perform each Protocol:

| Protocol | Time [min] | | | | |
|---|---|---|---|---|---|
| Step | 1 | 2 | 3 | 4 | 5 |
| PCR | | | 60-100 | | |
| Exo 5-3' | | 30 | | — | |
| Proteinase K | | 70 | | 15 | — |
| PPL | 30 | 30 | 30 | | 15 |
| Ligation | 20 | 20 | | | |
| TIPP | 10 | | 10 | 50* | |
| Exo | 10 | 10 | | | |
| RCA | | 50 | | | |
| Total time | 280-320 | 270-310 | 165-205 | 140-180 | 125-165 |

In one embodiment, TIPP is absent from any one of the protocols, methods, kits and or devices of the invention.

In one embodiment, a 5'-3' exonuclease is absent from any one of the protocols, methods, kits and or devices of the invention.

The tables below show an overview of the enzymes used in each Protocol:

| Protocol | Enzyme | | | | |
|---|---|---|---|---|---|
| Step | 1 | 2 | 3 | 4 | 5 |
| PCR | High Fidelity Polymerase, Uracil-DNA Glycosylase | | | | |
| Exo | 5-->3' Exonuclease | | | — | |
| Proteinase | Proteinase | | | — | |
| PPL Ligation | Pplase, diphosphatase Ligase | Pplase, Ligase | Pplase, Ligase, 5-->3' exo, diphosphatase | | |
| TIPP Exo | Pyrophosphatase Exonuclease 3-->5' or/and 5-->3' | Pyrophosphatase | Exonuclease 3-->5' or/and 5-->3', Pyrophosphatase | Pyrophosphatase, DNA polymerase | |
| Amplification | DNA polymerase | | | | |
| Number of enzymes | 12 | 12 | 10 | 9 | 8 |

In one embodiment, the presence of pyrophosphatase is optional.

In one embodiment, the presence of a 5'-3' exonuclease is optional.

In one embodiment, the presence of UDG is optional.

| Protocol | Enzyme | | | | |
|---|---|---|---|---|---|
| Step | 1 | 2 | 3 | 4 | 5 |
| PCR | PhusionU/Q5, UDG | | | | |
| Exo 5-3' | Lambda, PNK | | | — | |
| Proteinase K | Proteinase K | | | | |
| PPL Ligation | Mako/Klenow/BST L.F./Bsu, Apyrase E.coli Ligase/ T4 Ligase/ T3 Ligase/ HiFi Ligase/ 9oN Ligase | E.coli Ligase/ T4 Ligase/ T3 Ligase/ HiFi Ligase/ 9oN Ligase, | Mako/Klenow/ BST L.F./Bsu, E.coli Ligase/T4 Ligase/T3 Ligase/ HiFi Ligase/ 9oN Ligase, Lambda exo, Apyrase | | |
| TIPP Exo | TIPP T5, Exo III | TIPP | ExoIII, TIPP | TIPP, BST L.F/BST | |
| Amplification | BST L.F./BST 2.0 WS/Klenow/phi29 | | | 2.0 WS/Klenow/ phi29/AmpliTaq/ TaqPolymerase/ Q5/Phusion Flex | |
| Number of enzymes | 12 | 12 | 10 | 9 | 8 |

Figure 2:
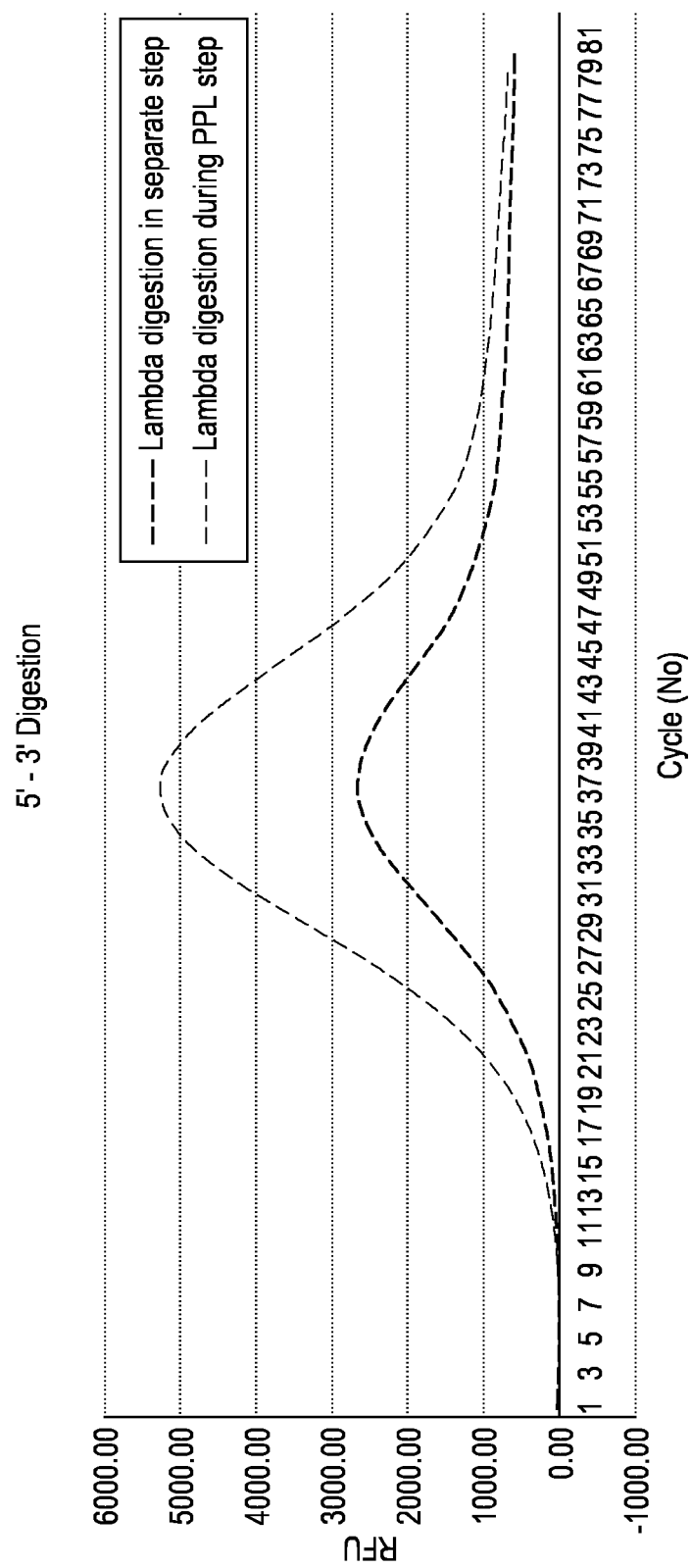
FIG. 2: A graph comparing the level of fluorescence detected (representing the presence of a particular target analyte sequence) when the 5'-3' exonuclease digestion step happens during the pre-amplification step and when it is moved to the pyrophosphorolysis/ligation step of the protocol (as in protocols 3-5). In this example, the 5'-3' exonuclease is Lambda.

As can be seen, the inventors have reduced total number of enzymes needed thus reducing the cost and complexity of the method. Surprisingly, the inventors discovered that moving the 5'-3' exonuclease addition from the pre-amplification step to the pyrophosphorolysis/ligation step of the protocol (as in protocols 3-5) results in a higher fluorescent signal (representing detection of particular target analyte sequence) as shown in FIG. 2.

Example 2: Pyrophospholysing (PPL) Enzymes

Figure 3A:
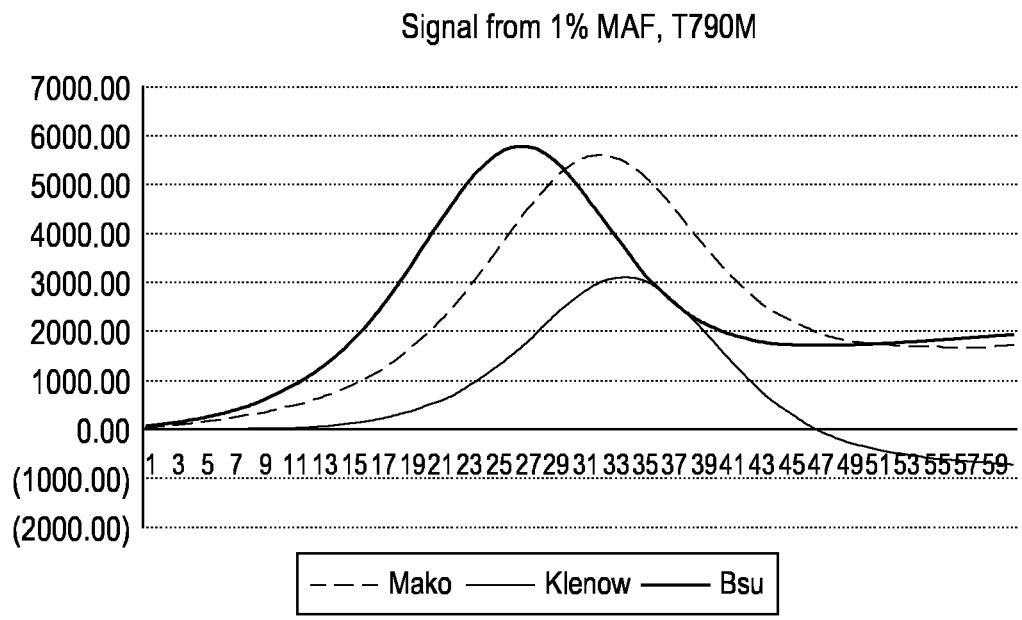
FIG. 3(A) shows detection of 1% MAF T790M using Mako, Klenow and Bsu.
Figure 3B:
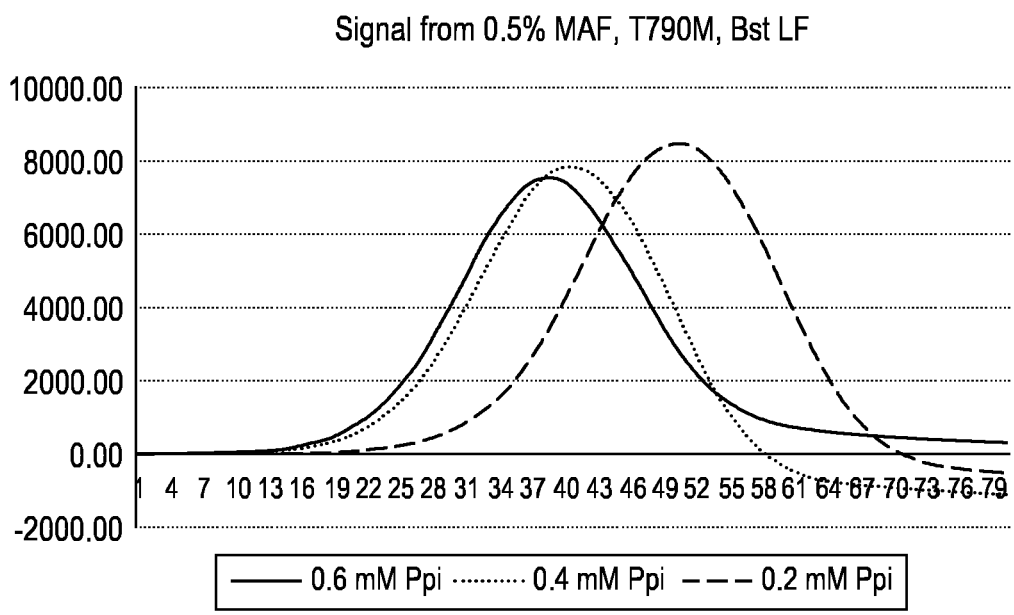
FIG. 3(B) shows the detection of 0.5% MAF T790M using Bst LF at a range of different Ppi concentrations. All four enzymes performed very well even without extended optimisation.

The inventors have tested the method of Protocol 3 of the current invention using a range of different PPL enzymes, the results of which can be seen in FIG. 3 FIG. 3(A) shows detection of 1% MAF T790M using Mako, Klenow and Bsu. FIG. 3(B) shows the detection of 0.5% MAF T790M using Bst LF at a range of different PPi concentrations.

The inventors have tested the method of Protocol 4 of the current invention using a range of different PPL enzymes, the results of which can be seen in FIG. 4.

Example 3: Protocol 1 vs Protocol 4

Figure 5:
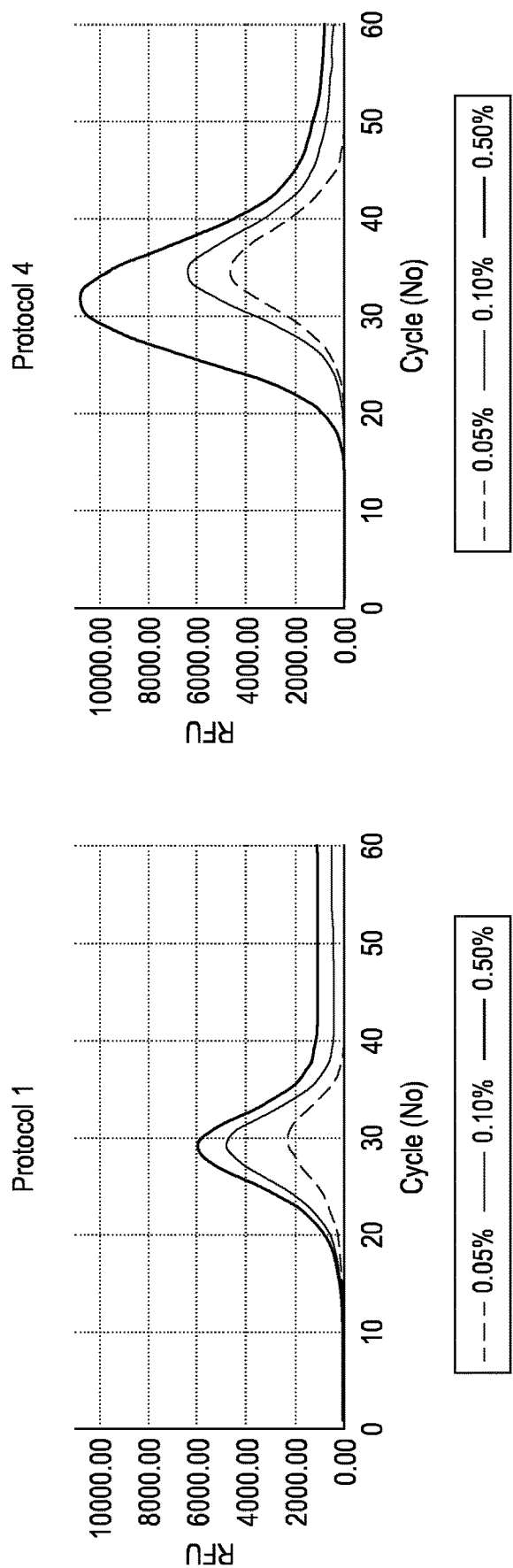
FIG. 5: Graphs showing the level of fluorescence detected (representing the presence of particular target analyte sequence) in the presence of 0.5%, 0.10% and 0.05% MAF Exon19 del_6223 using the methods according to Protocol 1 and Protocol 4.

The inventors have detected Exon19 del_6223 at 0.5%, 0.10% and 0.05% MAF, which can be seen in FIG. 5, using both Protocol 1 and Protocol 4. As can be seen, the fluorescent peaks are greater when using Protocol 4.

Example 4: Protocol 4—Sensitivity

Figure 6:
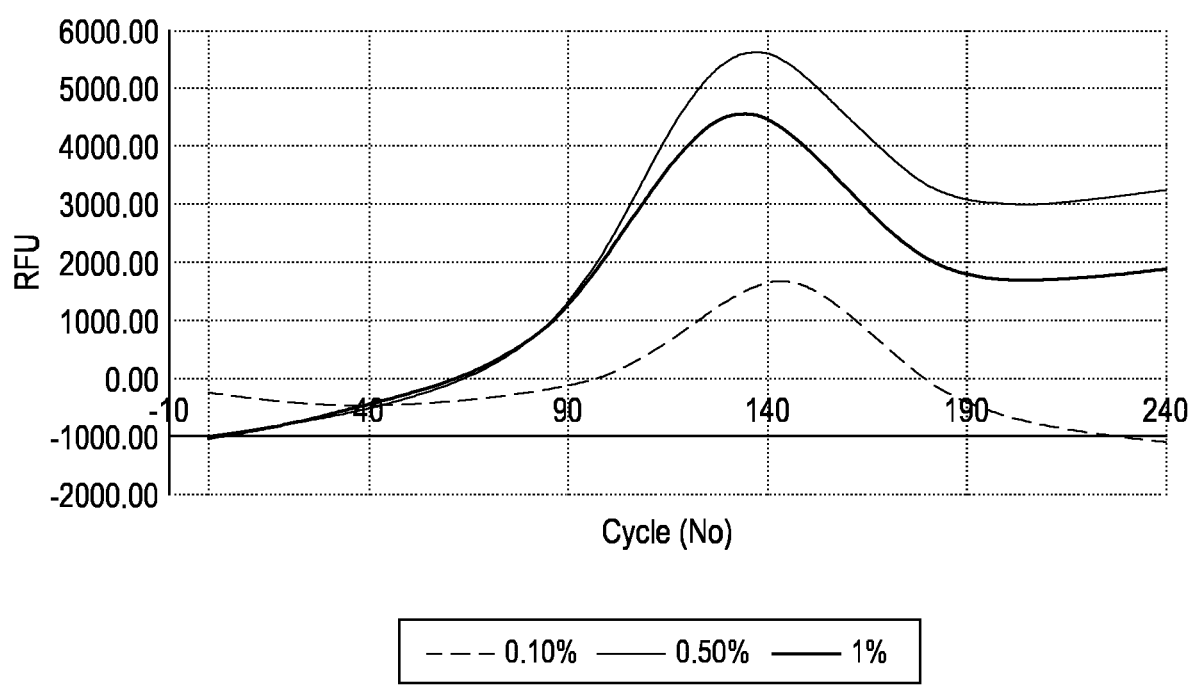
FIG. 6: The inventors have detected EGFR exon 20 T790M at 0.10%, 0.50% and 1% MAF according to Protocol 4.

The inventors have detected EGFR exon 20 T790M mutations at 0.10%, 0.50% and 1% MAF as shown in FIG. 6 according to Protocol 4.

Example 5: Protocol 4—Is an Exonuclease Digestion Step Needed During RCA?

Figure 7:
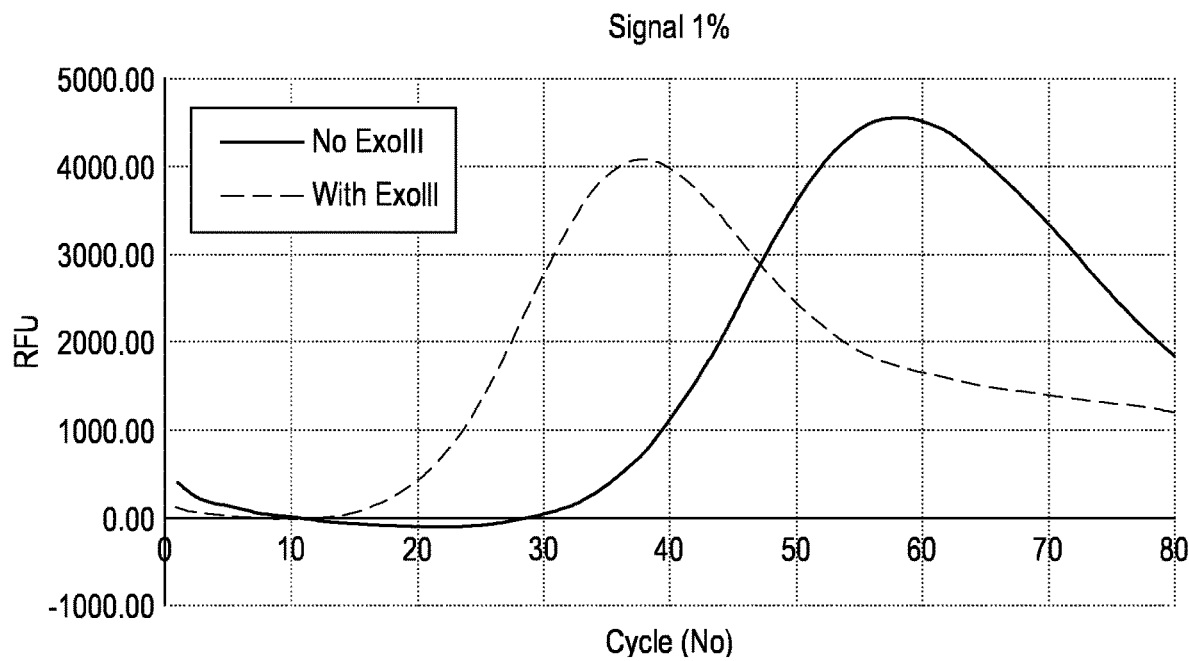
FIG. 7: Detection of the EGFR exon 20 mutation T790M at 1% MAF with and without the use of an exonuclease in the RCA step.

The inventors have demonstrated that an exonuclease digestion step during RCA is not essential. However, a detectable signal is detected later in the RCA if the exonuclease digestion step is omitted. FIG. 7 shows detection of EGFR exon 20 T790M at 1% MAF with and without the presence of an exonuclease in the RCA step.

Example 6: Protocol 4—PPL:RCA Mix Ratio

Figure 8:
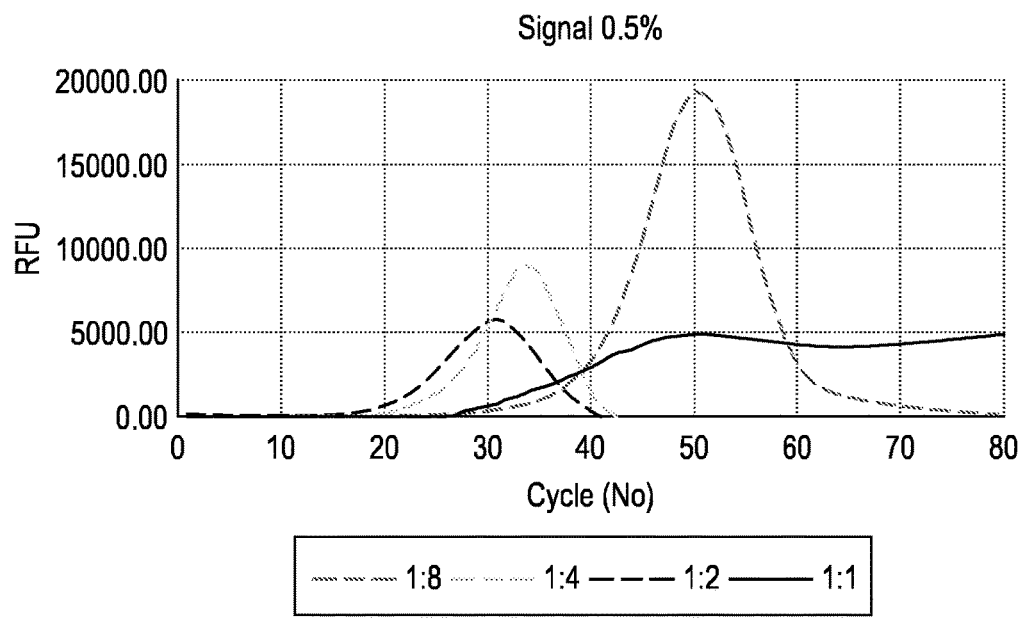
FIG. 8: The inventors have investigated what effect the PPL:RCA mix ratio has on the intensity of signal detected for 0.5% MAF EGFR exon 20 T790M, the results of which are shown in FIG. 8. As can be seen a ratio of 1:2 PPL:RCA mix results in the lowest signal intensity but at the earliest time point. This is followed closely in time by 1:4 PPL:RCA mix which has a greater signal intensity. The largest signal intensity is seen for 1:8 PPL:RCA mix at the latest time point in the reaction.

The inventors have investigated what effect the PPL:RCA mix ratio has on the intensity of signal detected for 0.5% MAF EGFR exon 20 T790M, the results of which are shown in FIG. 8. As can be seen a ratio of 1:2 PPL:RCA mix results in the lowest signal intensity but at the earliest time point. This is followed closely in time by 1:4 PPL:RCA mix which has a greater signal intensity. The largest signal intensity is seen for 1:8 PPL:RCA mix at the latest time point in the reaction.

Example 7: Protocol 4—Dye Choice

Figure 9:
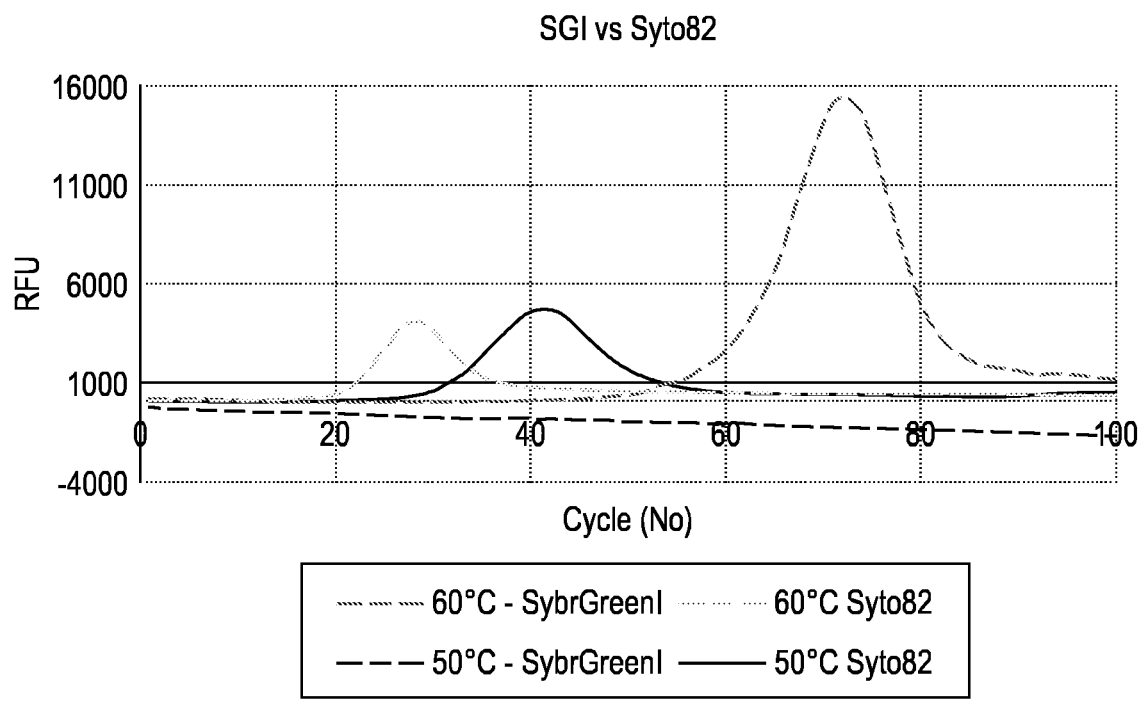
FIG. 9: shows the results of comparison experiments performed according to Protocol 4 using SybrGreenI (50° C. and 60° C.) and Syto82 (50° C. and 60° C.).

The inventors have investigated whether the dye used during RCA can be optimised. FIG. 9 shows the results of comparison experiments performed according to Protocol 4 using SybrGreenI (50° C. and 60° C.) and Syto82 (50° C. and 60° C.). The Syto82 dye allows the RCA to be run at a lower temperature of 50° C., whereas SybrGreenI requires the higher 60° C. temperature. A lower RCA temperature is needed for Protocol 5 which removes the addition of Proteinase K to the reaction mixture. The amplification enzyme used for preparing at least one single-stranded analyte of a nucleic acid comprised of a target polynucleotide region, for detection using the methods of the current invention, requires a temperature of greater than 50° C. to work. The use of SybrGreenI necessitates a reaction temperature of 60° C. and thus Proteinase K must be added at some point during the method to deactivate the amplification enzyme prior to RCA.

A lower RCA temperature may allow the methods of the invention to be carried out in a plate reader instead of qPCR.

The reaction utilising Syto82 is faster, as can be seen in FIG. 9, and although the total amount of fluorescence is lower for Syto82—this can be alleviated by the use of a higher concentration of Syto82 dye.

Example 8: Protocol 4—BST L.F. vs BST 2.0 WS

Figure 10:
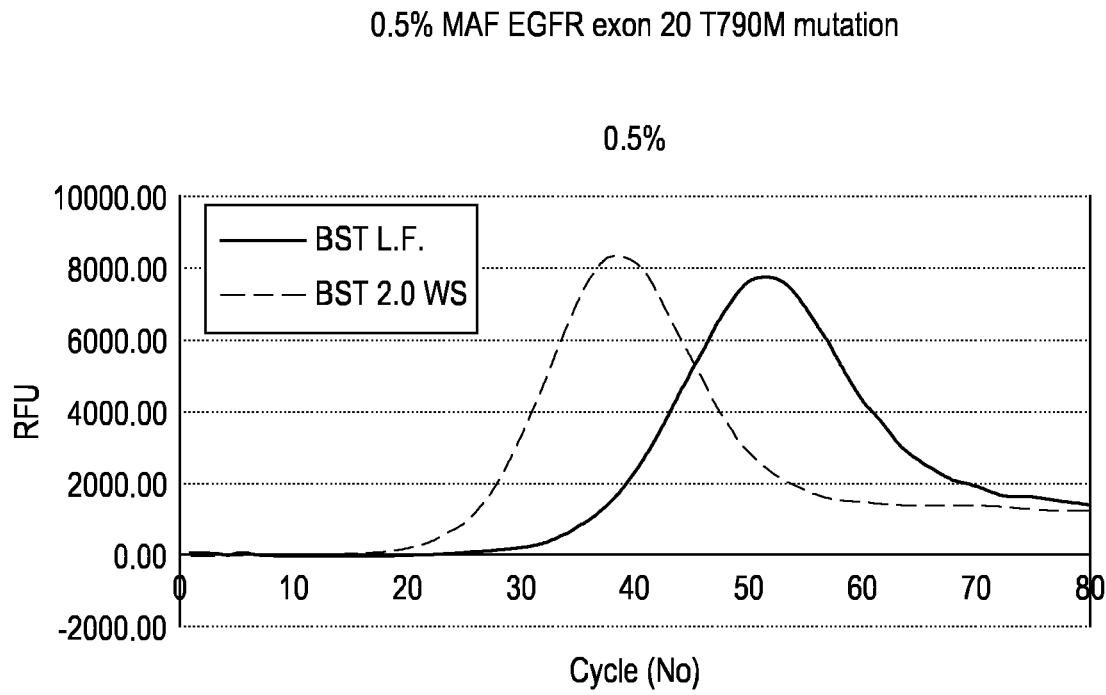
FIG. 10: The inventors have investigated the use of two different enzymes, BST L.F and BST 2.0 WS, for RCA according to Protocol 4.

The inventors have investigated the use of two different enzymes, BST L.F and BST 2.0 WS, for RCA according to Protocol 4 to detect 0.5% MAF EGFR exon 20 T790M mutation. The results of this are shown in FIG. 10 where it can be seen that the reaction is fastest with BST 2.0 WS. BST 2.0 WS is designed to incorporate dUTP, which helps with the speed of the reaction. There is a negligible difference in total signal intensity achieved between BST L.F. and BST 2.0 WS. According to its description, provided by New England Biolabs (NEB), BST 2.0 WS should be more stable and active only above 45° C.

Example 9: Effect of PPL Enzymes on Signal Detection

Figures 11A, 11B:
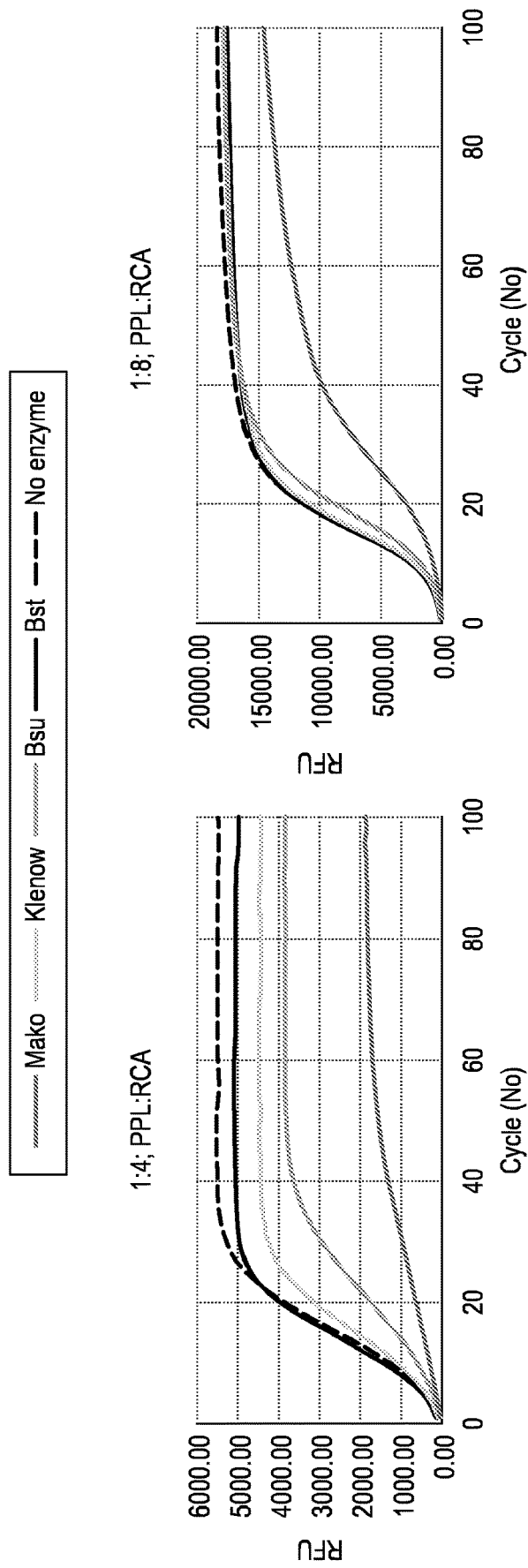
FIG. 11: The inventors have investigated the effect of different PPL enzymes on the RCA reaction at different PPL:RCA reaction mixture ratios. The results of which can be seen in FIG. 11(A) 1:4 PPL:RCA and FIG. 11(B) 1:8 PPL:RCA. All PPL enzymes impact the RCA reaction at 1:4 PPL:RCA ratio other than BST L.F. At 1:8 PPL:RCA ratio, all enzymes apart from BST L.F and Klenow impact the RCA reaction.

The inventors have investigated the effect of different PPL enzymes on the RCA reaction at different PPL:RCA reaction mixture ratios. The results of which can be seen in FIG. 11(A) 1:4 PPL:RCA and FIG. 11(B) 1:8 PPL:RCA. All PPL enzymes, excepting BST, impact the RCA reaction at 1:4 PPL:RCA ration. At 1:8 PPL:RCA ratio, BST and Klenow have no impact on the RCA reaction.

Example 10: Pyrophosphorolysis, Ligation Specificity Against Single Nucleotide Mismatches A single-stranded first oligonucleotide 1 (SEQ ID NO: 1) was prepared, having the following nucleotide sequence:

5'-/5Phos/A*T*G*TTCGATGAGCTTTGACAATACTTGAAGCTCGCAG

ATATAGGATGTTGCGATAGTCCAGGAGGCTGC-3'

A single-stranded ligating oligonucleotide 2 (SEQ ID NO: 2) was prepared, having the following nucleotide sequence:

5'-TGTCAAAGCTCATCGAACATCCTGGACTATGTCTCC-3' wherein A, C, G, and T represent nucleotides bearing the relevant characteristic nucleobase of DNA, /5Phos/ represent 5' end phosphate

* represent phosphorothioate bond

A set of single-stranded oligonucleotides 3-4 (SEQ ID Nos: 3-4) was also prepared, having the following nucleotide sequences in the 5' to 3' direction:

3:
TGCTGGGCATCTGCCTCACCTCCACCGTGCAGCTCATCACGCAGCTCATG

CCCTTCGGCAGCCTCCTGGACTATG

4:
TGCTGGGCATCTGCCTCACCTCCACCGTGCAGCTCATCACGCAGCTCATG

CCCTTCGGCTGCCTCCTGGACTATG wherein oligonucleotide 3 includes a 17 base region complementary to the 17 bases at the 3' end of oligonucleotide 1 and oligonucleotide 4 include the same region with single nucleotide mismatches at positions 3. SEQ IDs 3 and 4 are part of the human EGFR gene with/without the C797S mutation respectively.

A first reaction mixture was then prepared, having a composition corresponding to that derived from the following formulation:

0.5 uL 20× buffer pH 7.0
    0.25 ul 5× buffer pH 8.0
    0.25 ul 5× HF buffer
    0.2 uL oligonucleotide 1, 1000 nM
    0.3 ul oligonucleotide 2, 1000 nM
    1 uL oligonucleotide 2 (500 nM) or mixture of oligo 2 and 3 (500 and 0.5 nM respectively),
    0.3 U Klenow Fragment exo-(NEB)
    0.01 uL inorganic pyrophosphate, 10 mM
    0.0132 U Apyrase (ex. NEB)
    1 U E. coli DNA Ligase (ex. NEB)
    Water to 10 ul wherein the 20× buffer comprised the following mixture:
    200 uL Tris Acetate, 1M, pH 7.0
    342.5 ul aqueous Magnesium Acetate, 1M
    120 ul aqueous Potassium Acetate, 5M
    50 uL Triton X-100 surfactant (10%)
    Water to 1 ml wherein the 5× buffer comprised the following mixture:
    50 ul Trizma Acetate, 1M, pH 8.0
    25 uL aqueous Magnesium Acetate, 1M
    25 ul aqueous Potassium Acetate, 5M
    50 uL Triton X-100 surfactant (10%)
    Water to 1 ml Pyrophosphorolysis, followed by circularisation, via ligation of, oligonucleotide 1 was then carried out by incubating the mixture at 45° C. for 15 minutes and the resulting product mixture was used in the amplification reaction (Example 11).

Example 11: Amplification of Circularised Probe

A pair of single stranded oligonucleotide primers 1 (SEQ ID NO: 5) and 2 (SEQ ID NO: 6) were prepared, having the following nucleotide sequences:

1: TCGCAACATCCTATATCTGC

2: TGAGCTTTGACAATACTTGA wherein A, C, G, and T represent nucleotides bearing the relevant characteristic nucleobase of DNA.

A second reaction mixture was then prepared, having a composition corresponding to that derived from the following formulation:
    3 ul 10× Thermopol buffer
    3.2 U BST 2.0 WS
    0.32 ul oligonucleotide 1, 10 uM
    0.32 ul oligonucleotide 2, 10 uM
    1.125 ul Syto82, 30 uM
    0.165 U Inorganic Pyrophosphatase
    1.2 ul dNTPs mix, 10 mM
    1.25 ul reaction mixture in Example 10
    Water to 11.25 ul wherein the 10× Thermopol buffer comprised the following mixture:
    200 uL Tris-HCl PH=8.8, 1M
    100 uL NH4)2SO4, 1M
    100 uL mM KCl, 1M
    20 mM MgSO4, 1M
    10 uL Triton® X-100, 10%

Water to 1 ml

Figure 12:
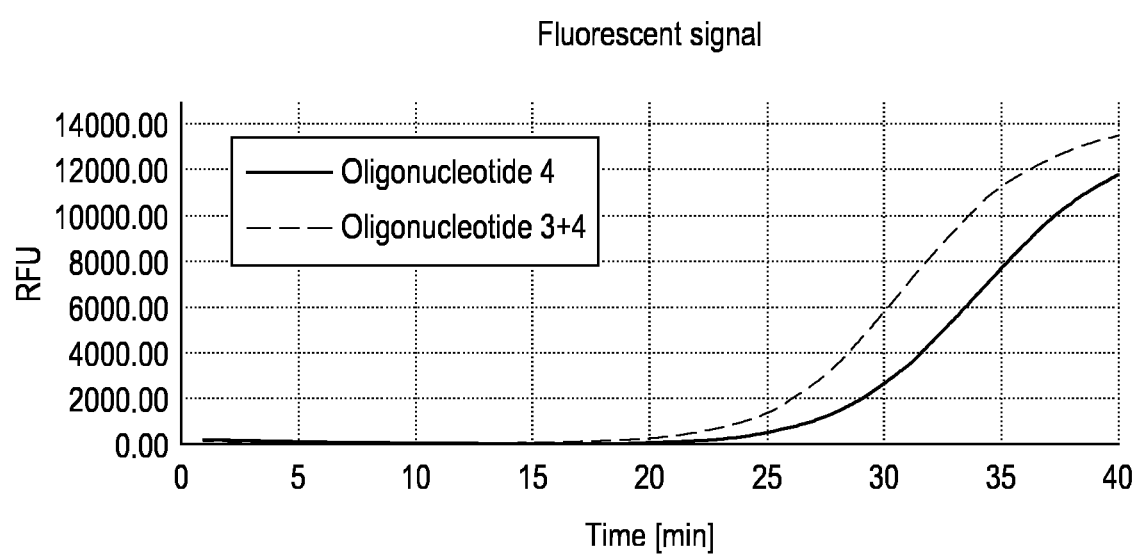
FIG. 12: Fluorescence measurement results for Example 11 showing that when oligonucleotide 3 and 4 are both present, the fluorescent signal appears faster in the reaction, showing that pyrophosphorolysis and ligation of oligonucleotide 3 has occurred in the first reaction mixture.

The reaction mix was then incubated at 50° C. for 40 minute and the resulting reaction product was then analysed by real-time fluorescence. The results of which are shown in FIG. 12. From this analysis it can be seen that when oligonucleotide 3 and 4 are both present, the fluorescent signal appears faster in the reaction, showing that pyrophosphorolysis and ligation of oligonucleotide 3 has occurred in the first reaction mixture.

Example 12: Multi-Colour Detection Using Sunrise Primers

1. Target Oligo Dilution
   WT oligo dilution is made up of the following ingredients;
   0.5× A7 buffer
   0.5× Phusion U buffer
   200 nM WT oligonucleotide (SEQ ID NO: 7)
   Total volume: 5 uL
   T790M and C797S 1% AF mutant oligo mix:
   0.5× A7 buffer
   0.5× Phusion U buffer
   100 nM WT oligonucleotide (SEQ ID NO: 7)
   2 nM T790M oligonucleotide (SEQ ID NO: 8)
   2 nM C797S_2389 oligo (SEQ ID NO: 9)
   Total volume: 5 uL

```
WT oligonucleotide (SEQ ID NO: 7):
5'-CATCTGCCTCACCTCCACCGTGCAGCTCATCACGCAGCTCATGCCCT
TCGGCTGCCTCCTGGACTATGTCCGGGAACACAAAGACAATAT-3'

T790M oligonucleotide (SEQ ID NO: 8):
5'-CATCTGCCTCACCTCCACCGTGCAGCTCATCATGCAGCTCATGCCCT
TCGGCTGCCTCCTGGACTATGTCCGGGAACACAAAGACAATAT-3'

C797S_2389 oligonucleotide (SEQ ID NO: 9):
5'-CATCTGCCTCACCTCCACCGTGCAGCTCATCACGCAGCTCATGCCCT
TCGGCAGCCTCCTGGACTATGTCCGGGAACACAAAGACAATAT-3'
```

1×A7 Composition
   Tris Acetate pH=8.0 10 mM
   Potassium Acetate 25 mM
   Magnesium Acetate 5 mM
   Triton-X 0.01%
PhusionU Buffer
   The PhusionU buffer composition is not publicly available.
2. PPL
   A mixture was prepared corresponding to:
   1×BFF1
   37.5 U/ml Mako DNA Polymerase (3'→5' exo-)
   100 U/mL E. coli Ligase
   1.2 U/mL apyrase
   0.6 mM PPi
   20 nM T790M probe
   20 nM C797S_2389 probe
   30 nM T790M splint oligonucleotide
   30 nM C797S_2389 splint oligonucleotide
   5 uL of WT or 1% AF mutant dilution point 1.
   Total volume 10 uL
   This mixture was then incubated at 41° C. for 30 min.
1×BFF1 Composition
   Tris Acetate pH=7.0 10 mM
   Potassium Acetate 30 mM
   Magnesium Acetate 17.125 mM
   Triton-X 0.01%

```
T790M probe (SEQ ID NO: 10):
5'-/5Phos/A*T*G*TTCGATGAGCTTTGACAATACTTGAGCACGGCAG
ATATAGGATGTTGCGAAGGGCATGAGCTGCATGATGAGCTG-3'

C797S_2389 probe (SEQ ID NO: 11):
5'-/5Phos/A*T*G*TTCGATGAGCTTTGACAATACTTGAAGCTCGCAG
ATATAGGATGTTGCGATAGTCCAGGAGGCTGC-3'
where * represents a phosphorothioate bond
```

3. TIPP
   A mixture was prepared corresponding to:
   1×A7
   66.6 U/mL TIPP
   10 ul mixture from point 2.
   Total volume: 20 uL
   This mixture was then incubated at 25° C. for 5 min, 95° C. for 5 min.
4. Ligation
   A mixture was prepared corresponding to:
   1×A7
   100 U/mL E. coli ligase
   20 ul mixture from point 3.
   10 nM T790M splint oligonucleotide
   nM C797S_2389 splint oligonucleotide
   Total volume: 30 uL
   This mixture was then incubated at 37° C. for 10 min, 95° C. for 10 min.

```
T790M splint oligonucleotide (SEQ ID NO: 12):
5'-TGTCAAAGCTCATCGAACATGCCCTTCGCAACATCT-3'

C797S_2389 splint oligonucleotide (SEQ ID NO: 13):
5'-TGTCAAAGCTCATCGAACATTCCTGGACTATCGCAT-3'
```

5. Exonuclease Treatment
   A mixture was prepared corresponding to:
   1×A7
   100 U/mL E. coli ligase
   30 ul mixture from point 4.
   625 U/ml of Exonuclease III
   62.5 U/mL T5 Exonuclease
   Total volume: 40 uL
   This mixture was then incubated at 30° C. for 5 min, 95° C. for 5 min.
6. RCA
   A mixture corresponding to the following was prepared:
   1× Thermopol buffer (53.2 mM Tris-HCl, 26.6 mM $(NH_4)_2SO_4$, 26.6 mM KCl, 5.32 mM $MgSO_4$, 0.266% Triton® X-100, pH 8.8)
   0.2 uM Primer mix 1
   0.4 uM Reverse primer
   533.3 U/mL BST L.F.
   0.4 mM dNTPs
   10 ul of reaction mixture from point 5.
   Total volume 15 uL
Primer Mix 1:

```
Cy5 primer (SEQ ID NO: 14):
5'-/Qusar670/ACGCCTGGTTACCGAGCCAGGTTCGCACATGTAGGCT
CGGTAACCAGGCG/BHQ2/ACATCCTATATCTGCCGTGC-3'
```

```
-continued
TexasRed primer (SEQ ID NO: 15):
5'-/TexasRed/ACGCCTGGTTACAGGTTCGCACATGTAGTAACCAGGC G/BHQ2/CAACATCCTATATCTGCGAG-3'
where/BHQ2/represents Black Hole Quencher;

Reverse primer (SEQ ID NO: 16):
5'-ATGTTCGATGAGCTTTGACA-3'
```

Figure 13:
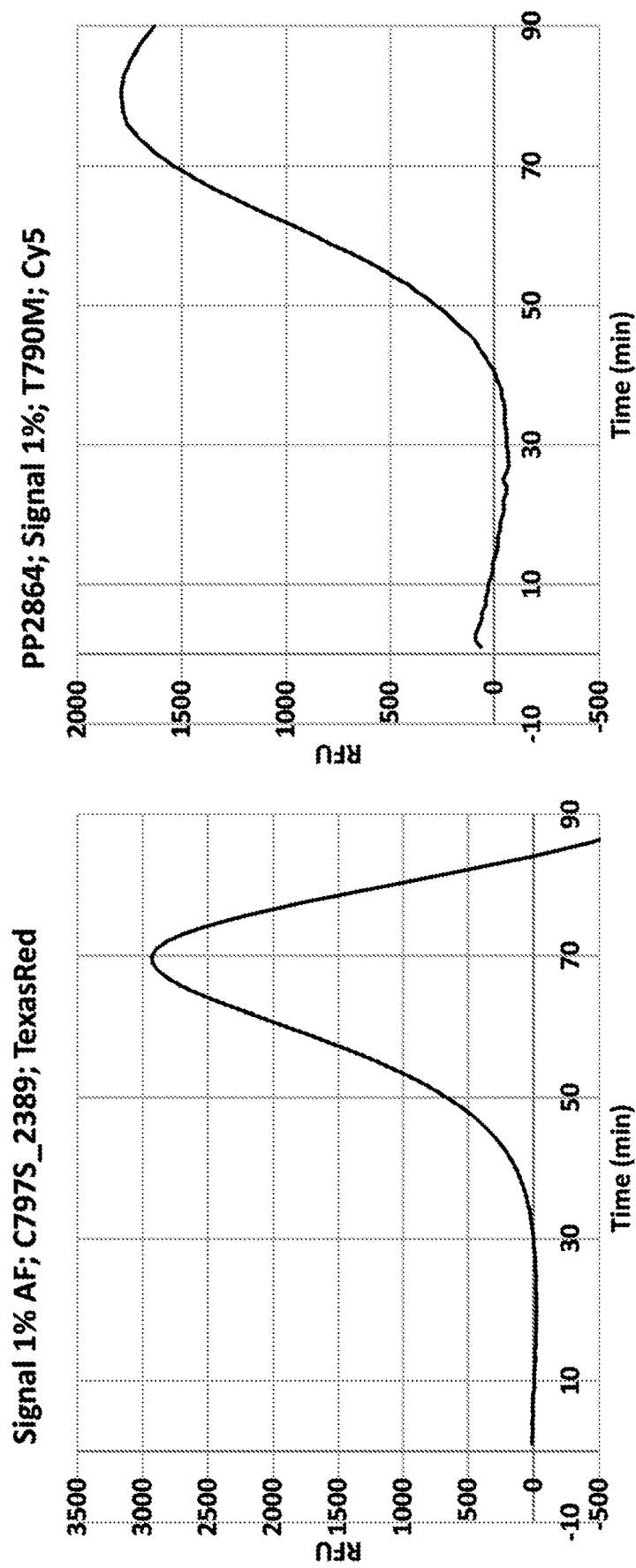
FIG. 13: Detection of T790M and C797S_2389 mutations at 1% allele fraction in the same reaction.

The mixture was then incubated at 60° C. for 90 min. Fluorescent measurements were taken every 1 minute. Cq was obtained based on auto-threshold given by Bio-rad machine. The results of this can be seen in FIG. 13.

Example 13: Multi-Colour Detection Using Molecular Zippers

1. Target Oligo Dilution
  WT oligo dilution is made of following ingredients
  0.5× A7 buffer
  0.5× Q5 U buffer
  100 nM WT oligonucleotide (SEQ ID NO: 17)
  Total volume: 1.25 uL
  G719X_6239, G719X_6252, G719X_6253 0.5% AF mutant oligonucleotide mix:
  0.5× A7 buffer
  0.5× Q5 U buffer
  100 nM WT oligonucleotide (SEQ ID NO: 17)
  0.5 nM G719X_6239 oligonucleotide (SEQ ID NO: 18)
  0.5 nM G719X_6252 oligonucleotide (SEQ ID NO: 19)
  0.5 nM G719X_6253 oligonucleotide (SEQ ID NO: 20)
  Total volume: 1.25 uL

```
WT oligonucleotide (SEQ ID NO: 17):
5'-CCCAACCAAGCTCTCTTGAGGATCTTGAAGGAAACTGAATTCAAAAA

GATCAAAGTGCTGGGCTCCGGTGCGTTCGGCACGGTGTATAAGGTAAGGT

CCC-3'

G719X_6239 oligonucleotide (SEQ ID NO: 18):
5'-CCCAACCAAGCTCTCTTGAGGATCTTGAAGGAAACTGAATTCAAAAA

GATCAAAGTGCTGGCCTCCGGTGCGTTCGGCACGGTGTATAAGGTAAGGT

CCC-3'

G719X_6252 oligonucleotide (SEQ ID NO: 19):
5'-CCCAACCAAGCTCTCTTGAGGATCTTGAAGGAAACTGAATTCAAAAA

GATCAAAGTGCTGAGCTCCGGTGCGTTCGGCACGGTGTATAAGGTAAGGT

CCC-3'

G719X_6253 oligonucleotide (SEQ ID NO: 20):
5'-CCCAACCAAGCTCTCTTGAGGATCTTGAAGGAAACTGAATTCAAAAA

GATCAAAGTGCTGTGCTCCGGTGCGTTCGGCACGGTGTATAAGGTAAGGT

CCC-3'
```

1×A7 Composition
  Tris Acetate pH=8.0 10 mM
  Potassium Acetate 25 mM
  Magnesium Acetate 5 mM
  Triton-X 0.01%
Q5 U Buffer
  The Q5 U buffer composition is not publicly available.

2. Pyrophosphorolysis (PPL) and Ligation
  A mixture was prepared corresponding to:
  1×BFF1
  10 U/mL Klenow (exo-)
  100 U/mL E. coli Ligase
  1.2 U/mL apyrase
  100 U/mL Lambda exo
  0.25 mM PPi
  6.6 nM G719X_6239 probe oligonucleotide (SEQ ID NO: 21)
  6.6 nM G719X_6252 probe oligonucleotide (SEQ ID NO: 22)
  6.6 nM G719X_6253 probe oligonucleotide (SEQ ID NO: 23)
  30 nM splint oligonucleotide (SEQ ID NO: 24)
  1.25 ul of mixture from point 2.
  Total volume 10 uL
  This mixture was then incubated at 45° C. for 15 min.
1×BFF1 Composition
  Tris Acetate pH=7.0 10 mM
  Potassium Acetate 30 mM
  Magnesium Acetate 17.125 mM
  Triton-X 0.01%

```
G719X_6239 probe oligonucleotide (SEQ ID NO: 21):
5'-/5Phos/A*T*G*TTCGATGAGCTTTGACAATACTTGACATGCGCAG

ATATAGGATGTTGCGAAACGCACCGGAGGCCAGCACTTTG-3'

G719X_6252 probe oligonucleotide (SEQ ID NO: 22):
5'-/5Phos/A*T*G*TTCGATGAGCTTTGACAATACTTGACATGCCGAG

TAATGAGAGTTTCGCAAACGCACCGGAGCTCAGCACTTTG-3'

G719X_6253 probe oligonucleotide (SEQ ID NO: 23):
5'-/5Phos/A*T*G*TTCGATGAGCTTTGACAATACTTGACATGCGAGC

AATTAGGTAGTGTCGTAACGCACCGGAGCACAGCACTTTG-3'

Splint oligonucleotide (SEQ ID NO: 24):
5'-TGTCAAAGCTCATCGAACATCCGGTGCGTTCGGCAA-5'
where * represents a phosphorothioate bond
```

3. Detection—RCA
  A mixture corresponding to the following was prepared:
  2.66× Thermopol buffer (53.2 mM Tris-HCl, 26.6 mM $(NH_4)_2SO_4$, 26.6 mM KCl, 5.32 mM $MgSO_4$, 0.266% Triton® X-100, pH 8.8)
  0.28 uM Dye primer mix 1
  0.56 uM Quencher primer 1
  0.28 uM Quencher primer 2
  0.84 uM Reverse primer
  568.8 U/mL BST 2.0 WarmStart
  14.67 U/mL TIPP
  1.06 mM dNTPs
  1.25 ul of reaction mixture from point 2.
  Total volume 11.25 ul
Dye Primer Mix 1 Consists of:

```
Dye primer 1 (SEQ ID NO: 25):
5'-/5Cy5/A*CTGACCAGCTCCATGACAATCGCTGTCGCCATGATCGAT

CGCAACATCCTATATCTGC-3'

Dye primer 2 (SEQ ID NO: 26):
5'-/5TEX615/A*CTGACCAGCTCCATGACAATCGCTGTCGCCATGATC

GATGCGAAACTCTCATTACTCG-3'
```

-continued

```
Dye primer 3 (SEQ ID NO: 27):
5'-/5HEX615/T*ACGACCGACTCACTCCTTACAGCAGTCCGCAGTATG CTACGACACTACCTAATTGCTC-3'
where * represents a phosphorothioate bond, /5Cy5/
represent Cy5 dye on 5' end, /5TEX615
represent TEX dye on 5' end, /5HEX/ represents Hex
dye on 5' end Quencher primer 1 (SEQ ID NO: 28):
5'-TCGATCATGGCGACAGCGATTGTCATGGAGCTGGTCAGT/

3IAbRQSp/-3'
where /3IAbRQSp/ represents 3' Iowa Black ® RQ
quencher

Quencher primer 2 (SEQ ID NO: 29):
5'-AGCATACTGCGGACTGCTGTAAGGAGTGAGTCGGTCGTA/

3IABkFQ/-3'
where /3IABkFQ/ represents 3' Iowa Black ® FQ
quencher

Reverse primer (SEQ ID NO: 30):
5'-T*G*AGCTTTGACAATACTTGA-3'
where * represents a phosphorothioate bond
```

Figure 14:
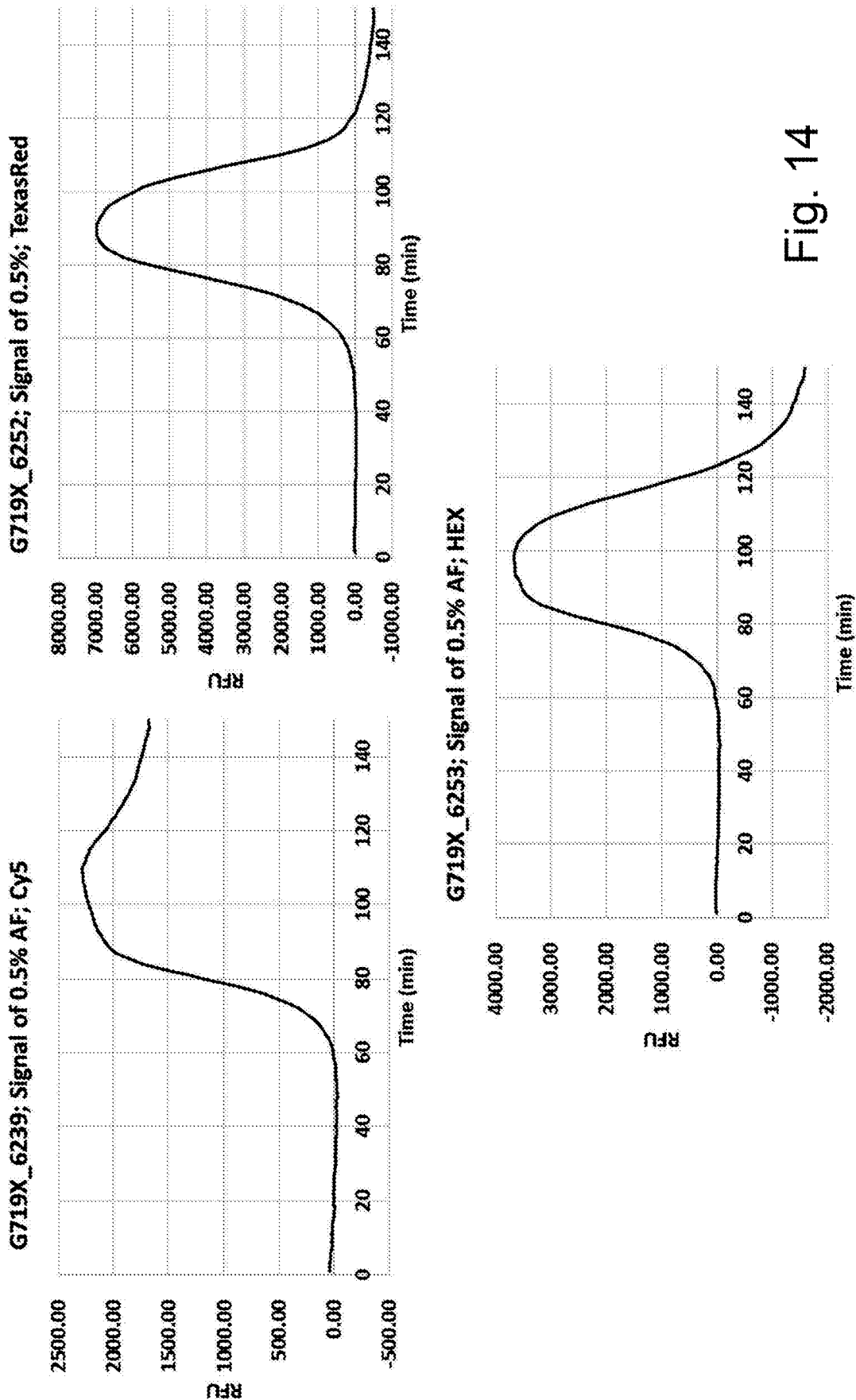
FIG. 14: Detection of three mutations at the same time in one well at 0.5% allele fraction: G719X_6239, G719X_6252, G719X_6253.

The mixture was then incubated at 58° C. for 150 min. Fluorescent measurements were taken every 1 minute. The results of this can be seen in FIG. 14.

Example 14: Pyrophosphorolysis and Ligation Against Target

1. Oligonucleotide Dilution Preparation

Dilution of oligonucleotides were prepared in 0.5×A7 and 0.5×Q5 buffer:
WT oligonucleotide 200 nM
+/−Mutant oligonucleotide 500 pM
Total volume 1.25 ul

```
WT oligonucleotide (SEQ ID NO 31):
5'-CTGCTGGGCATCTGCCTCACCTCCACCGTGCAGCTCATCACGCAGCT

CATGCCCTTCGGCTGCCTCCTGGACTATGTCCGG-3'

Mutant oligonucleotide (SEQ ID NO 32):
5'-CTGCTGGGCATCTGCCTCACCTCCACCGTGCAGCTCATCATGCAGCT

CATGCCCTTCGGCTGCCTCCTGGACTATGTCCGG-3'
```

2. Pyrophosphorolysis and Ligation

A PPL mixture was prepared consisting of:
1×BFF1
10 U/mL Klenow (exo-)
100 U/mL E. coli Ligase
1.2 U/mL apyrase
100 U/mL Lambda exo
0.25 mM PPi
20 nM Probe $A_0$
1.25 uL Oligos from point 1
Total volume 10 uL

```
Probe A0 (SEQ ID NO 33):
5'-/5Phos/A*G*C*TGCATCTGAGCTTTGACAATACTTGAGCACGGCA

GATATAGGATGTTGCGAAGGGCATGAGCTGCATGATG-3'
where * Phosphorothioate bonds
```

1×BFF1 Composition
Tris Acetate pH=7.0 10 mM
Potassium Acetate 30 mM
Magnesium Acetate 17.125 mM
Triton-X 0.01%

1×A7 Composition
Tris Acetate pH=8.0 10 mM
Potassium Acetate 25 mM
Magnesium Acetate 5 mM
Triton-X 0.01%

Q5 Buffer

The Q5 buffer composition is not publicly available.

The resulting mixture was incubated at 45° C. for 15 minutes.

3. Detection—RCA

A RCA mixture was prepared consisting of:
2.66× Thermopol buffer (53.2 mM Tris-HCl, 26.6 mM $(NH_4)_2SO_4$, 26.6 mM KCl, 5.32 mM $MgSO_4$, 0.266% Triton-X, pH 8.8)
0.28 uM Primer mix
284.4 U/mL BST 2.0 WarmStart
14.67 U/mL TIPP
1.06 mM dNTPs
Syto82 dye 3 uM
1.25 ul of reaction from point 2
Total volume 11.25 ul

```
Primer mix:
Fwd (SEQ ID NO 34):
5'-T*C*GCAACATCCTATATCTGC-3'

Rev (SEQ ID NO 35):
5'-ATGTTGCGAAGGGCATATGT-3'
```

The resulting mixture was incubated at 50° C. for 70 minutes.

Fluorescent readings were taken every 1 minute. The results can be seen in FIG. 16.

Example 15: Further Selected Applications of the Invention and Embodiments KRAS Detection The KRAS gene controls cell proliferation, when it is mutated this negative signalling is disrupted and cells are able to continuously proliferate, often developing into cancer. A single amino acid substitution, and in particular a single nucleotide substitution, is responsible for an activating mutation implicated in various cancers: lung adenocarcinoma, mucinous adenoma, ductal carcinoma of the pancreas and colorectal cancer. KRAS mutations have been used as prognostic biomarkers, for example, in lung cancer.

Driver mutations in KRAS are associated with up to 20% of human cancers and there are targeted therapies in development against this mutation and its associated disease(s), a non-limiting list of some such therapies can be seen in the table below:

| Name | Target | Manufacturer | Status | Brand Name(s) |
|---|---|---|---|---|
| AMG 510 | $KRAS^{G12C}$ | Amgen | Trials | N/A |
| MRTX-849 | $KRAS^{G12C}$ | Mirati Therapeutics | Trials | N/A |
| ARS-3248 | $KRAS^{G12C}$ | Wellspring Biosciences, Inc/Janssen Biotech, Inc. | Trials | N/A |

The presence of KRAS mutation has been found to reflect a very poor response to the EGFR inhibitors panitumumab (Vectibix) and cetuximab (Erbitux). Activating mutations in the gene that encodes KRAS occurs in 30%-50% of colorectal cancers and studies show that patients whose tumours express this mutated version of the KRAS gene will not respond to panitumumab and cetuximab. The presence of the wild-type KRAS gene is not a guarantee that a patient will respond to these drugs, however, studies have shown that cetuximab has significant efficacy in metastatic colorectal cancer patients with wild-type KRAS tumours. Lung cancer patients who are positive for KRAS mutation (wild-type EGFR) have a response rate estimated at 5% or less for the EGFR antagonists erlotinib or gefitinib compared with a 60% response rate in patients who do not possess a KRAS mutation.

The early detection of the emergence of KRAS mutations (activating or over-expression), a frequent driver of acquired resistance to cetuximab therapy (anti-EGFR therapy) in colorectal cancers, allows the modification of treatment (for example the early initiation of a mitogen-activated protein kinase kinase [MEK] inhibitor) to delay or reverse resistance and thus it is advantageous that the methods of the current invention allow the quick and cheap detection of the KRAS status of patients.

A non-limiting list of mutations is: G12D, G12A, G12C, G13D, G12V, G12S, G12R, A59T/E/G, Q61H, Q61K, Q61R/L, K117N and A146P/T/V.

A further non-limiting list of mutations is shown in the table below:

| Exon | Mutation name | COSM Number | Mutation sequence |
|---|---|---|---|
| 2 | G12A | COSM522 | c.35G>C |
| 2 | G12C | COSM516 | c.34G>T |
| 2 | G12D | COSM521 | c.35G>A |
| 2 | G12F | COSM512 | c.34_35delinsTT |
| 2 | G12R | COSM518 | c.34G>C |
| 2 | G12S | COSM517 | c.34G>A |
| 2 | G12V | COSM520 | c.35G>T |
| 2 | G12V | COSM515 | c.35_36delinsTC |
| 2 | G13A | COSM533 | c.38G>C |
| 2 | G13C | COSM527 | c.37G>T |
| 2 | G13D | COSM532 | c.38G>A |
| 2 | G13R | COSM529 | c.37G>C |
| 2 | G13S | COSM528 | c.37G>A |
| 3 | Q61E | COSM550 | c.181C>G |
| 3 | Q61H | COSM1146992 | c.183A>T |
| 3 | Q61H | COSM554/ COSM1135364 | c.183A>C |
| 3 | Q61K | COSM549/ COSM1159597 | c.181C>A |
| 3 | Q61L | COSM553 | c.182A>T |
| 3 | Q61R | COSM552 | c.182A>G |

BRAF Detection

BRAF is a human gene that encodes for a protein called B-Raf which is involved in sending signals inside cells which are involved in directing cell growth. It has been shown to be mutated in some human cancers. B-Raf is a member of the Raf kinase family of growth signal transduction protein kinases and plays a role in regulating the MAP Kinase/ERKs signalling pathway, which affects, amongst other things, cell division.

Certain other inherited BRAF mutations cause birth defects.

More than 30 mutations of the BRAF gene have been identified that are associated with human cancers. In 90% of cases, thymine is substituted with adenine at nucleotide 1799. This leads to valine (V) being substituted for by glutamate (E) at codon 600 (now referred to as V600E) in the activation segment found in human cancers. This mutation has been widely observed in:

Colorectal cancer
Melanoma
Papillary thyroid carcinoma
Non-small cell lung cancer
Ameloblastoma A non-limiting list of other mutations which have been found are: R461I, I462S, G463E, G463V, G465A, G465E, G465V, G468A, G468E, N580S, E585K, D593V, F594L, G595R, L596V, T598I, V599D, V599E, V599K, V599R, V600K and A727V.

Drugs that treat cancers driven by BRAF mutations have been developed; vemurafenib and dabrafenib are approved by the FDA for the treatment of late-stage melanoma. The response rate to treatment with vumerafenib was 53% for metastatic melanoma, compared to 7-12% for the former best chemotherapeutic dacarbazine.

ERBB2/HER2 Detection

Human epidermal growth factor receptor 2 (HER2), also known as CD340 (cluster of differentiation 340), proto-oncogene Neu, Erbb2 (rodent) or ERBB2 (human) is a protein encoded by the ERBB2 gene. Amplification or over-expression of this oncogene plays an important role in the progression of aggressive types of breast cancer. Over-expression of the ERBB2 gene is also known to occur in ovarian, stomach, adenocarcinoma of the lung, and aggressive forms of uterine cancer and 30% of salivary duct carcinomas. Structural alterations have also been identified that cause ligand-independent firing of the receptor in the absence of over-expression.

There are numerous targeted therapies approved and in development against this mutation and its associated disease(s), a non-limiting list of some such therapies can be seen in the table below:

| Name | Target | Manufacturer | Status | Brand Name(s) |
|---|---|---|---|---|
| Trastuzumab | HER2 overexpression | Genentech | Approved | Herceptin |
| Pertuzumab | Dimerisation of HER2 and HER3 receptors | Genentech | Approved | Perjeta |
| Margetuximab | HER2 overexpression | Raven biotechnologies/ MacroGenics | Trials | N/A |
| NeuVax | Vaccine | Galena Biopharma | Trials | N/A |

HER2 testing is routinely performed in breast cancer patients to assess prognosis, monitor response to treatment and to determine suitability for targeted therapy (trastuzumab etc.). As trastuzumab is expensive and associated with serious side effects (cardiotoxicity) it is important that only HER2+ patients are selected to receive it and thus it is advantageous that the methods of the current invention allow the quick and cheap detection of the HER2 status of patients.

In one embodiment, the presence of absence of the ERRB2 Exon 20 insertion mutations is detected using the methods of the current invention.

A further non-limiting list of ERBB2 mutations is shown in the table below:

| Exon | Mutation name | COSM Number | Mutation sequence |
|---|---|---|---|
| 20 | A775_G776insYVMA | COSM12558 | c.2324_2325ins>TTACGTGATGGC |
|  | G778_P780dup | COSM12556 | c.2332_2340dup>GGCTCCCCA |
|  | G776delinsVC | COSM1651739 | c.2326_2327ins>TGT |
|  | P780_Y781insGSP | COSM21607 | c.2339_2340ins>TGGCTCCCC |
|  | A775_G776insYVMA/ Y772_A775dup | COSM20959 | c.2313_2324dup>ATACGTGATGGC |
| 17 | V659E_AA | COSM3724566 | c.1976_1977delinsTT>AA |
|  | V659E_AG | COSM6503262 | ? c.1976_1977delinsTT>AG |

EML4-ALK Detection

EML4-ALK is an abnormal gene fusion of echinoderm microtubule-associated protein-like 4 (EML4) gene and anaplastic lymphoma kinase (ALK) gene. This gene fusion leads to the production of the protein EML4-ALK, which appears to promote and maintain the malignant behaviour of cancer cells. EML4-ALK positive lung cancer is a primary malignant lung tumour whose cells contain this mutation.

There are numerous targeted therapies approved and in development against this mutation and its associated disease(s), a non-limiting list of some such therapies can be seen in the table below:

| Name | Generation | Target | Manufacturer | Status | Brand Name(s) |
|---|---|---|---|---|---|
| Crizotinib | 1 | EML4/ALK | Pfizer | FDA approved 2011 | Xalkori, Crizalk |
| Certinib | 2 | ALK | Novartis | FDA approved 2014 | Zykadia |
| Alectinib | 2 | ALK | Genentec | Japan 2014, FDA approved 2015 | Alecensa |
| Brigatinib | 2 | ALK/EGFR | Takeda | FDA approved 2017 | Alunbrig, Brianix |
| Ensartinib | 2 | ALK | XCovery | Trial(s) | N/A |
| Lorlatinib | 3 | ROS1/ALK | Pfizer | Trial(s) | N/A |

EML4-ALK gene fusions are responsible for approximately 5% of non-small cell lung cancers (NSCLC), with about 9,000 new cases in the US per year and about 45,000 worldwide.

There are numerous variants of EML4-ALK with all variants having the essential coiled-coil domain in the EML4 N-terminal portion and in the kinase domain of ALK exon 20 that are needed for transforming activity. Fusion of exon 13 of EML4 with exon 20 of ALK (variant 1: V1) (detection of which can be seen in FIG. 20), exon 20 of EML4 with exon 20 of ALK (V2), and exon 6 of EML4 with exon 20 of ALK (V3) are some of more common variants. The clinical significance of these different variants has only recently become clearer.

V3 has emerged as a marker suitable for the selection of patients who are likely to have shorter progression-free survival (PFS) after non-tyrosine kinase inhibitor (TKI) treatment such as chemotherapy and radiotherapy. There is further evidence that V3 is associated with shorter PFS of those patients who receive first- and second-generation treatment lines and worse overall survival (OS) compared to V1 and V2 of EML4-ALK.

It has also been found that V3-positive patients develop resistance to first and second treatment lines though the development of resistance mutations and possibly facilitated by incomplete tumour cell suppression due to a higher IC50 of wild-type V3. Detection of the unfavourable V3 could be used to select patients requiring more aggressive surveillance and treatment strategies. It appears that administration of the third generation Lorlatinib to patients with V3 may confer longer PFS over those with V1 and thus it is advantageous that the methods of the current invention allow the quick and cheap detection of which variant a patient may have.

The methods of the current invention further allow the detection of resistance mutations such as, but not limited to: G1202R, G1269A, E1210K, D1203, S1206C, L1196M, F1174C, I1171T, I1171N/S, V1180L, T1151K and C1156Y.

G1202R, for example, is a solvent-front mutation which causes interference with drug binding and confers a high level of resistance to first- and second-generation ALK inhibitors. Thus it is advantageous that the methods of the current invention allow identification of those patients who may possess this mutation and benefit from treatment initiation on a third generation treatment rather than a first or second.

A further non-limiting list of EML4-ALK mutations is shown in the table below:

| Exon | Mutation | COSM Number | Mutation sequence |
|---|---|---|---|
| Rearrangements (always exon 20) | EML4-ALK | COSF408 | E13_A20 |
|  |  | COSF474 | E6ins33_A20 |
|  |  | COSF409 | E20_A20 |
|  |  | COSF411 | E6_A20 |

EGFR Detection

The identification of the epidermal growth factor receptor (EGFR) as an oncogene led to the development of targeted therapies such as gefitinib, erlotinib, afatinib, brigatinib and icotinib for lung cancer, and cetuximab for colon cancer. However, many people develop resistance to these therapies. Two primary sources of resistance are the T790M mutation and the MET oncogene.

EGFR mutations occur in EGFR exons 18-21 and mutations in exons 18, 19 and 21 and indicate suitability for treatment with EGFR-TKIs (tyrosine kinase inhibitors). Mutations in exon 20 (with the exception of a few mutations) show the tumours are EGFR-TKI resistant and not suitable for treatment with EGFR-TKIs.

The two most common EGFR mutations are short in-frame deletions of exon 19 and a point mutation (CTG to CGG) in exon 21 at nucleotide 2573, which results in substitution of leucine by arginine at codon 858 (L858R) Together, these two mutations account for ~90% of all EGFR mutations in non-small cell lung cancer (NSCLC). Screening for these mutations in patients with NSCLC can be used to predict which patients will respond to TKIs.

Thus it is advantageous that the methods of the current invention allow identification of those patients who may possess these mutations and benefit from treatment initiation on TKIs. The person skilled in the art will appreciate that the methods of the current invention allow identification of a range of EGFR mutations, a non-exhaustive list of such mutations is: G719X, Ex19Del, S768I, Ex20Ins and L861Q.

A further non-limiting list of mutations is shown in the table below:

| Exon | Mutation name | COSM Number | Mutation sequence |
|---|---|---|---|
| Exon 18 | G719A | 6239 | c.2156G > C |
|  | G719S | 6252 | c.2155G > A |
|  | G719C | 6253 | c.2155G > T |
| Exon 19 | del_6210 | 6210 | 2240_2251del12 |
|  | del_6218 | 6218 | 2239_2247del9 |
|  | del_6220 | 6220 | 2238_2255del18 |
|  | del_6223 | 6223 | 2235_2249del15 |
|  | del_6225 | 6225 | 2236_2250del15 |
|  | del_6255 | 6255 | 2239_2256del18 |
|  | del_12367 | 12367 | 2237_2254del18 |
|  | del_12369 | 12369 | 2240_2254del15 |
|  | del_12370 | 12370 | 2240_2257del18 |
|  | del_12382 | 12382 | 2239_2248TTAAGAGAAG > C |
|  | del_12383 | 12383 | 2239_2251 > C |
|  | del_12384 | 12384 | 2237_2255 > T |
|  | del_12385 | 12385 | 2235_2255 > AAT |
|  | del_12386 | 12386 | 2237_2252 > T |
|  | del_12387 | 12387 | 2239_2258 > CA |
|  | del_12403 | 12403 | 2239_2256 > CAA |
|  | del_12416 | 12416 | 2237_2253 > TTGCT |
|  | del_12419 | 12419 | 2238_2252 > GCA |
|  | del_12422 | 12422 | 2238_2248 > GC |
|  | del_12678 | 12678 | 2237_2251del15 |
|  | del_12728 | 12728 | 2236_2253del18 |
|  | del_13550 | 13550 | 2235_2248 > AATTC |
|  | del_13551 | 13551 | 2235_2252 > AAT |
|  | del_13552 | 13552 | 2235_2251 > AATTC |
|  | del_13556 | 13556 | 2253_2276del24 |
|  | del_18427 | 18427 | 2237_2257 > TCT |
|  | del_26038 | 26038 | 2233_2247del15 |
|  | del_6256 | 6256 | ? c.2254_2277del24 |
|  | del_28517 | 28517 | ? c.2235_2246del12 |
|  | del_1190791 | 1190791 | ? c.2234_2248del15 |
|  | del_26718 | 26718 | ? c.2250_2264del15 |
|  | del_133189 | 133189 | ? c.2236_2256del21 |
|  | del_24970 | 24970 | ? c.2239_2262del24 |
|  | I740_K745dup | 26443 | c.2217_2234dup |
|  | K745_E746insVPVAIK | 26444 | c.2219_2236dup |
| Exon 20 | T790M | 6240 | 2369C > T |
|  | S768I | 6241 | 2303G > T |
|  | p.A767_V769dup | 12376 | 2307_2308ins9GCCAGCGTG |
|  | p.H773dup | 12377 | 2319_2320insCAC |
|  | p.D770_N771insG | 12378 | 2310_2311insGGT |
|  | p.S768_D770dup | 13428 | 2311_2312ins9GCGTGGACA |
|  | p.A767_V769dup | 13558 | 2309_2310AC > CCAGCGTGGAT |
|  | A763_Y764insFQEA | 26720 | 2284-5_2290dupTCCAGGAAGCCT |
|  | C797S_2389 | 6493937 | 2389T > A |
|  | C797S_2390 | 5945664 | 2390G > C |
| Exon 21 | L858R | 6224 | c.2573T > G |
|  | L858R | 12429 | 2573_2574TG > GT |
|  | L861Q | 6213 | c.2582T > A |

ROS1

ROS1 is a receptor tyrosine kinase (encoded by the gene ROS1) with structural similarity to the anaplastic lymphoma kinase (ALK) protein; it is encoded by the c-ros oncogene.

A non-limiting list of ROS1 mutations is shown in the table below:

| Exon | Mutation name | COSM Number | Mutation sequence |
|---|---|---|---|
| Rearrangements | CD74-ROS1 | COSF1202 | C6_R32 |
| | | COSF1200 | C6_R34 |
| | | COSF1478 | C6_R35 |
| | SLC34A2-ROS1 | COSF1196 | S4_R32 |
| | | COSF1198 | S4_R34 |
| | | COSF1259 | S13del2046_R32 |
| | | COSF126 | S13del2046_R34 |
| | SDC4-ROS1 | COSF1265 | S2_R32 |
| | | COSF1278 | S4_R32 |
| | | COSF1671 | S2_R34 |
| | | COSF1280 | S4_R34 |
| | EZR-ROS1 | COSF1267 | E10_R34 |
| | GOPC-ROS1 | — | G4_R35 |
| | | COSF1188 | G4_R36 |
| | | COSF1139 | G8_R35 |
| | LRIG3-ROS1 | COSF1269 | L16_R35 |
| | TPM3-ROS1 | COSF1273 | T8_R35 |

RET Proto-Oncogene

The RET proto-oncogene encodes a receptor tyrosine kinase for members of the glial cell line-derived neurotrophic factor (GDNF) family of extracellular signalling molecules.

A non-limiting list of RET mutations is shown in the table below:

| Exon | Mutation name | COSM Number | Mutation sequence |
|---|---|---|---|
| Rearrangements | KIF5B-RET | COSF1232 | K15-R12 |
| | | COSF1230 | K16-R12 |
| | | COSF1253 | K22-R12 |
| | | COSF1234 | K23-R12 |
| | | COSF1255 (actually 15_11del107) | K15-R11 |
| | | COSF1262 | K24-R11 |
| | | COSF1242 | K24-R8 |
| | | | K24-R7 |
| | CCDC6-RET | COSF1271 | C1-R12 |
| | NCOA4-RET | COSF1341 | N6-R12 |
| | TRIM33-RET | | T14-R12 |

MET Exon 14

MET exon 14 skipping occurs with an approximately 5% frequency in NSCLC and is seen in both squamous and adenocarcinoma histology.

A non-limiting list of MET mutations is shown in the table below:

| Exon | Mutation name | COSM Number | Mutation sequence |
|---|---|---|---|
| Skipping 14 | MET-MET | COSM29312 | M13_M15 |

NTRK Proto-Oncogenes

NTRK gene fusions lead to abnormal proteins called TRK fusion proteins, which may cause cancer cells to grow. NTRK gene fusions may be found in some types of cancer, including cancers of the brain, head and neck, thyroid, soft tissue, lung, and colon. Also called neurotrophic tyrosine receptor kinase gene fusion.

A non-limiting list of NTRK mutations is shown in the table below:

| Exon | Mutation name | COSM Number | Mutation sequence |
|---|---|---|---|
| NTRK1 Rearrangements | CD74-NTRK1 | | C7-N10 |
| | MPRIP-NTRK1 | | M22-N12 |
| | TFG-NTRK1 | COSF1323 | T5-N10 |
| | TPM3-NTRK1 | COSF1329 | T8-N10 |
| NTRK3 Rearrangements | ETV6-NTRK3 | COSF571 | E5-N15 |
| | ETV6-NTRK3 | COSF1534 | E4-N14 |
| | ETV6-NTRK3 | COSF823 | E4-N15 |

Panels

In one embodiment of the invention, there is provided a panel comprising a plurality of probe molecules ($A_O$) wherein each $A_O$ is complementary to a target mutation. The mutation may be selected from any mutation previously, or subsequently, described or known. The person skilled in the art will thus appreciate that within the scope of the invention are included panels which may be useful in the detection of one or more mutations to the any of the proto-oncogenes or oncogenes previously, or subsequently, described or known.

In one embodiment, the panel comprises 5-500 individual probe molecules, each complementary to a specific target mutation. In one embodiment, the panel comprises 5-400 individual probe molecules, each complementary to a specific target mutation. In one embodiment, the panel comprises 5-300 individual probe molecules, each complementary to a specific target mutation. In one embodiment, the panel comprises 5-200 individual probe molecules, each complementary to a specific target mutation. In one embodiment, the panel comprises 5-100 individual probe molecules, each complementary to a specific target mutation. In one embodiment, the panel comprises 5-50 individual probe molecules, each complementary to a specific target mutation.

In one embodiment, there may be a plurality of probe molecules specific to the same mutation. In one embodiment, there may be only one probe molecule specific to each mutation of the panel.

In one embodiment, there is provided a panel, wherein the panel comprises a plurality of probe molecules wherein one or more probes are complementary to an EGFR mutation, one or more probes are complementary to a KRAS mutation, one or more probes are complementary to a ERBB2/HER2 mutation, one or more probes are complementary to a EML4-ALK mutation, one or more probes are complementary to a ROS1 mutation, one or more probes are complementary to a RET mutation and one or more probes are complementary to a MET mutation.

In one embodiment, there is provided a panel, wherein the panel comprises a plurality of probe molecules wherein one or more probes may be complementary to an EGFR mutation, one or more probes may be complementary to a KRAS mutation, one or more probes may be complementary to a ERBB2/HER2 mutation, one or more probes may be complementary to a EML4-ALK mutation, one or more probes may be complementary to a ROS1 mutation, one or more probes may be complementary to a RET mutation and one or more probes may be complementary to a MET mutation.

In one embodiment, there is provided a panel of probes selective for one or more EGFR, KRAS, BRAF, ERBB2/HER2, EML4-ALK, ROS1, RET, MET mutations.

In one embodiment, there is provided a panel of probe molecules selective for EGFR mutations.

In one embodiment, there is provided a panel of probe molecules selective for KRAS mutations.

In one embodiment, there is provided a panel of probe molecules selective for BRAF mutations.

In one embodiment, there is provided a panel of probe molecules selective for ERBB2/HER2 mutations.

In one embodiment, there is provided a panel of probe molecules selective for EML4-ALK mutations.

In one embodiment, there is provided a panel of probe molecules selective for ROS1 mutations.

In one embodiment, there is provided a panel of probe molecules selective for RET mutations.

In one embodiment, there is provided a panel of probe molecules selective for NTRK mutations.

In one embodiment, there is provided a panel of probe molecules selective for ROS1 mutations.

In one embodiment, there is provided a panel of probe molecules selective for MET exon 14 mutations.

In one embodiment, there is provided a panel comprising a plurality of probe molecules selective for one or more coding sequences (CDSs).

In one embodiment, there is provided a method of detecting one or more mutations using one or more of the previously described panels.

In one embodiment, there is provided a method of detecting the presence or absence or one or more mutations using one or more of the previously described panels.

In one embodiment, there is provided a kit comprising a panel, which may be as previously or subsequently described, in combination with one or more reagents, which may be as previously or subsequently described.

The person skilled in the art will appreciate that embodiments of kits that disclose $A_0$, include within their scope embodiments wherein there is a panel comprising a plurality of $A_0$.

Companion Diagnostics

The methods of the present invention can be used to detect specific genetic markers in a sample which may be used to help guide the selection of appropriate therapy. These markers may be tumour-specific mutations, or may be wild-type genomic sequences, and may be detected using tissue, blood or any other patient sample type.

Resistance Monitoring

Repeated testing of patient samples during treatment of disease may allow early detection of developed resistance to therapy. As an example of this application is in non-small cell lung carcinoma (NSCLC), in which epidermal growth factor receptor (EGFR) inhibitors (e.g. gefitinib, erlotinib) are commonly used as first line treatments. During treatment the tumour can often develop mutations in the EGFR gene (e.g. T790M, C797S) which confer resistance to the drug. Early detection of these mutations may allow for transfer of the patient onto alternative therapies (e.g. Tagrisso).

Typically patients being monitored for resistance onset can be too sick for repeated tissue biopsy to be carried out. Repeated tissue biopsy may also be expensive, invasive and carries associated risks. It is preferable to test from blood, but there may be very low copy numbers of the mutations of interest in a reasonable blood drawn sample. Monitoring therefore requires sensitive testing from blood samples using a method of the present invention in which the method is simple and cost effective to carry out such that it can be regularly performed.

Recurrence Monitoring

In this application example, patients who have been declared free of disease following treatment may be monitored over time to detect the recurrence of disease. This needs to be done non-invasively and requires sensitive detection of target sequences from blood samples. By using the method of the present invention, it provides a simple and low-cost method that can be regularly performed. The sequences targeted may be generic mutations known to be common in the disease of interest, or can be custom panels of targets designed for a specific patient based on detection of variants in the tumour tissue prior to remission.

Minimal Residual Disease (MRD) Monitoring

For some cancers there are residual cancer cells that remain in a patient after treatment, it is a major cause of relapse in cancer and leukaemia. MRD monitoring and testing has several important roles: determining whether treatment has eradicated the cancer or whether traces remain, comparing the efficacy of different treatments, monitoring patient remission status as well as detecting recurrence of leukaemia, and choosing the treatment that will best meet those needs.

Screening

Population screening for early detection of disease has been a long-held goal, particularly in cancer diagnostics. The challenge is two-fold: the identification of panels of markers which allow confident detection of disease without too many false negatives, and the development of a method with sufficient sensitivity and low enough cost. The methods of the present invention could be used to address larger panels of mutations than PCR-based tests but with a much simpler workflow and lower cost than sequencing-based diagnostics.

Organ Transplant Rejection

When a transplanted organ is rejected by the recipient, the DNA from this organ is shed into the recipient's bloodstream. Early detection of this DNA would allow early detection of rejection. This could be achieved using custom panels of donor-specific markers, or by using panels of variants known to be common in the population, some of which will be present in the donor and some in the recipient. Routine monitoring of organ recipients over time could be enabled by the low cost and simple workflow of the present invention disclosed herein.

Non-Invasive Prenatal Testing (NIPT)

It has long been known that fetal DNA is present in maternal blood, and the NIPT market is now quite saturated with companies using sequencing the identify mutations and count copy numbers of specific chromosomes to enable detection of fetal abnormalities. The methods of the present invention as disclosed herein have the ability to detect mutations at very low allele fractions, potentially allowing earlier detection of fetal DNA. Identification of common mutations in a given population would allow assays to be developed that target mutations that may be present in either the maternal or fetal DNA or to allow detection of abnormalities at an earlier stage of pregnancy.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

The person skilled in the art will understand that references to 'partially digested strand $A_1$' may refer to the single-stranded oligonucleotide formed by progressive digestion of $A_0$ when hybridised to a target analyte sequence, in the 3'-5' direction until the strands dissociate due to lack of complementarity.

The person skilled in the art will understand that references to 'partially double-stranded' nucleic acids may refer to nucleic acids wherein one or more portions are double-stranded and one or more portions are single-stranded.

The person skilled in the art will understand that references to 'substantially double-stranded' nucleic acids may refer to nucleic acids wherein one or more portions are double-stranded and one or more smaller portions are single-stranded.

The invention claimed is:

1. A method of detecting a target polynucleotide sequence in a nucleic acid analyte in a sample, the method comprising the steps of:
   (a) introducing at least one nucleic acid analyte to a first reaction mixture comprising:
      i. a single-stranded probe oligonucleotide $A_0$ comprising a 3' end perfectly complementary to the target polynucleotide sequence;
      ii. a blocking oligonucleotide complementary to a non-target polynucleotide sequence;
      iii. a pyrophosphorolysing enzyme; and
      iv. a ligase;
   wherein the first reaction mixture also comprises the non-target polynucleotide sequence and the blocking oligonucleotide anneals to the non-target polynucleotide sequence to promote annealing of $A_0$ to the analyte, wherein the analyte anneals to $A_0$ to create a first intermediate product which is at least partially double-stranded and in which a 3' end of $A_0$ forms a double-stranded complex, and wherein $A_0$ of the first intermediate product is pyrophosphorolysed in a 3'-5' direction from the 3' end to create at least a partially digested strand $A_1$; and
   wherein $A_1$ undergoes ligation using a splint to form $A_2$, wherein the splint includes the target polynucleotide sequence or an oligonucleotide D, and wherein undergoing ligation includes:
      ligation of a 3' end of $A_1$ to a 5' end of $A_1$ to form a circular construct; or
      ligation of a 3' end of $A_1$ to a 5' end of a ligation probe oligonucleotide C; and
   (b) detecting the presence or absence of a signal derived from the products of the ligation of the previous step, wherein the products comprise $A_2$ or a portion thereof, or multiple copies of $A_2$ or multiple copies of a portion thereof, and determining from the presence or absence of the signal a presence or absence of the polynucleotide target sequence in the analyte.

2. The method of claim 1, wherein the first reaction mixture further comprises a source of pyrophosphate ions.

3. The method of claim 1, wherein the first reaction mixture further comprises at least one single-stranded primer oligonucleotide that is substantially complementary to a portion of $A_0$ and deoxyribonucleotide triphosphates (dNTPs).

4. The method of claim 1, wherein the products of the ligation of step (a) are introduced to a second reaction mixture prior to step (b), the second reaction mixture comprising at least one single-stranded primer oligonucleotide and deoxyribonucleotide triphosphates (dNTPs).

5. The method of claim 4, wherein the first or second reaction mixture comprises the splint, the splint including oligonucleotide D, wherein D comprises an oligonucleotide region complementary to the 3' end of $A_1$ and an oligonucleotide region complementary to either the 5' end of the ligation probe oligonucleotide C or to the 5' end of $A_1$.

6. The method of claim 1, wherein the first reaction mixture comprises the ligation probe oligonucleotide C and the partially digested strand $A_1$ is ligated at the 3' end to the 5' end of C to form $A_2$.

7. The method of claim 6, wherein the ligation probe oligonucleotide C comprises a 3' end modification or an internal modification protecting it from 3'-5' exonuclease digestion.

8. The method of claim 1, wherein the first reaction mixture further comprises a 5'-3' exonuclease, and wherein the 5' end of $A_0$ is rendered resistant to 5'-3' exonuclease digestion.

9. The method of claim 1, wherein the first reaction mixture further comprises a phosphatase or phosphohydrolase.

10. The method of claim 1, wherein prior to or during step (b), the products of the ligation of the previous step are treated with at least one of a pyrophosphatase or an exonuclease.

11. The method of claim 1, wherein the enzyme which performs pyrophosphorolysis of $A_0$ to form partially digested strand $A_1$ also amplifies $A_2$.

12. The method of claim 1, wherein detecting the signal is achieved using one or more oligonucleotide fluorescent binding dyes or molecular probes, and wherein an increase in the signal over time resulting from generation of amplicons of $A_2$ is used to determine a concentration of the target polynucleotide sequence.

13. The method of claim 1, wherein the first reaction mixture comprises multiple probes $A_0$, each $A_0$ being selective for a different target polynucleotide sequence and each $A_0$ including an identification region, wherein step (a) includes generation of amplicons of $A_2$, each $A_2$ including a respective identification region, wherein a presence of the target polynucleotide sequences present in the analyte are determined through detection of the identification regions, and wherein detection of the identification regions is carried out using molecular probes or through sequencing.

14. The method of claim 13, wherein the step (b) comprises:
   i. labelling the products of the ligation of step (a) using one or more oligonucleotide fluorescent binding dyes or molecular probes;
   ii. measuring a fluorescent signal of the labelled products;
   iii. exposing the labelled products to a set of denaturing conditions; and iv. identifying the polynucleotide target sequence in the analyte by monitoring changes in the fluorescent signal of the labelled products during exposure to the denaturing conditions.

15. The method of claim 1, wherein the at least one nucleic acid analyte is split into multiple first reaction mixtures, each first reaction mixture having one or more probe oligonucleotide $A_0$, each $A_0$ comprising a 3' end that is perfectly complementary to the target polynucleotide sequence.

16. The method of claim 15, wherein the each probe oligonucleotide $A_0$ comprises a common priming site, allowing a single primer or single set of primers to be used for amplification.

17. A reaction mixture comprising:
a single-stranded probe oligonucleotide $A_0$ comprising a 3' end perfectly complementary to a target polynucleotide sequence;
a blocking oligonucleotide complementary to a non-target polynucleotide sequence;
a pyrophosphorolysing enzyme;
a ligase; and
a source of pyrophosphate ions.

18. A kit comprising:
a single-stranded probe oligonucleotide $A_0$ comprising a 3' end perfectly complementary to a target polynucleotide sequence;
a blocking oligonucleotide complementary to a non-target polynucleotide sequence;
a pyrophosphorolysing enzyme;
a ligase; and
a source of pyrophosphate ions.

* * * * *